United States Patent
Akutsu et al.

(10) Patent No.: US 9,531,232 B2
(45) Date of Patent: Dec. 27, 2016

(54) ROTATING ELECTRICAL MACHINE INCORPORATING DRIVE DEVICE

(75) Inventors: Satoru Akutsu, Chiyoda-ku (JP); Isao Sonoda, Chiyoda-ku (JP); Yoshihito Asao, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 679 days.

(21) Appl. No.: 13/981,788

(22) PCT Filed: Apr. 6, 2011

(86) PCT No.: PCT/JP2011/058712
§ 371 (c)(1),
(2), (4) Date: Jul. 25, 2013

(87) PCT Pub. No.: WO2012/137322
PCT Pub. Date: Oct. 11, 2012

(65) Prior Publication Data
US 2013/0300235 A1  Nov. 14, 2013

(51) Int. Cl.
*B62D 5/04* (2006.01)
*H02K 5/22* (2006.01)
*H02K 7/116* (2006.01)

(52) U.S. Cl.
CPC .......... *H02K 5/225* (2013.01); *B62D 5/0406* (2013.01); *B62D 5/0409* (2013.01); *H02K 11/33* (2016.01); *H02K 7/1166* (2013.01)

(58) Field of Classification Search
CPC .......... H02K 5/225; H02K 5/22; H02K 9/22; H02K 3/50; B62D 5/0406; B62D 5/0409
(Continued)

(56) References Cited

U.S. PATENT DOCUMENTS

| | | | | |
|---|---|---|---|---|
| 4,727,274 A | * | 2/1988 | Adam | ............... H02K 5/12 310/239 |
| 2002/0060105 A1 | * | 5/2002 | Tominaga | ........... B62D 5/0406 180/443 |

(Continued)

FOREIGN PATENT DOCUMENTS

| CN | 101980914 A | 2/2011 |
|---|---|---|
| JP | 2002-120739 A | 4/2002 |

(Continued)

OTHER PUBLICATIONS

Communication dated Oct. 28, 2015 from the European Patent Office in counterpart application No. 11863134.0.

(Continued)

*Primary Examiner* — Quyen Leung
*Assistant Examiner* — Noli Manaloto
(74) *Attorney, Agent, or Firm* — Sughrue Mion, PLLC; Richard C. Turner

(57) ABSTRACT

There is provided a drive-device-integrated rotating electrical machine, in which a radially protruding portion is provided radially on at least one of a housing and a heat sink which constitute a storing section of the drive device; an opening portion is formed on at least one of the radially protruding portion; a connector section is attachably/detachably attached onto the opening portion; and a connector-connecting portion for electrically connecting the connector section with the drive device is provided in the vicinity of the opening portion.

15 Claims, 58 Drawing Sheets

(58) Field of Classification Search
USPC ...... 310/71, 89, 64; 180/443; 174/50.52, 59, 174/542; 439/926
See application file for complete search history.

(56) References Cited

U.S. PATENT DOCUMENTS

| | | | |
|---|---|---|---|
| 2003/0127921 A1* | 7/2003 | Akutsu | B62D 5/0406 310/68 R |
| 2004/0061391 A1* | 4/2004 | Matsuyama | G01P 1/026 310/71 |
| 2007/0246289 A1* | 10/2007 | Tominaga | B62D 5/0406 180/444 |
| 2007/0261764 A1 | 11/2007 | Nakamura | |
| 2009/0255186 A1 | 10/2009 | Uchimura | |
| 2010/0283339 A1 | 11/2010 | Kitai | |
| 2010/0288577 A1 | 11/2010 | Sonoda et al. | |
| 2011/0254387 A1* | 10/2011 | Matsuda | B62D 5/0406 310/43 |
| 2012/0160596 A1* | 6/2012 | Yamasaki | B62D 5/0406 180/443 |

FOREIGN PATENT DOCUMENTS

| | | |
|---|---|---|
| JP | 2003-063325 A | 3/2003 |
| JP | 2007-242656 A | 9/2007 |
| JP | 2008-174097 A | 7/2008 |
| JP | 2009-190477 A | 8/2009 |
| JP | 2009-248796 A | 10/2009 |
| JP | 2009-248864 A | 10/2009 |
| JP | 2010-269693 A | 12/2010 |
| JP | 2010-280245 A | 12/2010 |
| WO | 2009/125506 A1 | 10/2009 |
| WO | 2010/007672 A1 | 1/2010 |

OTHER PUBLICATIONS

Communication dated May 15, 2015, issued by the State Intellectual Property Office of the People's Republic of China in counterpart Application No. 201180069579.1.
Japanese Office Action, issued Dec. 10, 2013, Application No. 2013-508678.
International Search Report for PCT/JP2011/058712 dated Jul. 12, 2011.

* cited by examiner

ROTATING ELECTRICAL MACHINE INCORPORATING DRIVE DEVICE

CROSS REFERENCE TO RELATED APPLICATIONS

This application is a National Stage of International Application No. PCT/JP2011/058712 filed Apr. 6, 2011, the contents of all of which are incorporated herein by reference in their entirety.

TECHNICAL FIELD

This invention relates to a drive-device-integrated rotating electrical machine, which is used, for example, in an electric power steering system.

BACKGROUND ART

In a conventional drive-device-integrated rotating electrical machine, which is used in an electric power steering system for applying an assist force to a steering assembly of vehicles, a housing section of the drive device and a connector section are configured integrally with each other (referred to in Patent Document 1, for example).

CITATION LIST

Patent Document

Patent Document 1: Japanese Patent No. 3774624 (FIG. 2)

SUMMARY OF THE INVENTION

Problems to be Solved by the Invention

In the conventional drive-device-integrated rotating electrical machine shown in Patent Document 1, since the housing section of the drive device ("the circuit case" in Patent Document 1) and the connector section ("the first connector" and "the second connector" in Patent Document 1) are configured integrally with each other, there are problems that it is unable to replace only the connector section, and that the connectors have little flexibility in their arrangement.

This invention has been made to solve these problems, and an object thereof is to provide a drive-device-integrated rotating electrical machine which allows its connector section to be solely replaced, and in addition, is a highly flexible in the arrangement of its connectors.

Means for Solving the Problems

A drive-device-integrated rotating electrical machine according to the invention comprises: an electric motor; a drive device equipped with an electronic part for controlling driving of the electric motor and wiring parts; a housing and a heat sink which constitute a drive-device storing section for storing the drive device; and a connector section provided with a power connector for feeding power to the drive device and a signal connector; wherein
a radially protruding portion is provided radially on at least one of circumferences of the housing and the heat sink constituting the drive-device storing section; an opening portion is formed on at least one said radially protruding portion; the connector section is attachably/detachably attached onto at least one said opening portion; and a connector-connecting portion for electrically connecting the connector section with the drive device is provided in the vicinity of said opening portion.

Effect of the Invention

According to the drive-device-integrated rotating electrical machine of the invention, it is possible to achieve a drive-device-integrated rotating electrical machine whose connector section is solely replaceable, and in addition, which is highly flexible in the arrangement of the connectors.

The foregoing and other objects, features, aspects and advantages of the present invention will become more apparent from the following detailed description of the embodiments and the accompanying drawings.

MODES FOR CARRYING OUT THE INVENTION

Figure 1:
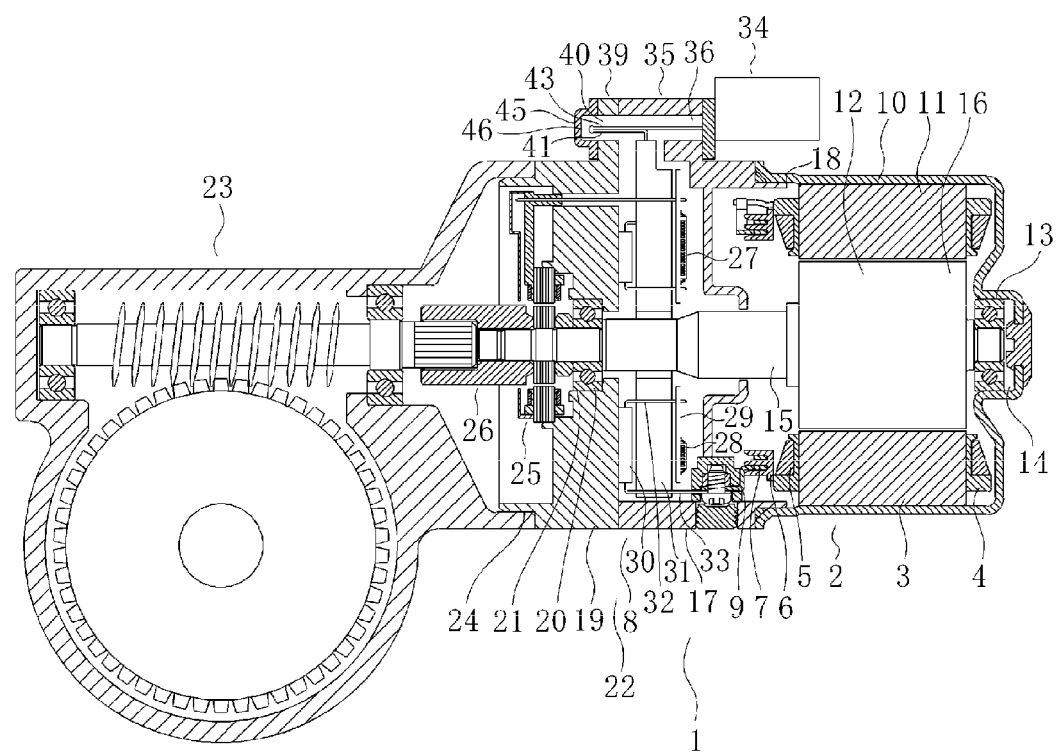
FIG. 1 is a cross-sectional view showing a drive-device-integrated rotating electrical machine of Embodiment 1 of the invention, and including a decelerating mechanism.

Hereinafter, embodiments for carrying out the invention will be described with reference to the drawings. Note that, in the drawings, the same symbols represent the same or equivalent parts.

Embodiment 1

Figure 2:
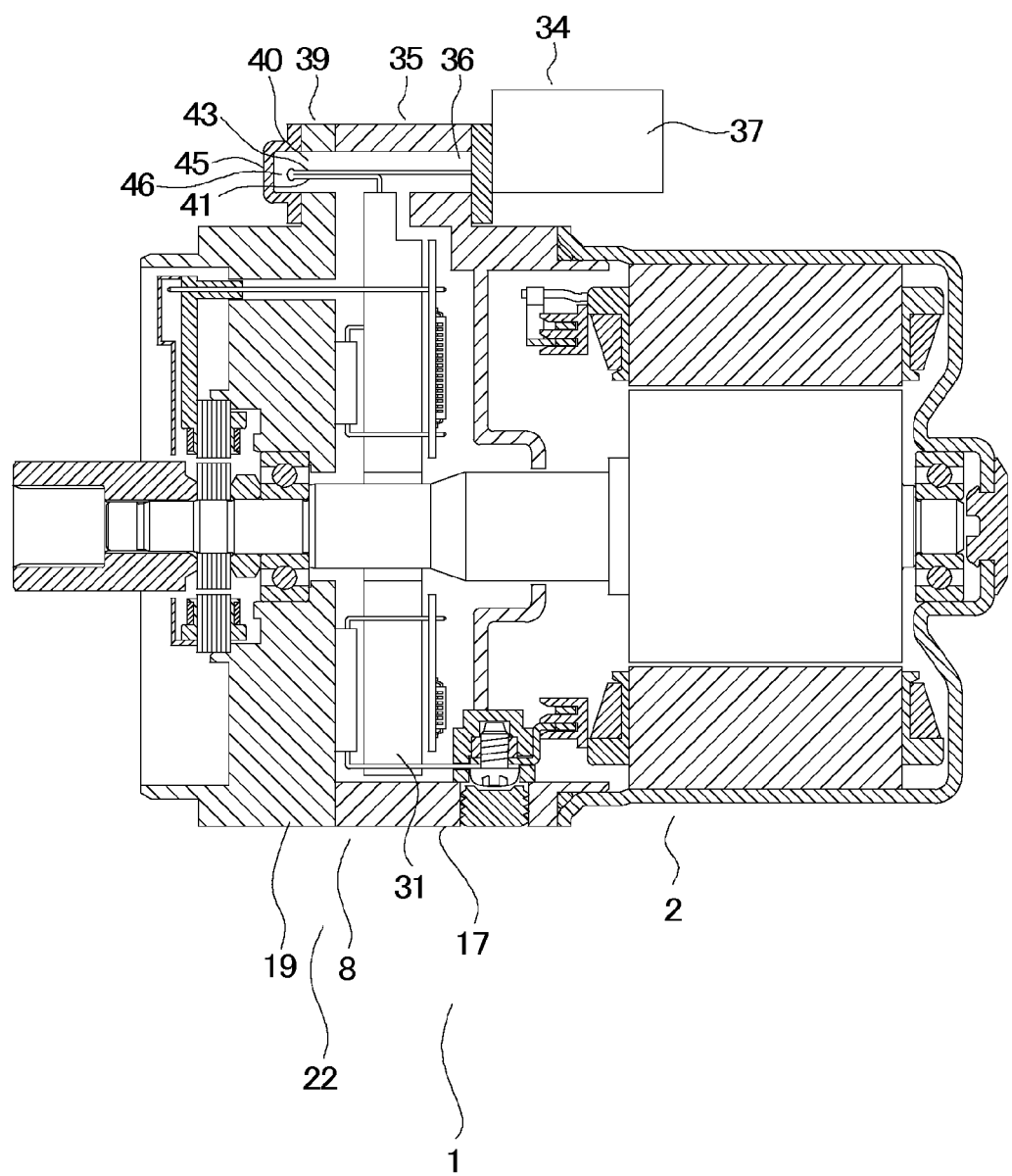
FIG. 2 is an axially cross-sectional view showing the drive-device-integrated rotating electrical machine of Embodiment 1 of the invention.
Figure 3:
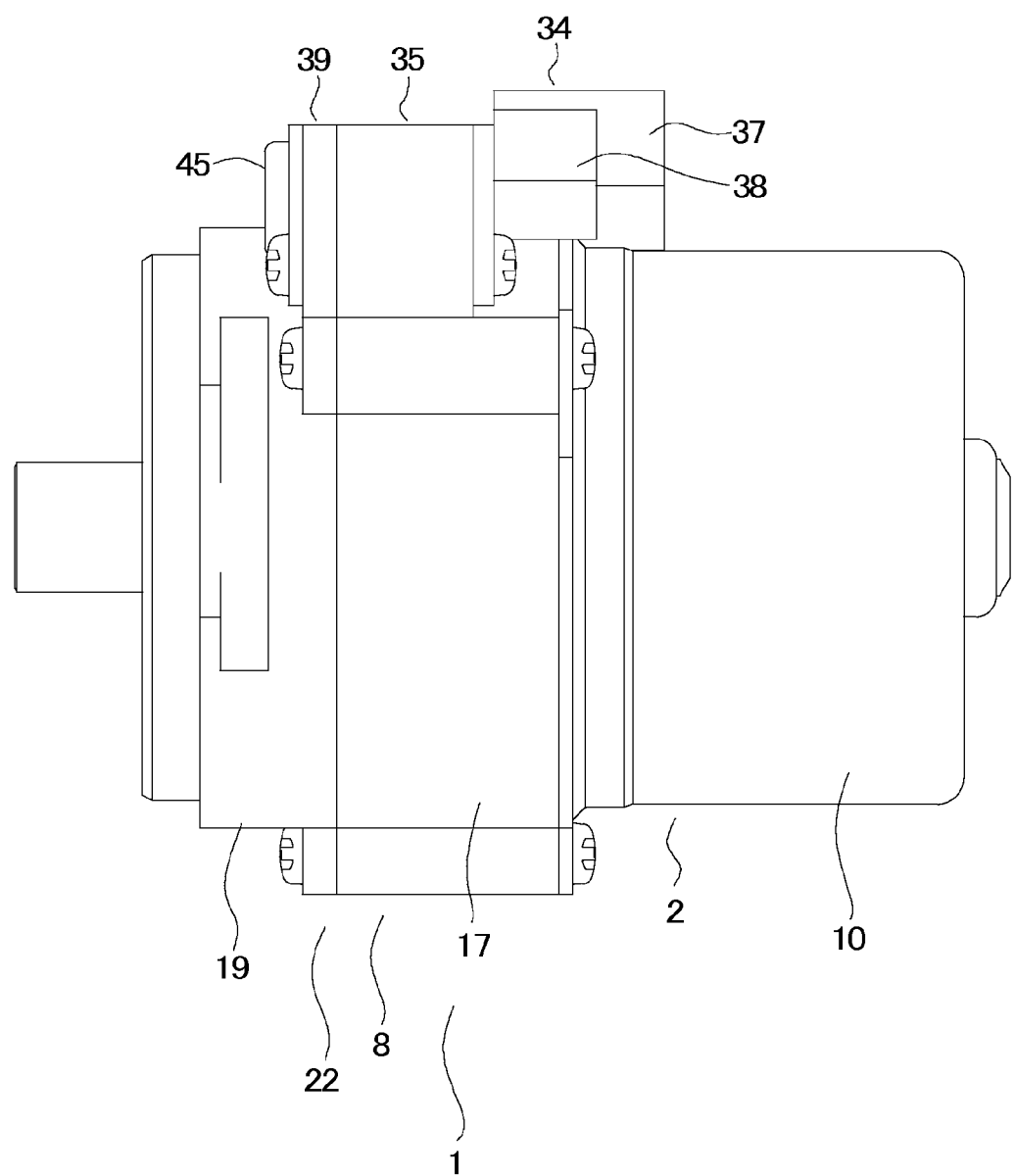
FIG. 3 is a side view showing the drive-device-integrated rotating electrical machine of Embodiment 1 of the invention.
Figure 4:
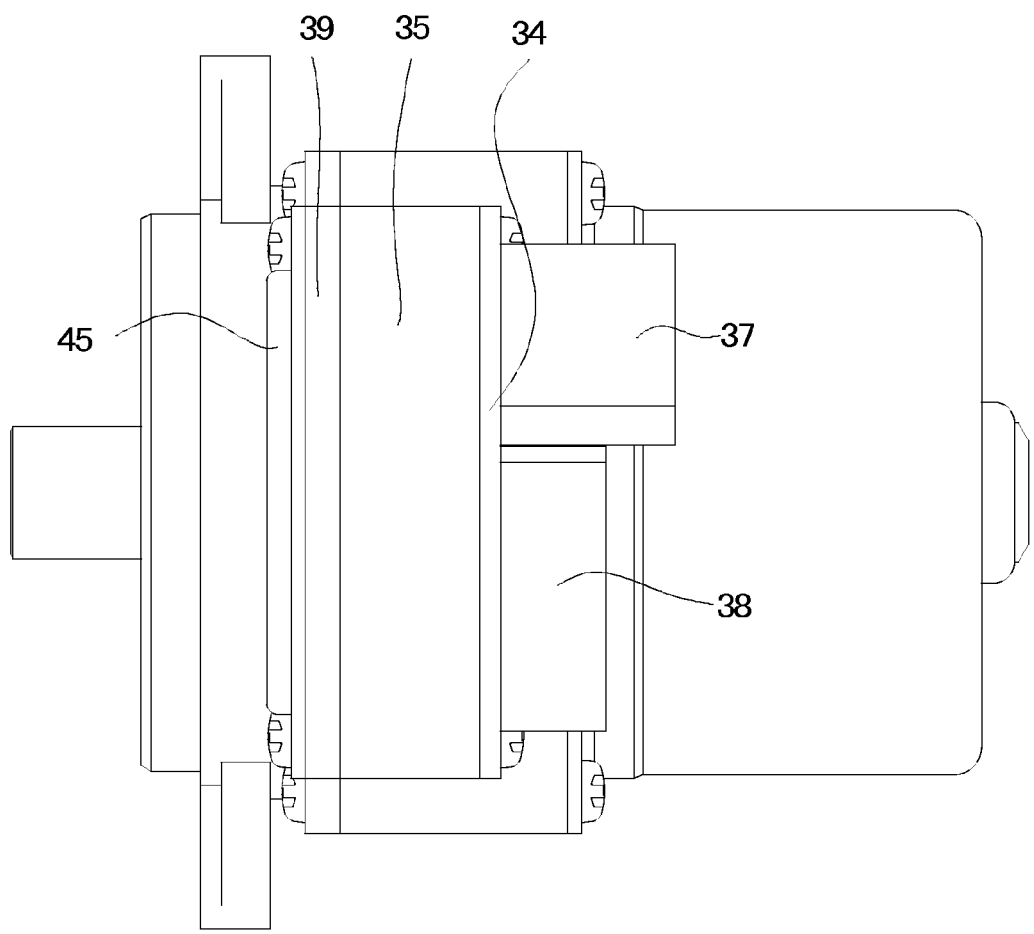
FIG. 4 is a top view showing the drive-device-integrated rotating electrical machine of Embodiment 1 of the invention.
Figure 5:
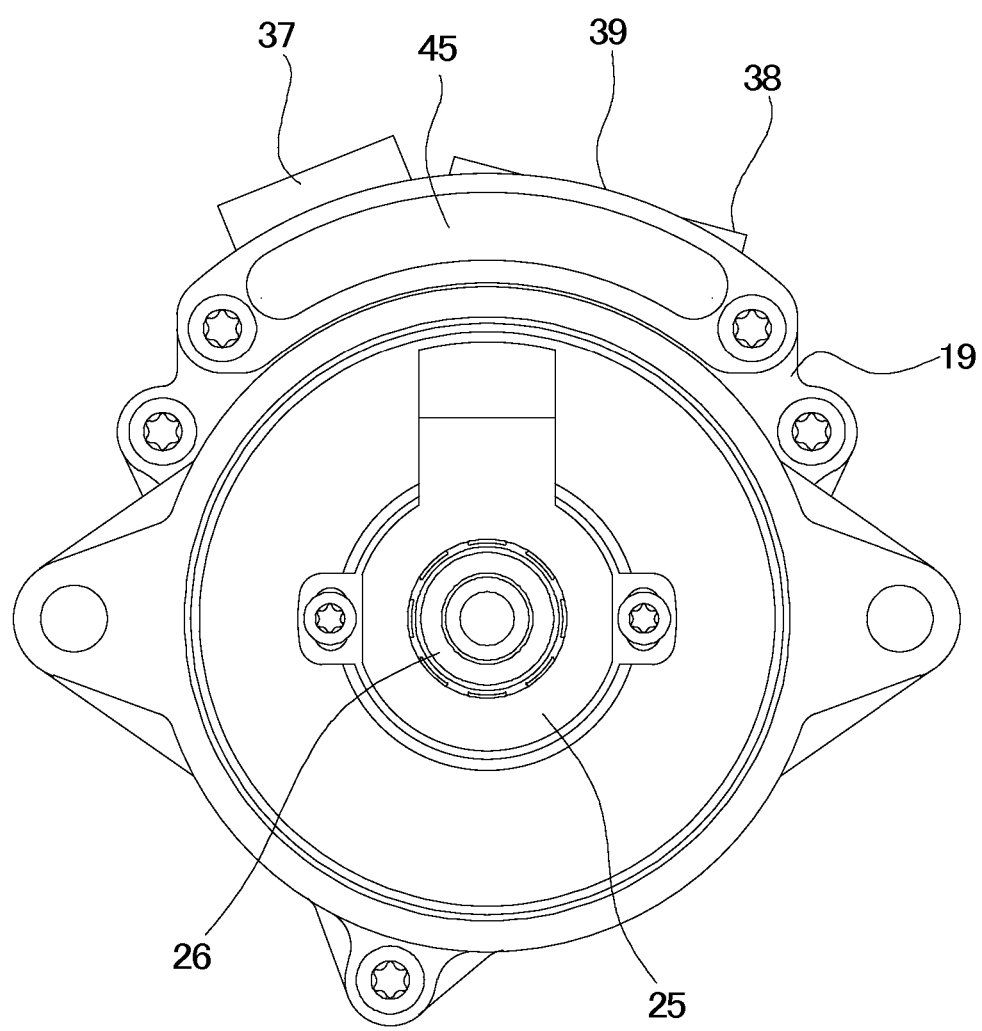
FIG. 5 is a front view showing the drive-device-integrated rotating electrical machine of Embodiment 1 of the invention.
Figure 6:
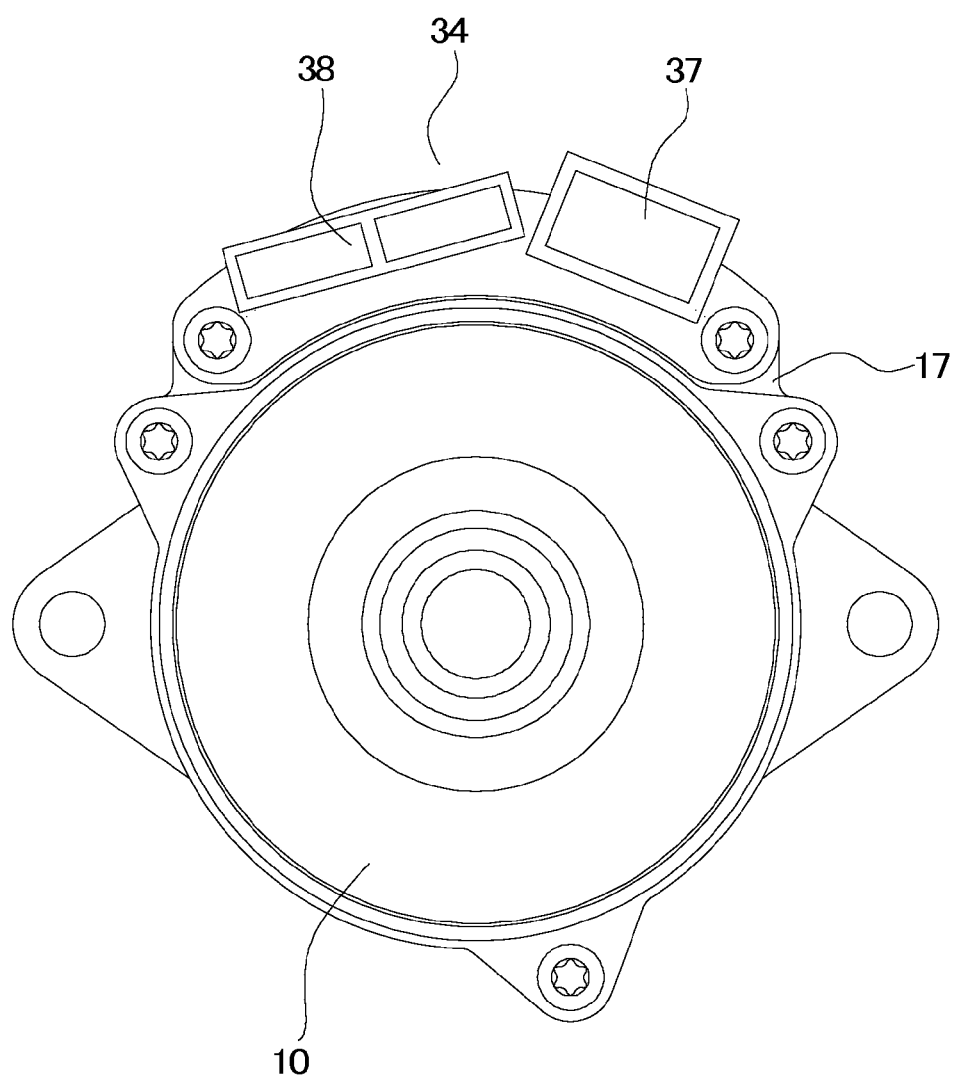
FIG. 6 is a rear view showing the drive-device-integrated rotating electrical machine of Embodiment 1 of the invention.
Figure 7:
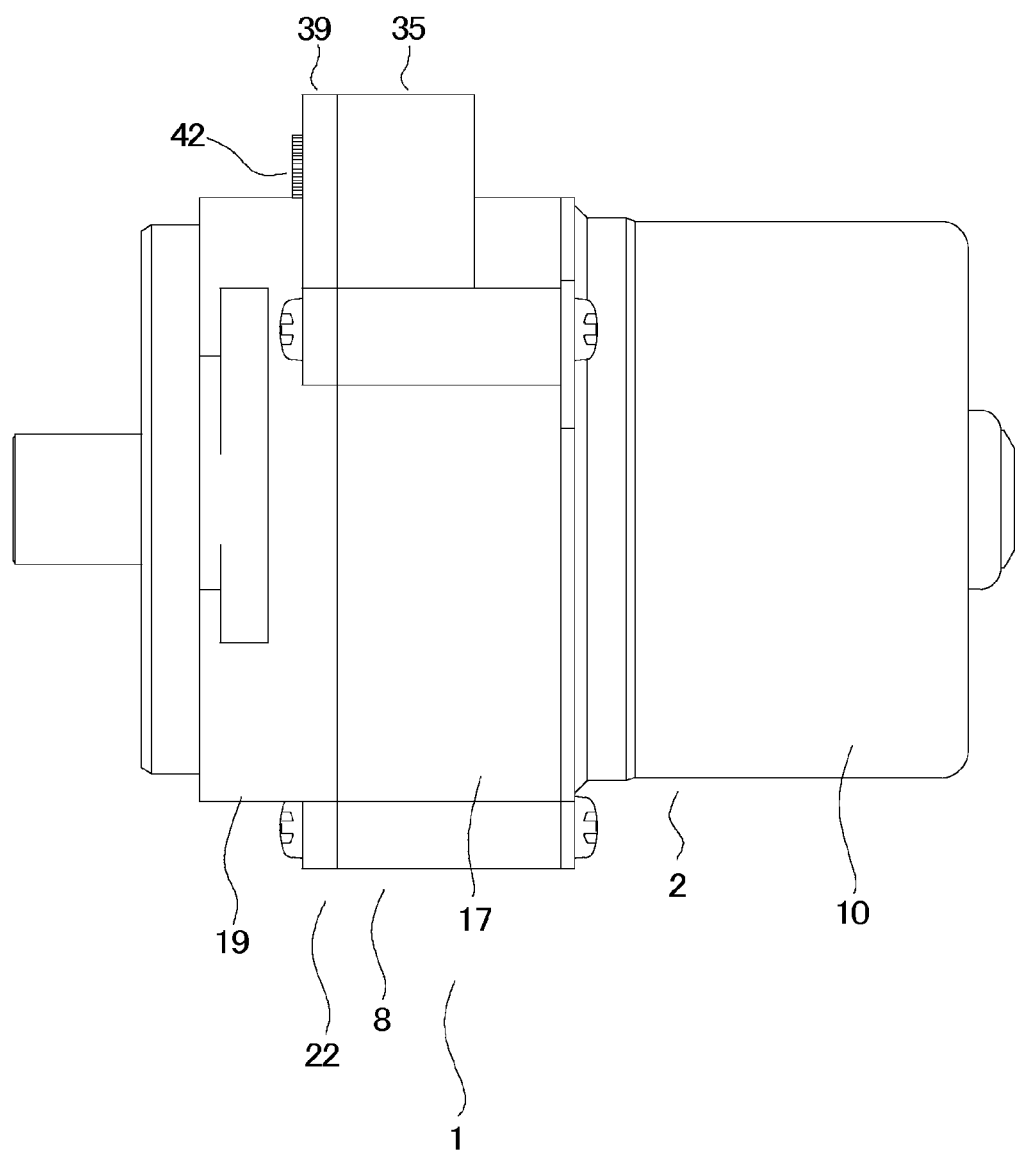
FIG. 7 is a side view showing the drive-device-integrated rotating electrical machine of Embodiment 1 of the invention, without a connector section.
Figure 8:
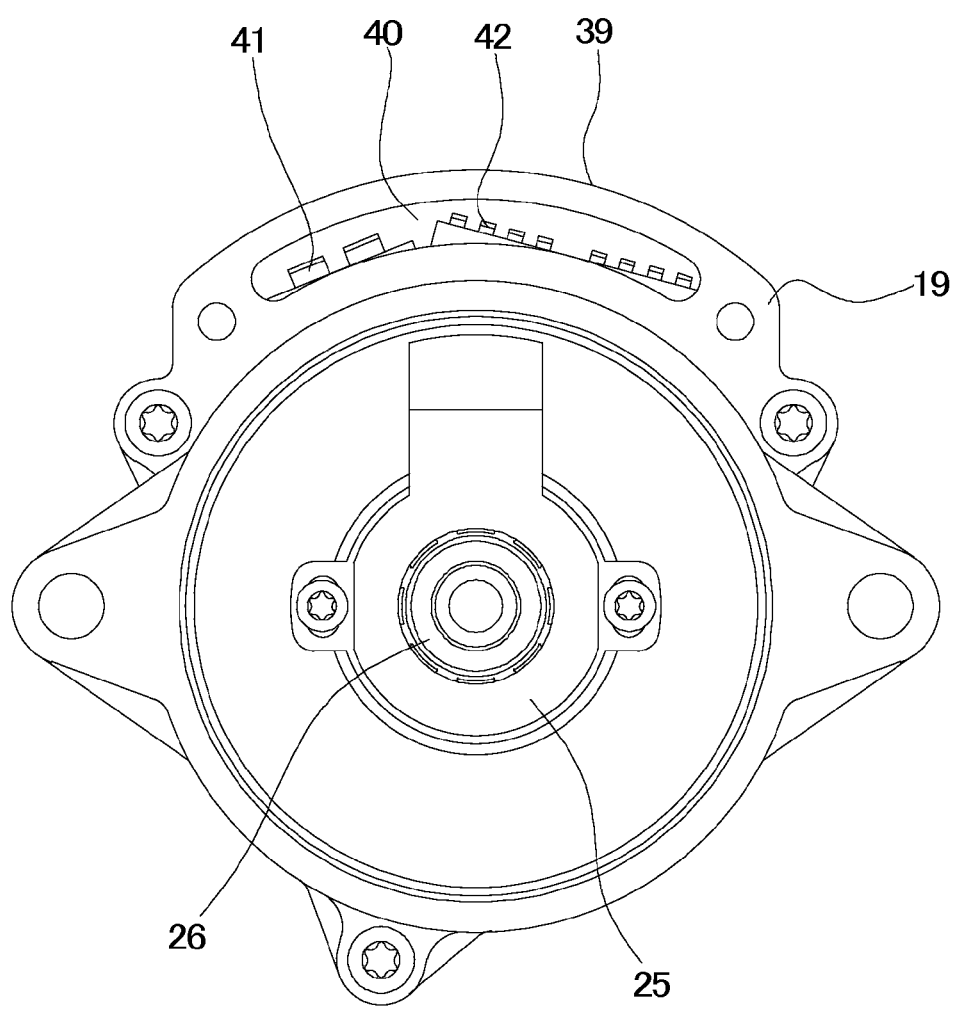
FIG. 8 is a front view showing the drive-device-integrated rotating electrical machine of Embodiment 1 of the invention, without a connector section.
Figure 9:
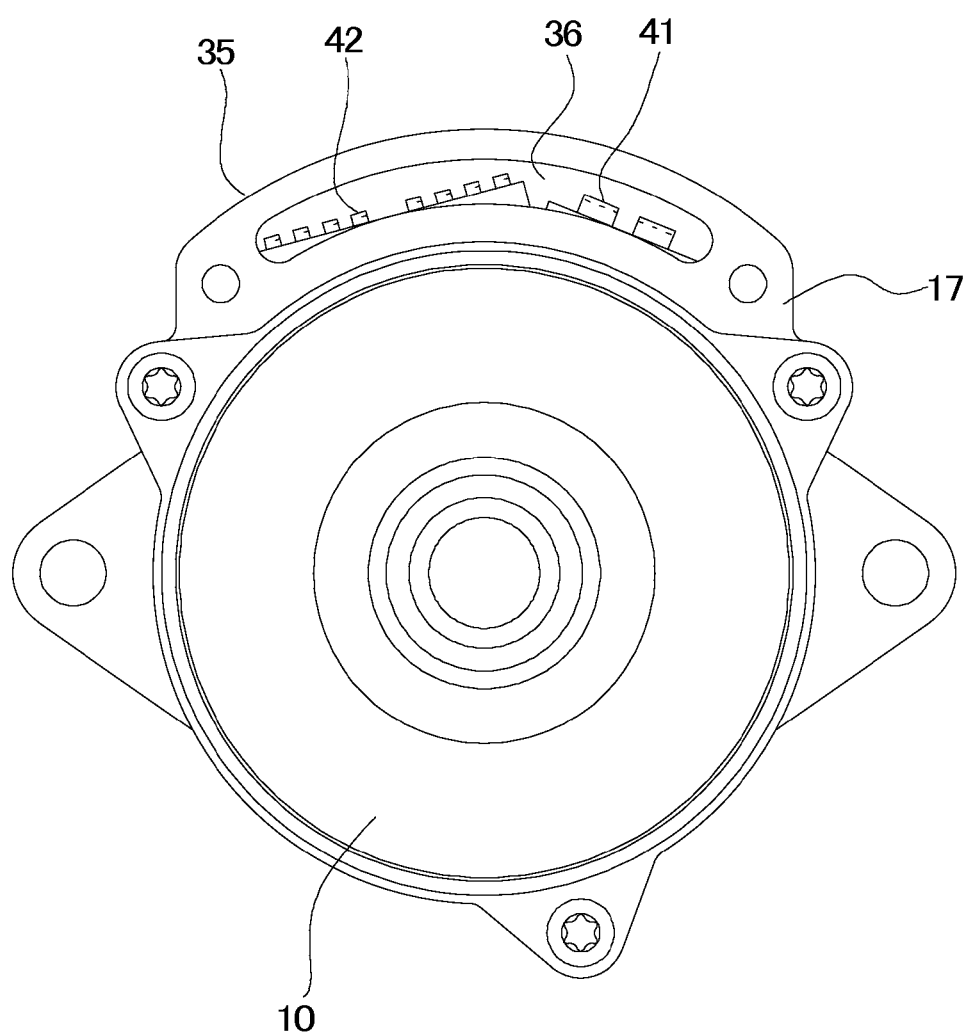
FIG. 9 is a rear view showing the drive-device-integrated rotating electrical machine of Embodiment 1 of the invention, without a connector section.

FIG. 1 is a cross-sectional view showing a drive-device-coaxially-integrated rotating electrical machine according to Embodiment 1 of the invention, and a decelerating mechanism therefor. FIG. 2 is an axially cross-sectional view showing the drive-device-coaxially-integrated rotating electrical machine of Embodiment 1. FIG. 3 is a side view showing the drive-device-coaxially-integrated rotating electrical machine of Embodiment 1. FIG. 4 is a top view showing the drive-device-coaxially-integrated rotating electrical machine of Embodiment 1. FIG. 5 is a front view showing the drive-device-coaxially-integrated rotating electrical machine of Embodiment 1. FIG. 6 is a rear view showing the drive-device-coaxially-integrated rotating electrical machine of Embodiment 1. FIG. 7 is a side view showing the drive-device-coaxially-integrated rotating electrical machine of Embodiment 1, without a connector section. FIG. 8 is a front view showing the drive-device-coaxially-integrated rotating electrical machine of Embodiment 1, without the connector section. FIG. 9 is a rear view showing the drive-device-coaxially-integrated rotating electrical machine of Embodiment 1, without the connector section.

In FIG. 1 to FIG. 9, a rotating electrical machine 2 is a permanent magnet synchronous motor, in which three-phase stator windings 5 are wound on a stator core 3 formed of laminated magnetic steel sheets, through a resin insulator 4. The respective windings are connected in Y- or Δ-connection by a winding terminal 7 stored in a resin terminal holder 6. Motor terminals 9 are attached to the winding terminal 7 for electrically connecting it to a drive device 8. The stator core 3 is press-fitted in an iron frame 10 to constitute a stator 11 of the motor. The frame 10 has at its one end a bottom portion, and at the center portion of the bottom portion, a rear bearing box portion 14 storing a rear bearing 13 for supporting one end of a rotor 12 is formed. A magnet 16 for generating magnetic field is mounted on the circumference of a shaft 15 of the rotor 12. The other end of the frame 10 is open where a mating portion 18 for joining with a housing 17 of the drive device 8 is formed.

The housing 17 is formed of an aluminum alloy die-cast molded product, and is joined at its one end with a heat sink 19 of the drive device 8.

The heat sink 19 is formed of an aluminum alloy die-cast molded product, and at the center portion of the heat sink, a front bearing box portion 21 storing a front bearing 20 for supporting one end of the rotor is formed.

The housing 17 and the heat sink 19 constitute a drive-device storing section 22. At the other end of the heat sink 19, a mount mating portion 24 for mounting a decelerating mechanism 23 is formed. To the front-side center portion of the heat sink 19, a resolver which is a rotation sensor 25, is attached. To the front-side end of the shaft 15, a boss 26 which is a coupler for coupling the shaft with the decelerating mechanism 23, is attached.

The drive device 8 has a glass epoxy control board 29 on which a microcomputer 27 and a FET driver circuit 28 are mounted, and a driver unit 30 in which a power device such as a power MOSFET, etc., is mounted. Between the control board 29 and the driver unit 30, there is provided a terminal section 31 for feeding power to the driver unit 30, which is formed of copper terminals, not shown in the figure, integrally with a resin by insert molding.

The driver unit 30 is mounted tightly on the inner wall of the heat sink 19, thereby being configured to transfer heat generated in the power device to the heat sink 19. The driver unit 30 is provided with driver-unit signal terminals 32 and driver-unit motor terminals 33, and the driver-unit signal terminals 32 and the driver-unit motor terminals 33 are connected to the control board 29 and the motor terminals 9, respectively.

In the heat sink 19, there is stored a capacitor, not shown in the figure, for absorbing a ripple of the current flowing through the rotating electrical machine 2, which is connected to the driver unit 30 through a terminal not shown in the figure.

Further, in the heat sink 19, there is also stored a coil, not shown in the figure, for absorbing noise, which is connected to a connector section 34 through a terminal not shown in the figure.

The housing 17 is provided with a housing-side radially protruding portion 35, and a housing-side axial opening portion 36 which is a connector attachment portion is formed at an axial end of the housing-side radially protruding portion 35. The connector section 34 is attached onto the housing-side axial opening portion 36, and the connector section 34 is provided with a power connector 37 and a signal connector 38.

The heat sink 19 is provided with a heat sink-side radially protruding portion 39 positioned as facing opposite to the housing-side radially protruding portion 35, and a heat sink-side opening portion 40 is formed at an axial end of the heat sink-side radially protruding portion 35. Power terminals 41 and signal terminals 42 that are extending from the terminal section 31, axially project from the heat sink-side opening portion 40.

The power terminals 41 and the signal terminals 42 are respectively subjected to terminal-to-terminal connection with their corresponding power connector terminals 43 and signal connector terminals 44 that are extending from the connector section 34 and passing through the housing-side axial opening portion 36, at the position axially projecting from the heat sink-side opening portion 40, by welding, etc.

The heat sink-side opening 40 is provided with a cover 45 which covers a connector-connecting portion 46 including connecting portions between the power terminals 41 and the power connector terminals 43 and connecting portions between the signal terminals 42 and the signal connector terminals 44.

Between the contact faces of the cover 45 and the heat sink 19, where appropriate, a hermetic water-proof seal is formed using a sealing resin.

According to the drive-device-integrated rotating electrical machine of Embodiment 1 configured as described above, since the connector section 34 is attached onto the housing-side axial opening portion 36 of the drive-device storing section 22, it is possible to easily replace the connector section 34.

Further, it is possible to replace solely the connector section 34 while commonly using the device drive 8.

Further, by simply changing the extending direction of the power terminals 41 and the signal terminals 42, it is possible to change the attaching direction of the connector section 34 from the side of the housing 17 to that from the side of heat sink 19. Furthermore, since the connector-connecting portion 46 is projected from the heat sink-side opening portion 40, it is possible to easily connect the terminals.

Embodiment 2

Figure 10:
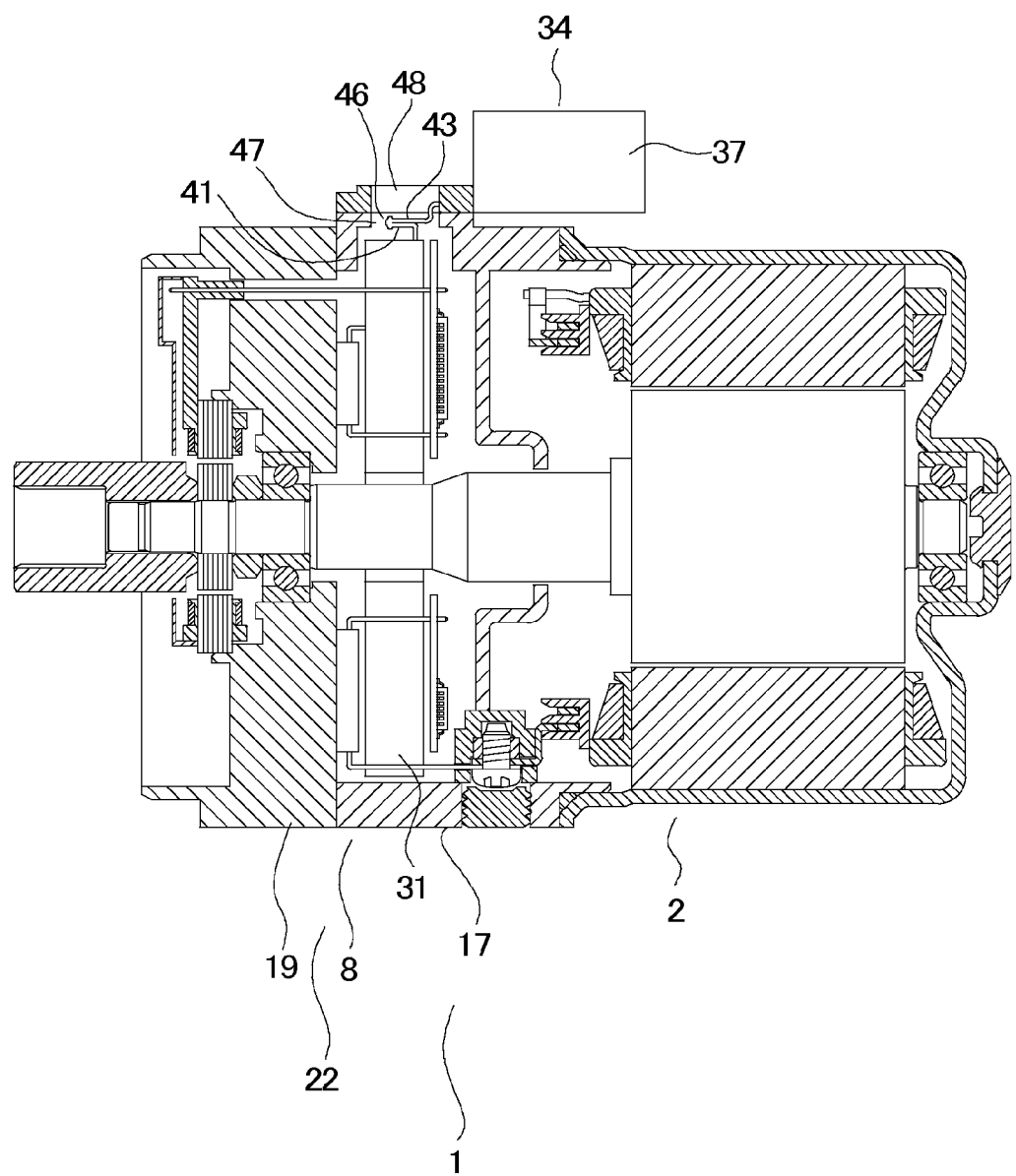
FIG. 10 is an axially cross-sectional view showing a drive-device-integrated rotating electrical machine of Embodiment 2 of the invention.
Figure 11:
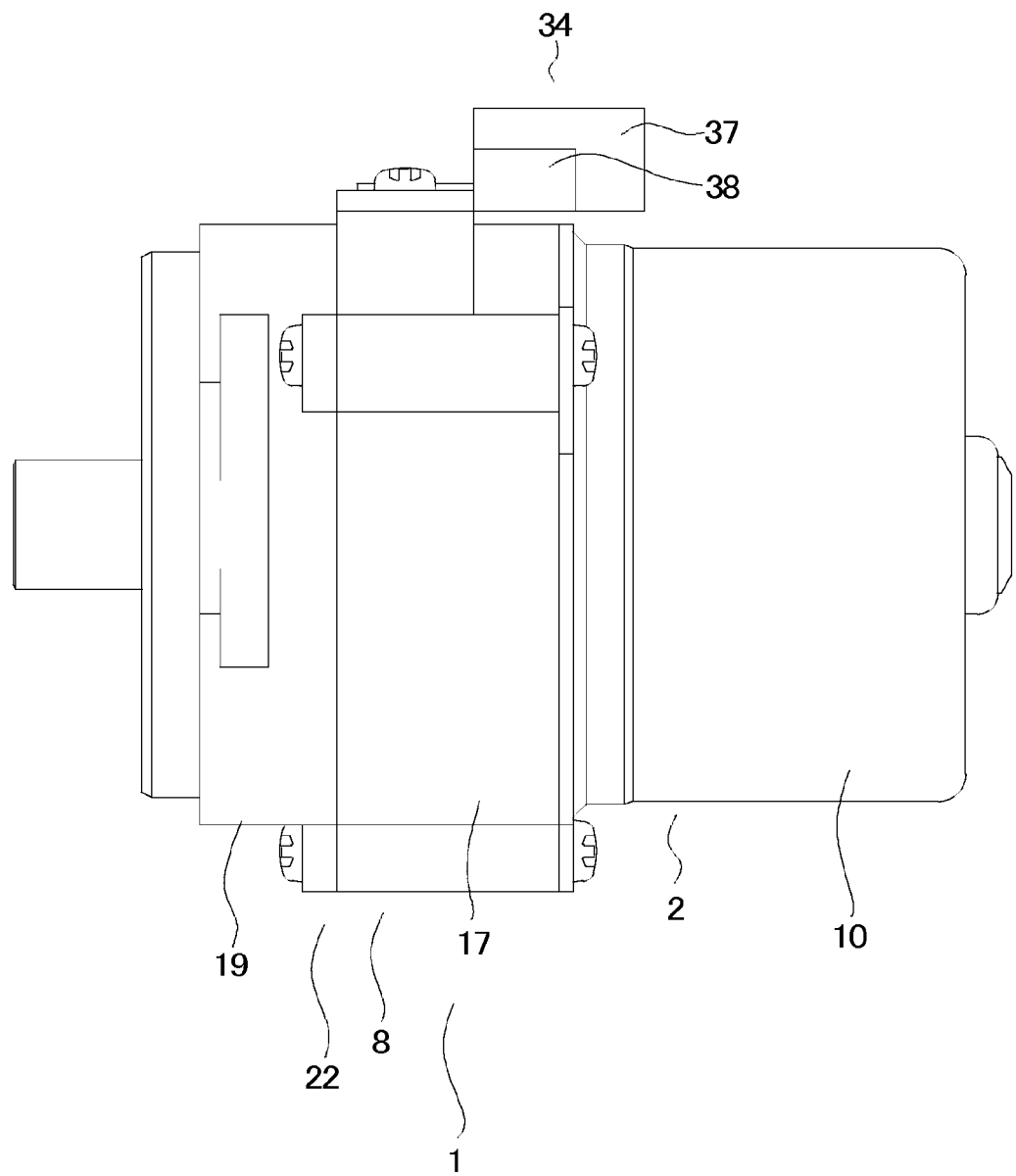
FIG. 11 is a side view showing the drive-device-integrated rotating electrical machine of Embodiment 2 of the invention.
Figure 12:
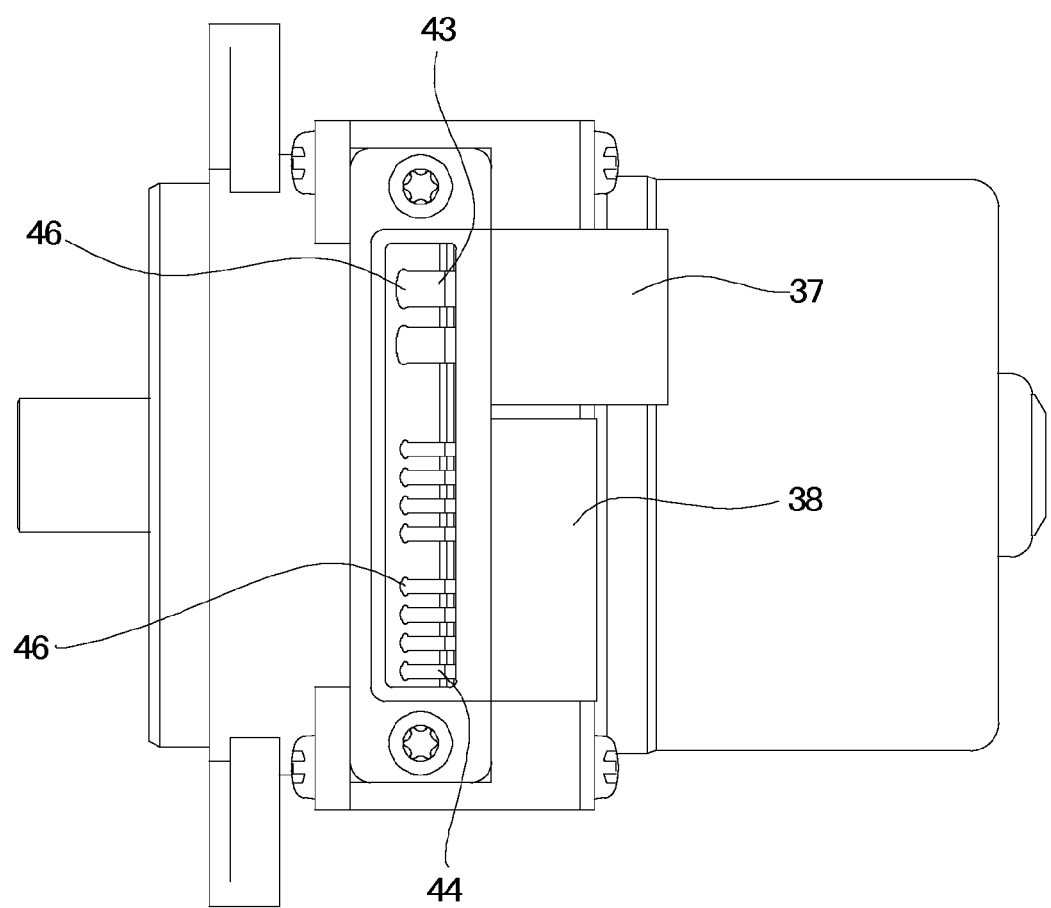
FIG. 12 is a top view showing the drive-device-integrated rotating electrical machine of Embodiment 2 of the invention.
Figure 13:
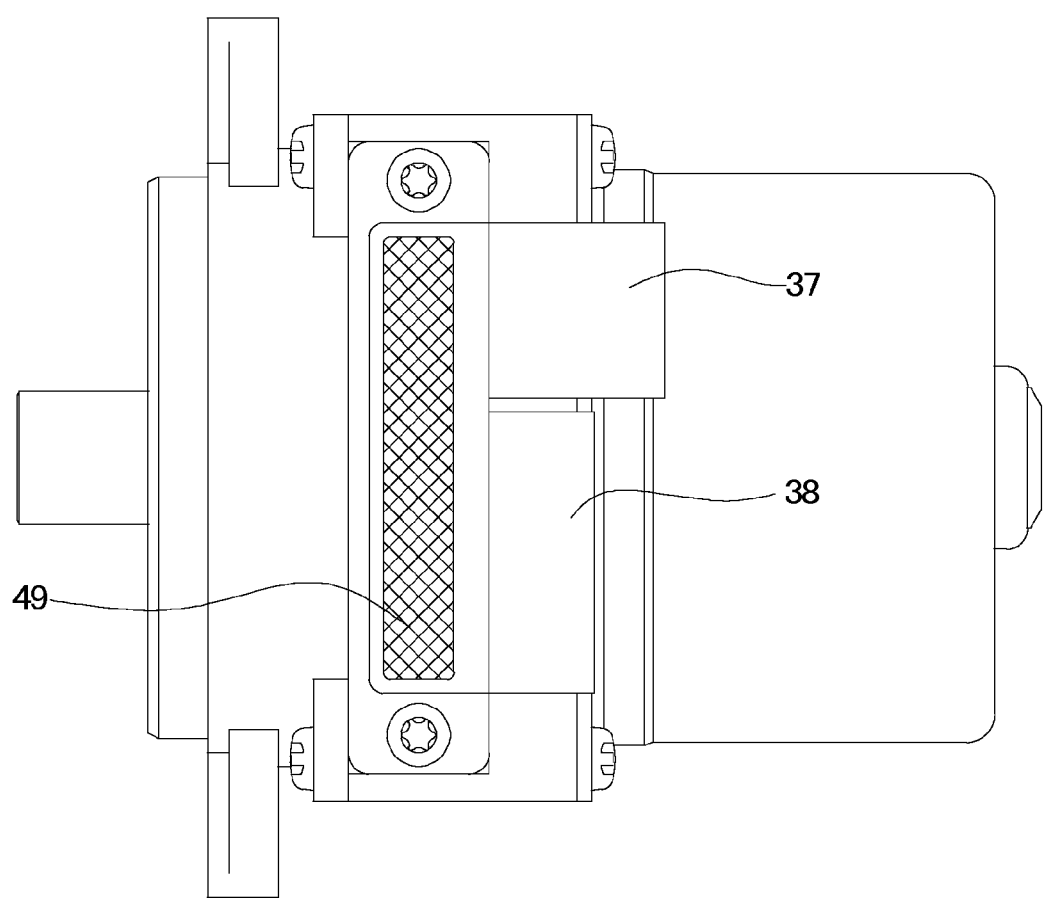
FIG. 13 is a top view showing a sealed state of an opening portion of the drive-device-integrated rotating electrical machine of Embodiment 2 of the invention.
Figure 14:
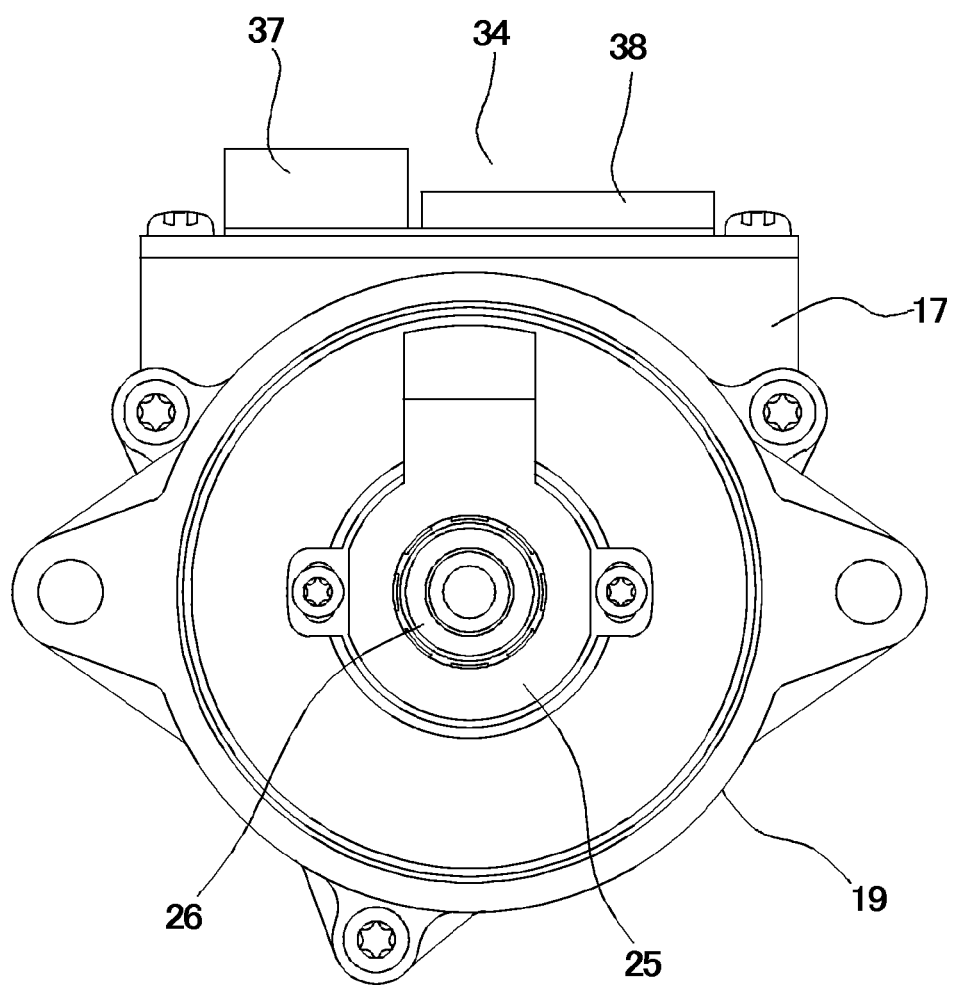
FIG. 14 is a front view showing the drive-device-integrated rotating electrical machine of Embodiment 2 of the invention.
Figure 15:
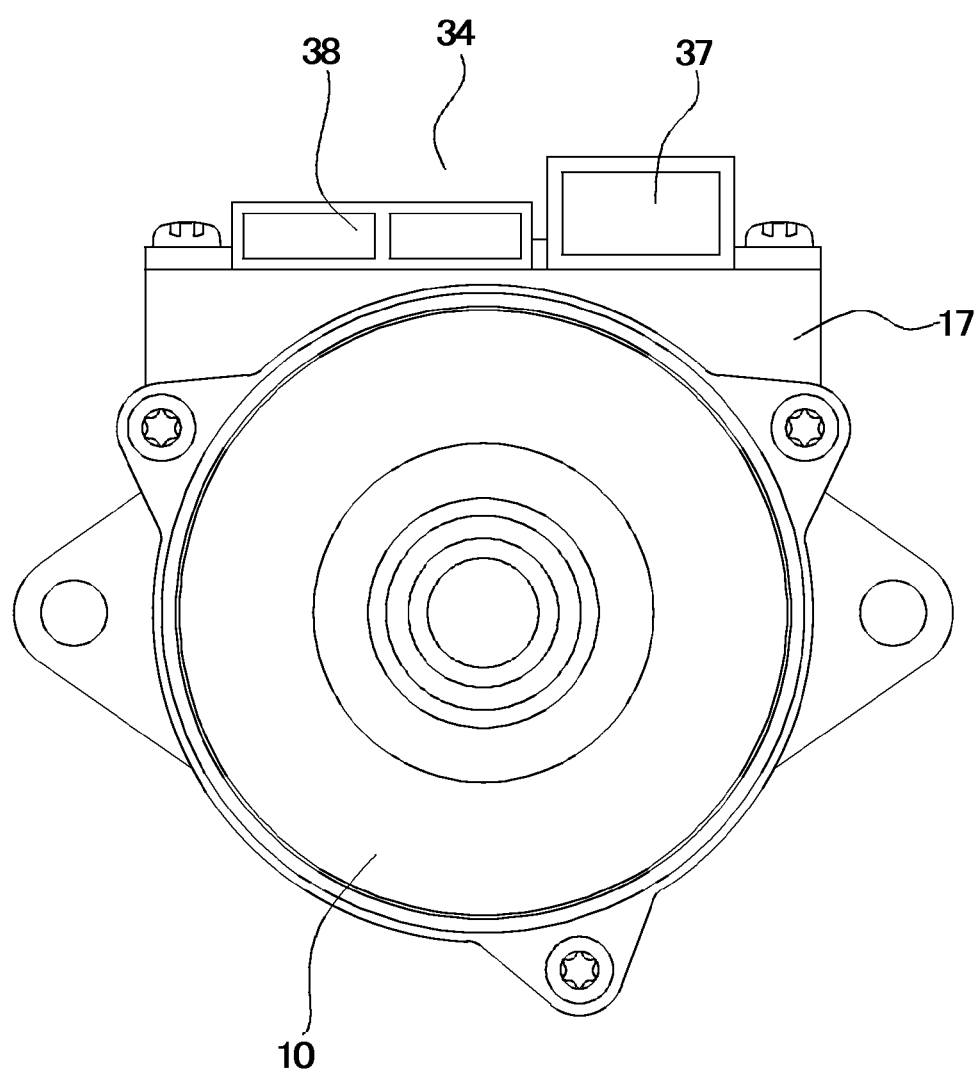
FIG. 15 is a rear view showing the drive-device-integrated rotating electrical machine of Embodiment 2 of the invention.
Figure 16:
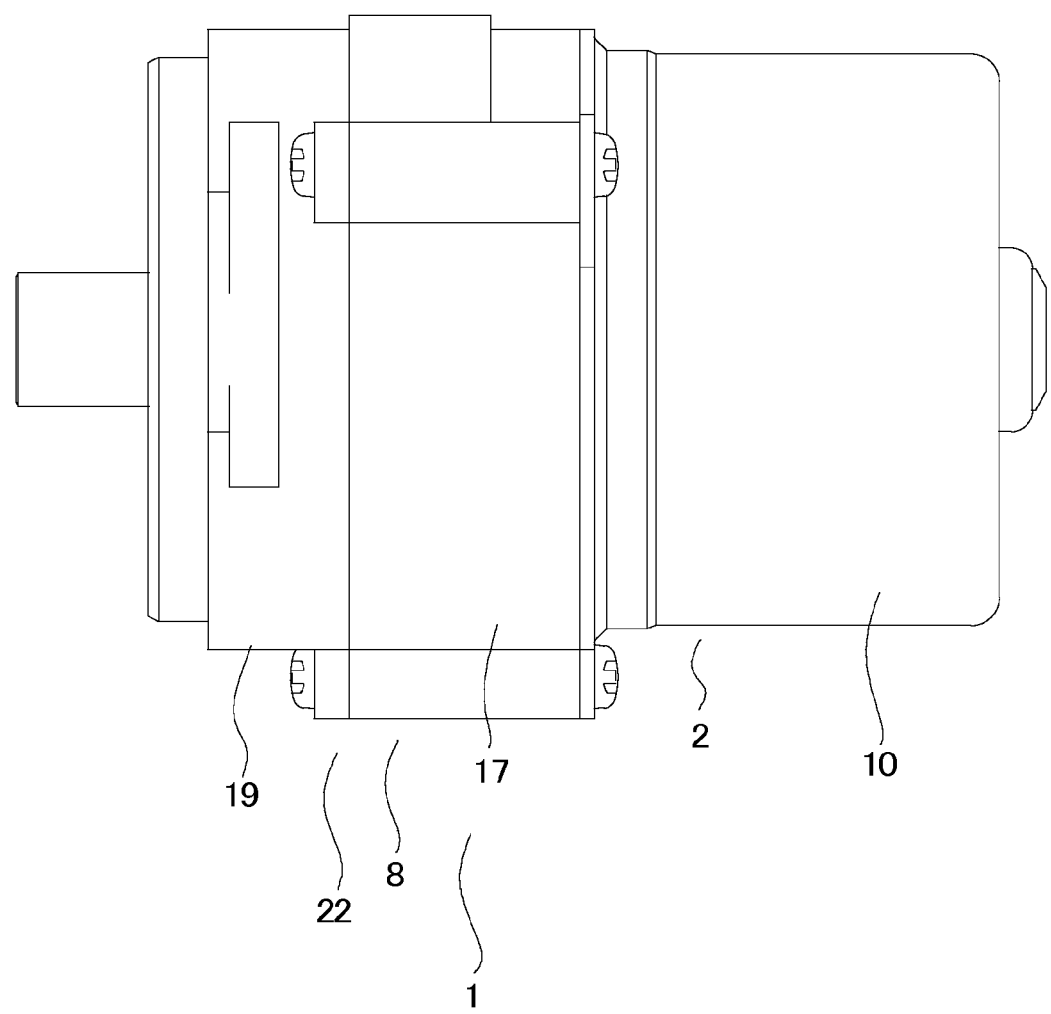
FIG. 16 is a side view showing the drive-device-integrated rotating electrical machine of Embodiment 2 of the invention, without a connector section.
Figure 17:
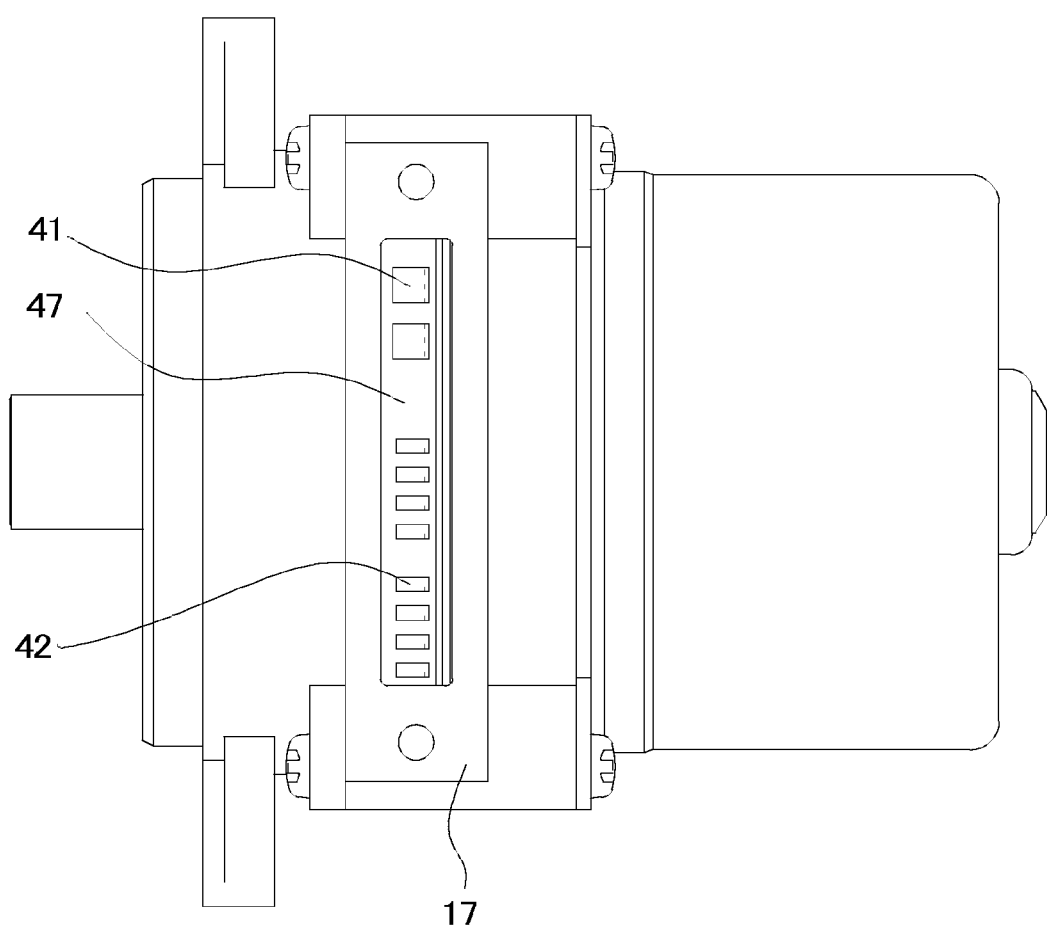
FIG. 17 is a top view showing the drive-device-integrated rotating electrical machine of Embodiment 2 of the invention, without a connector section.
Figure 18:
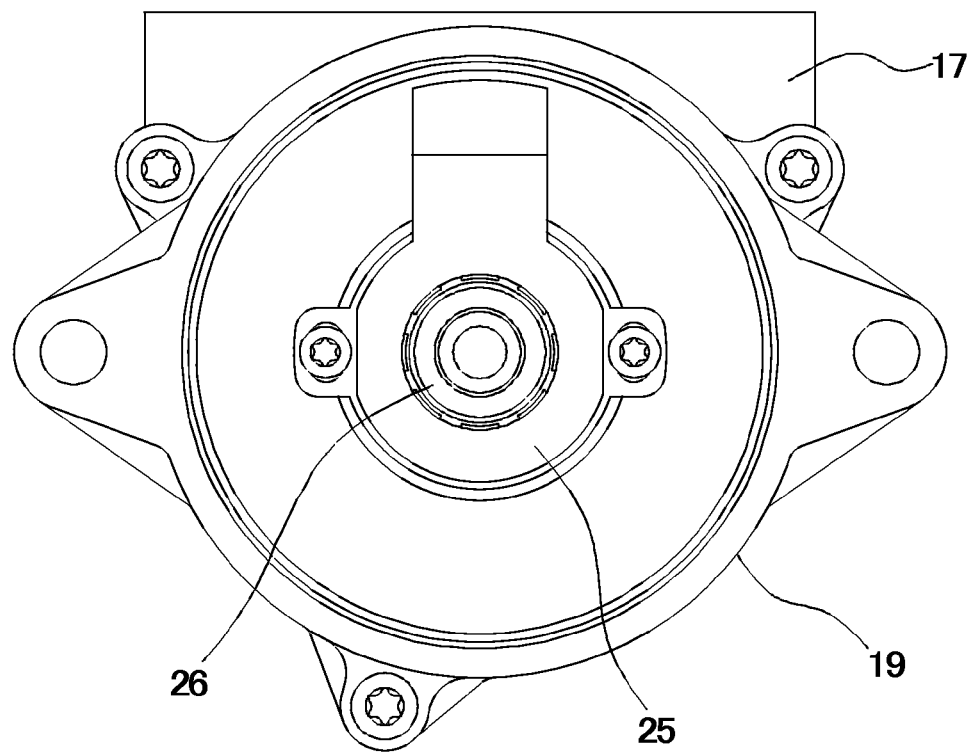
FIG. 18 is a front view showing the drive-device-integrated rotating electrical machine of Embodiment 2 of the invention, without a connector section.
Figure 19:
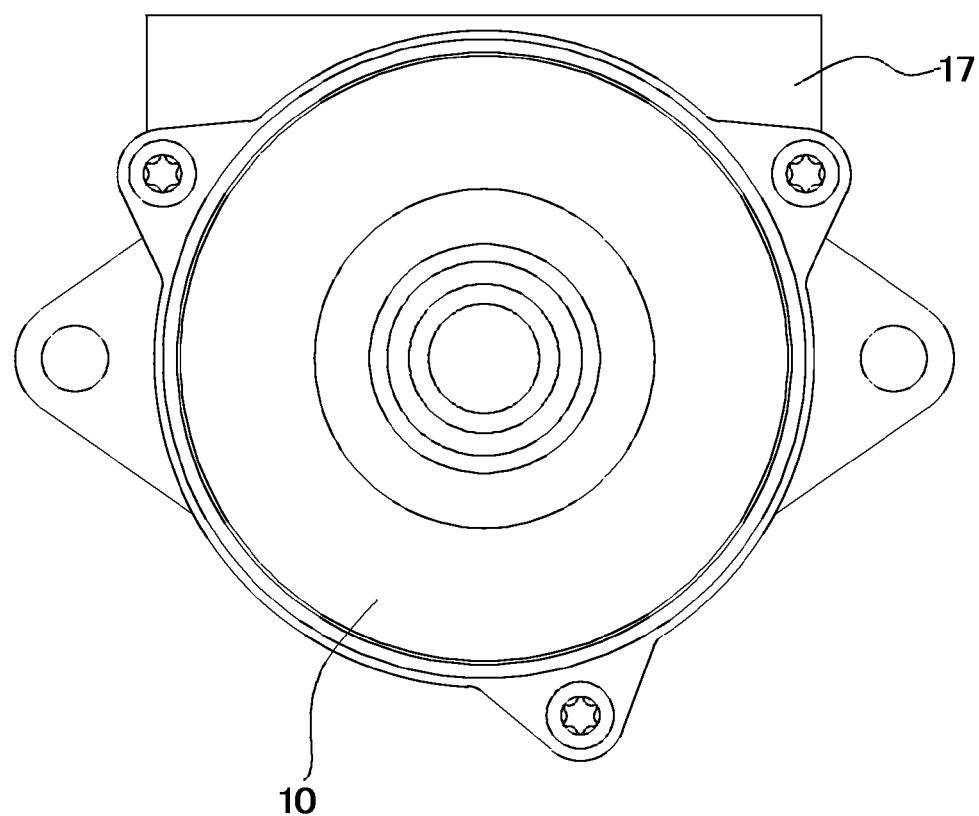
FIG. 19 is a rear view showing the drive-device-integrated rotating electrical machine of Embodiment 2 of the invention, without a connector section.

FIG. 10 is an axially cross-sectional view showing a drive-device-coaxially-integrated rotating electrical machine of Embodiment 2 of the invention. FIG. 11 is a side view showing the drive-device-coaxially-integrated rotating electrical machine of the same. FIG. 12 is a top view showing the drive-device-coaxially-integrated rotating electrical machine of the same. FIG. 13 is a top view showing a sealed state of an opening portion of the drive-device-integrated rotating electrical machine of the same. FIG. 14 is a front view showing the drive-device-coaxially-integrated rotating electrical machine of the same. FIG. 15 is a rear view showing the drive-device-coaxially-integrated rotating electrical machine of the same. FIG. 16 is a side view showing the drive-device-coaxially-integrated rotating electrical machine of the same, without a connector section. FIG. 17 is a top view showing the drive-device-coaxially-integrated rotating electrical machine of the same, without a connector section. FIG. 18 is a front view showing the drive-device-coaxially-integrated rotating electrical machine of the same, without a connector section. FIG. 19 is a rear view showing the drive-device-coaxially-integrated rotating electrical machine of the same, without a connector section.

As compared to Embodiment 1, the drive-device-coaxially-integrated rotating electrical machine of Embodiment 2 differs structurally in the below-described portions.

A housing 17 is provided, on its upper face, with a housing-side radial opening portion 47, which is a connector attachment portion. A connector section 34 is attached onto the housing-side radial opening portion 47, and the connector section 34 is provided with a power connector 37 and a signal connector 38.

No opening portion is formed on a heat sink 19, resulting in the opening portion singly provided on a drive-device storing section 22.

The connector section 34 is provided, on its portion facing opposite to the housing-side radial opening portion 47, with a connector opening portion 48, and in the connector opening portion 48, power connector terminals 43 extending from the power connector 37 and signal connector terminals 44 extending from the signal connector 38, are disposed. Power terminals 41 and signal terminals 42 that are extending from a terminal section are disposed in the housing-side radial opening portion 47, and the power terminals 41 and the signal terminals 42 are connected to the power connector terminals 43 and the signal connector terminals 44, respectively, in the housing-side radial opening portion 47.

The connector opening portion 48 is sealed with a sealing resin 49 so as to cover a connector-connecting portion 46 including connecting portions between the power terminals 41 and the power connector terminals 43 and connecting portions between the signal terminals 42 and the signal connector terminals 44.

It is noted that a cover of discrete part may be used in place of the sealing resin.

According to the drive-device-coaxially-integrated rotating electrical machine of Embodiment 2 of the invention configured as described above, since the connector section 34 is attached onto the housing-side radial opening portion 47 of the drive-device storing section 22, it is possible to easily replace the connector section 34. Further, it is possible to replace solely the connector section 34 while commonly using the device drive 8.

Further, by simply changing the attaching direction of the connector section 34, it is possible to change the direction of the power connector 37 and the signal connector 38, to that toward the output shaft side or that toward the non-output shaft side of the rotating electrical machine.

Furthermore, since the drive-device storing section 22 requires only one opening portion, the configuration becomes simplified.

Embodiment 3

Figure 20:
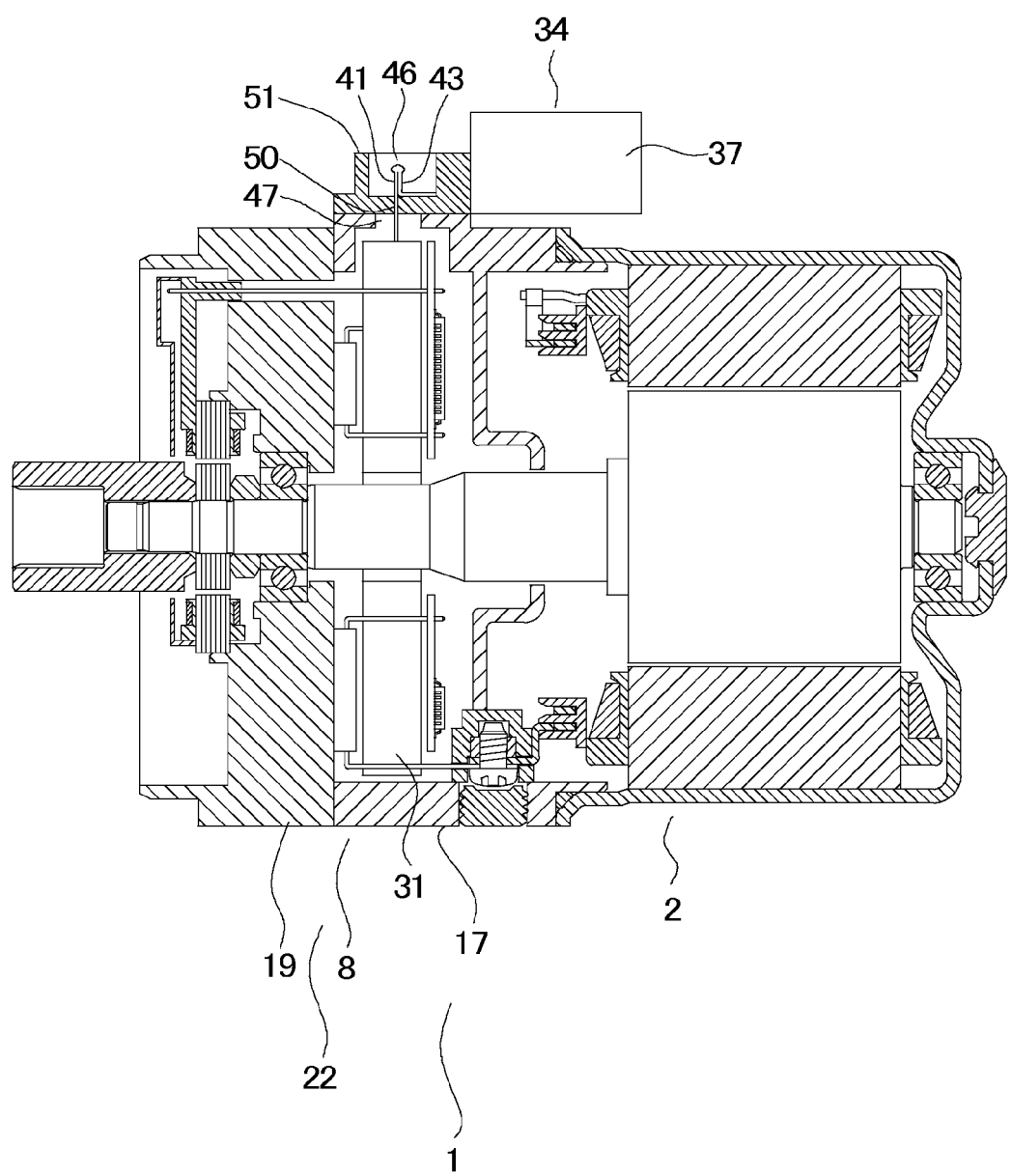
FIG. 20 is an axially cross-sectional view showing a drive-device-integrated rotating electrical machine of Embodiment 3 of the invention.
Figure 21:
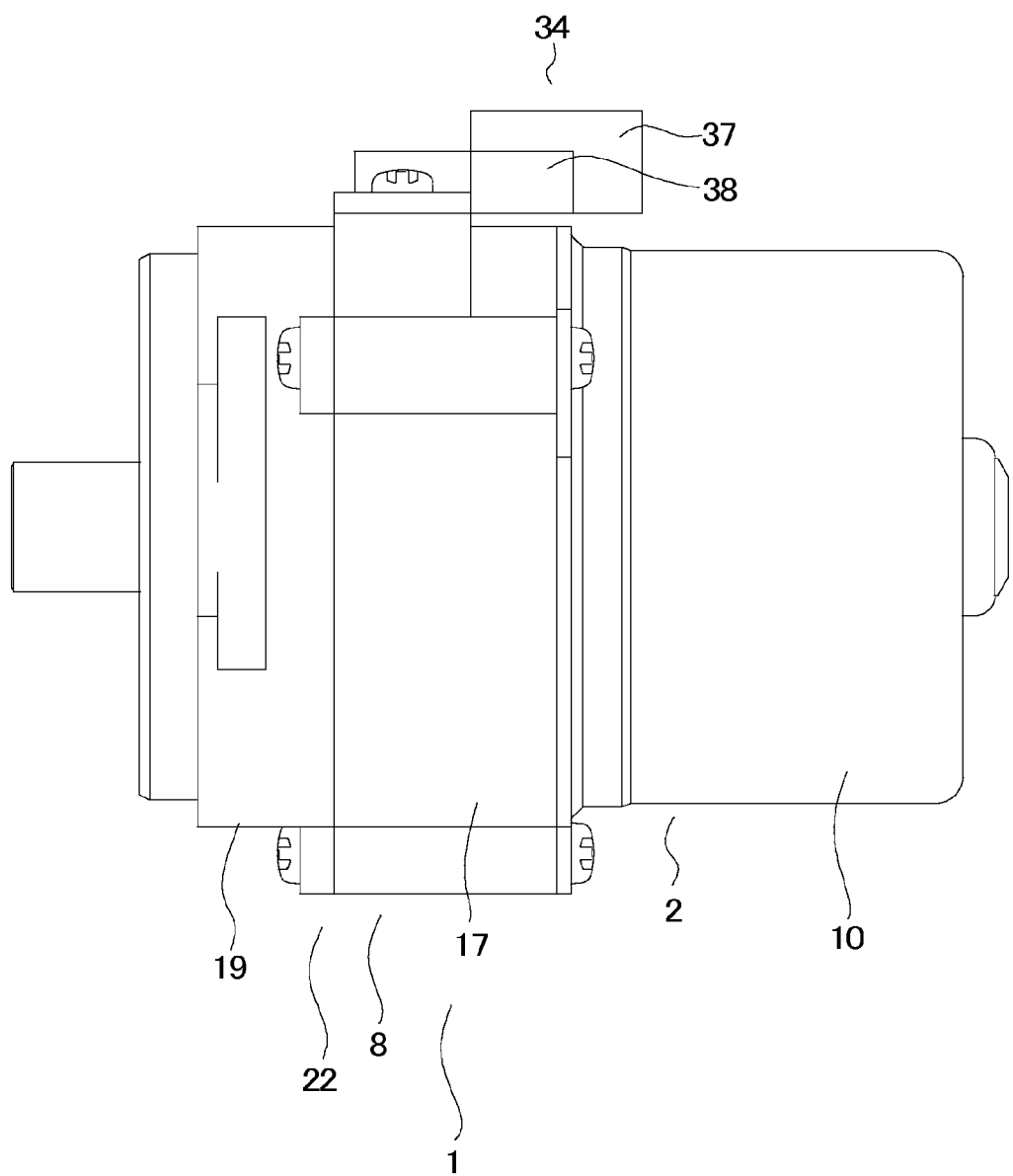
FIG. 21 is a side view showing the drive-device-integrated rotating electrical machine of Embodiment 3 of the invention.
Figure 22:
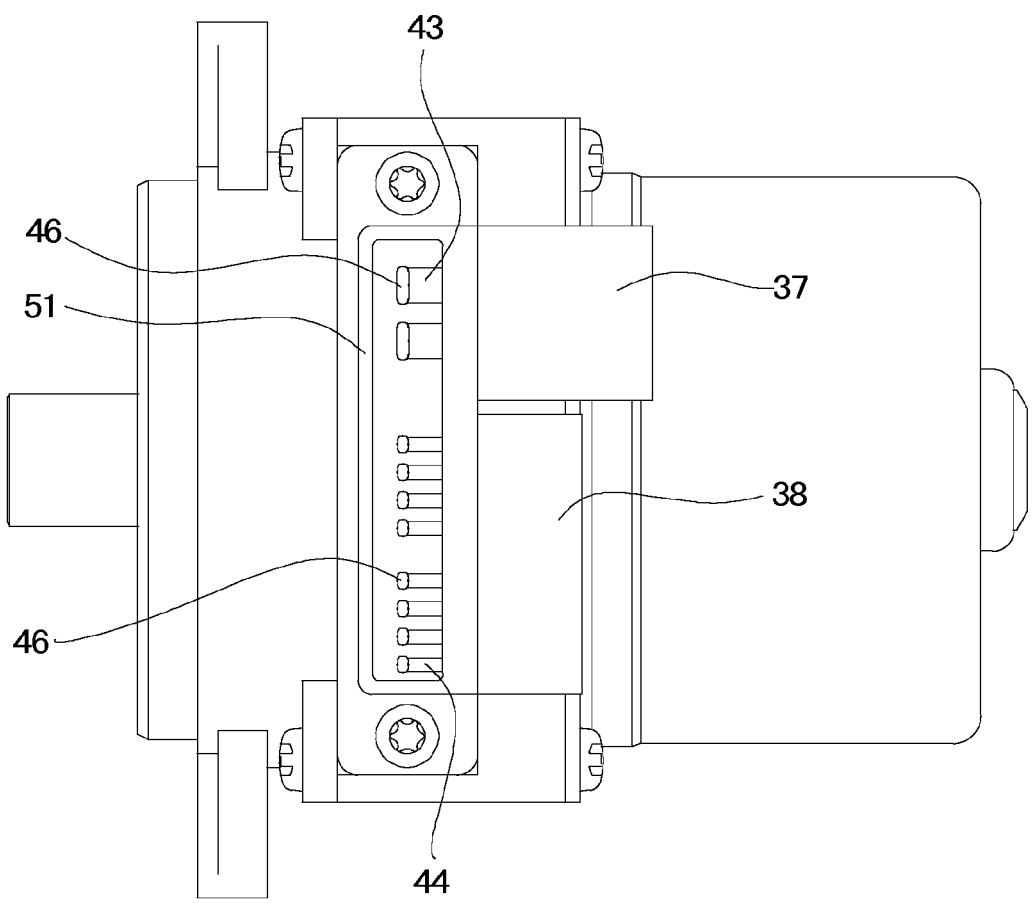
FIG. 22 is a top view showing the drive-device-integrated rotating electrical machine of Embodiment 3 of the invention.
Figure 23:
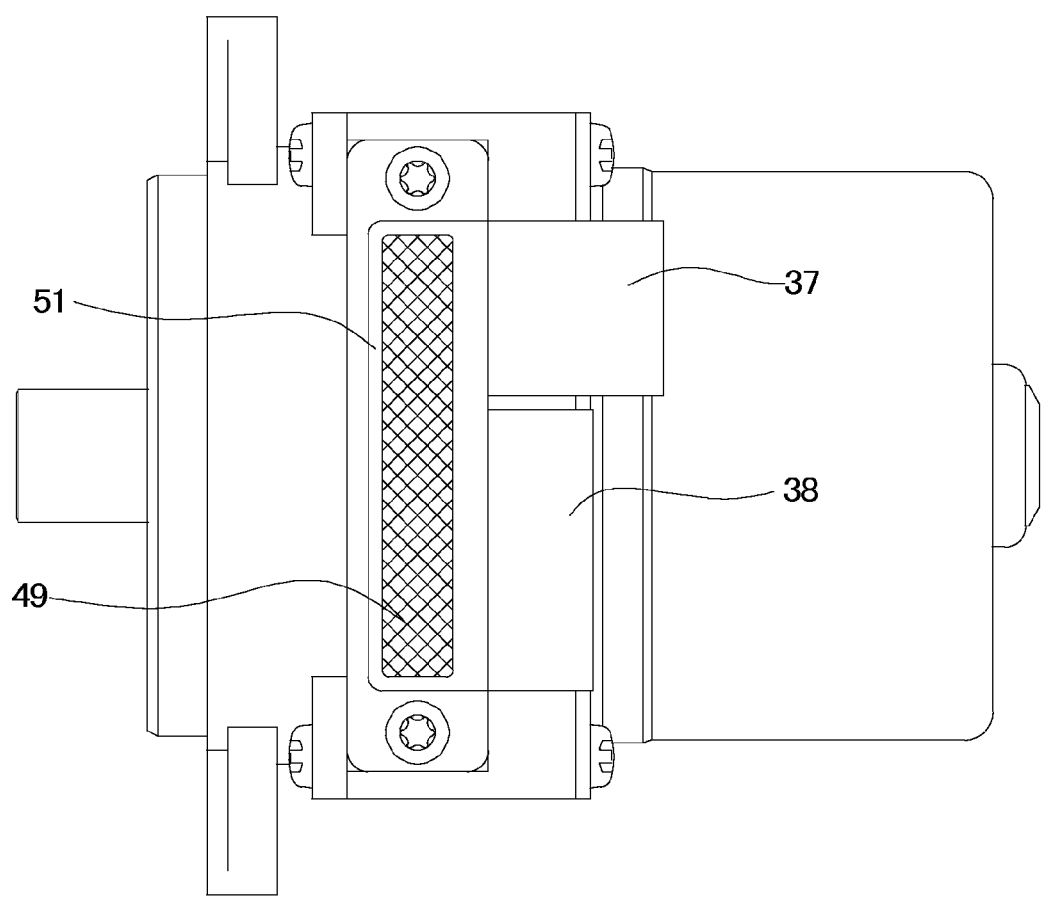
FIG. 23 is a top view showing a sealed state of an opening portion of the drive-device-integrated rotating electrical machine of Embodiment 3 of the invention.
Figure 24:
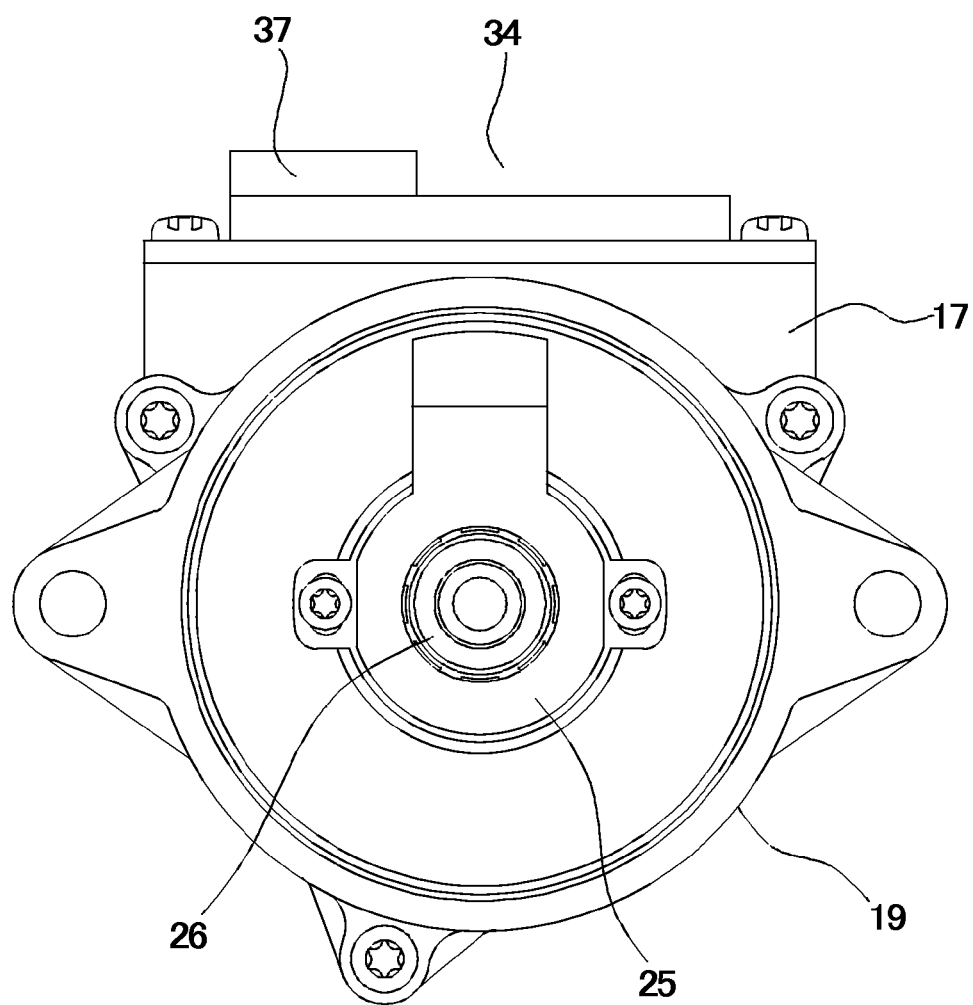
FIG. 24 is a front view showing the drive-device-integrated rotating electrical machine of Embodiment 3 of the invention.
Figure 25:
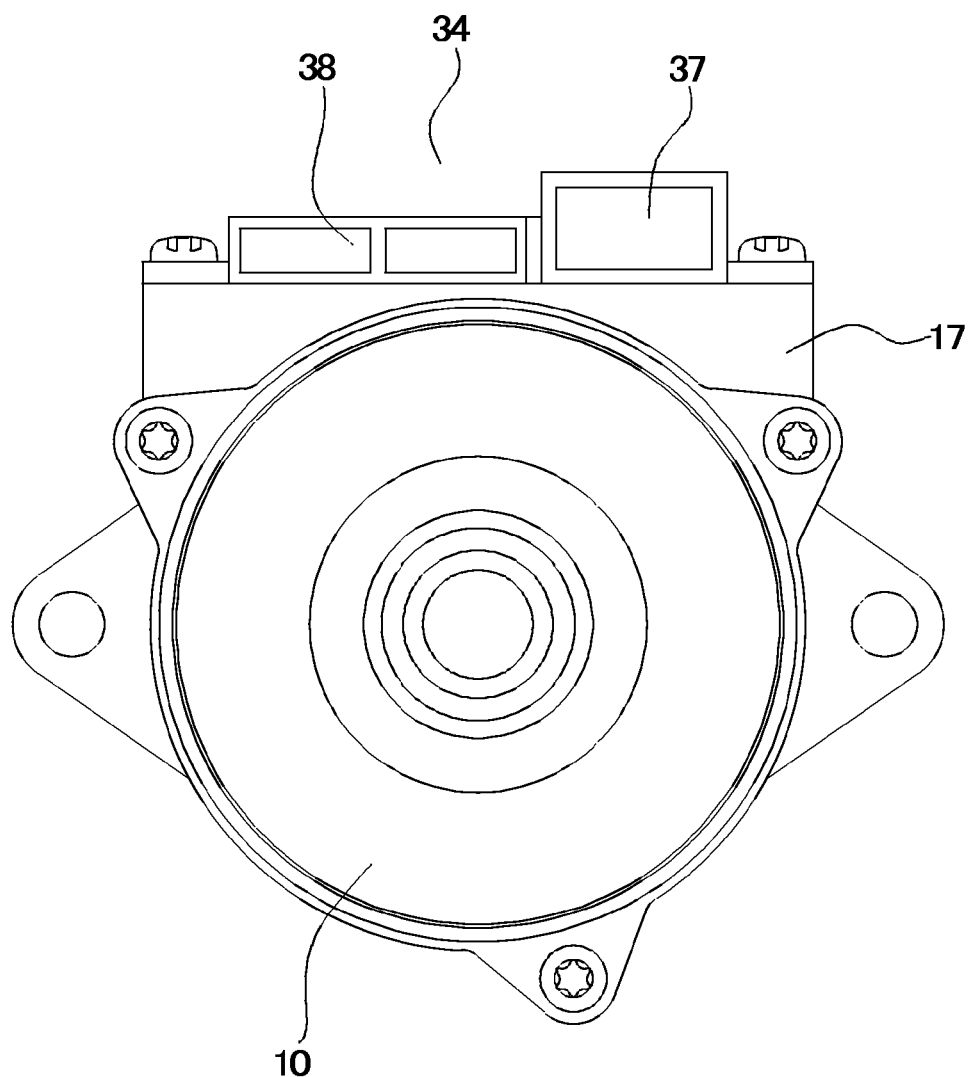
FIG. 25 is a rear view showing the drive-device-integrated rotating electrical machine of Embodiment 3 of the invention.
Figure 26:
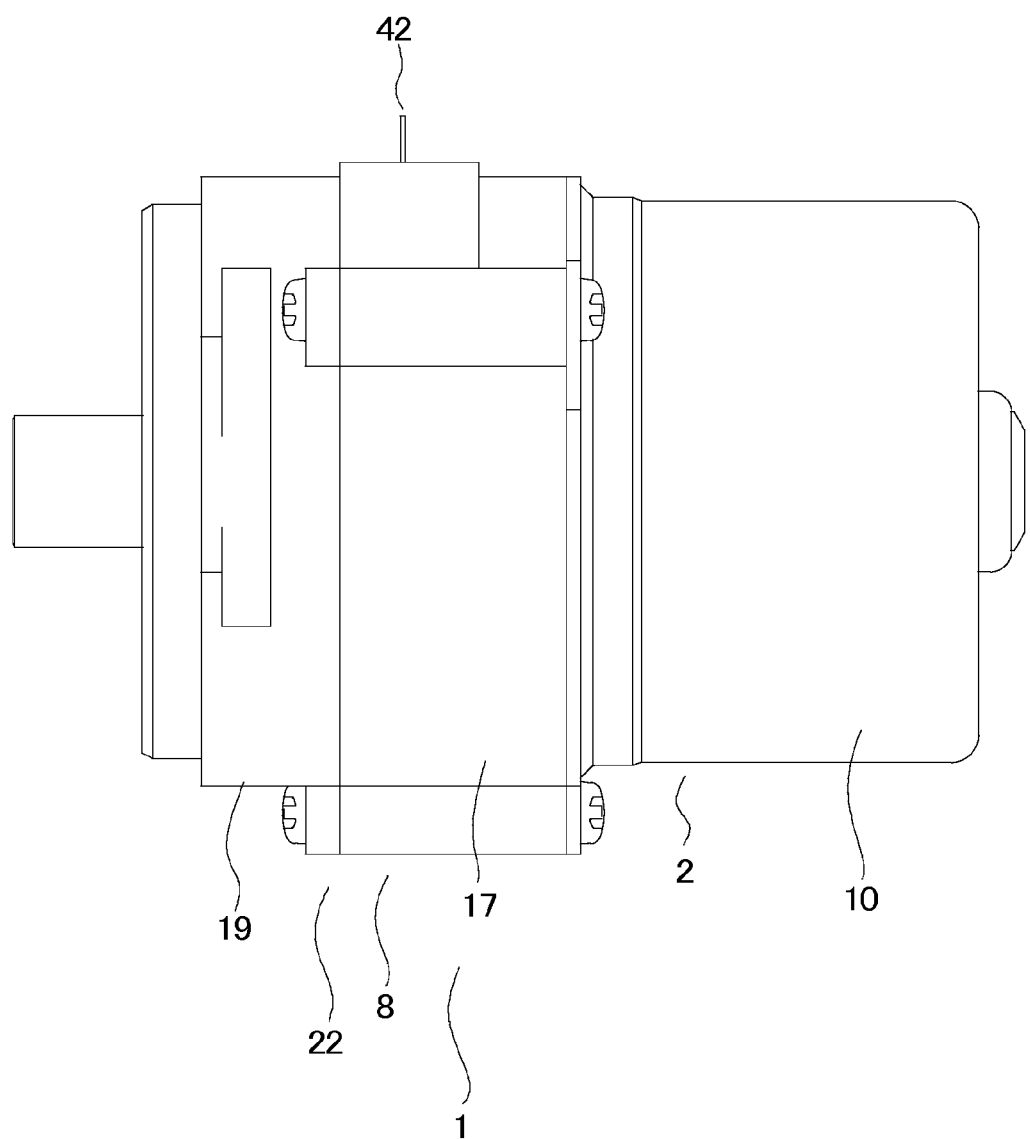
FIG. 26 is a side view showing the drive-device-integrated rotating electrical machine of Embodiment 3 of the invention, without a connector section.
Figure 27:
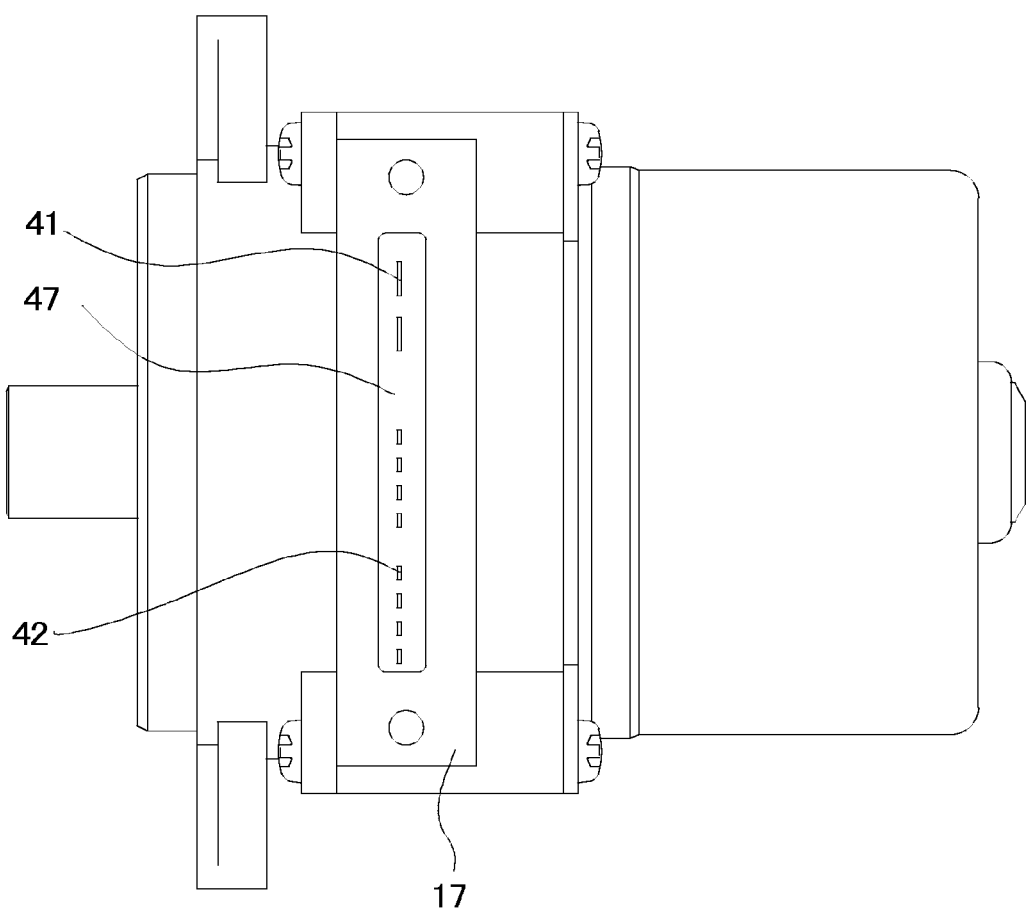
FIG. 27 is a top view showing the drive-device-integrated rotating electrical machine of Embodiment 3 of the invention, without a connector section.
Figure 28:
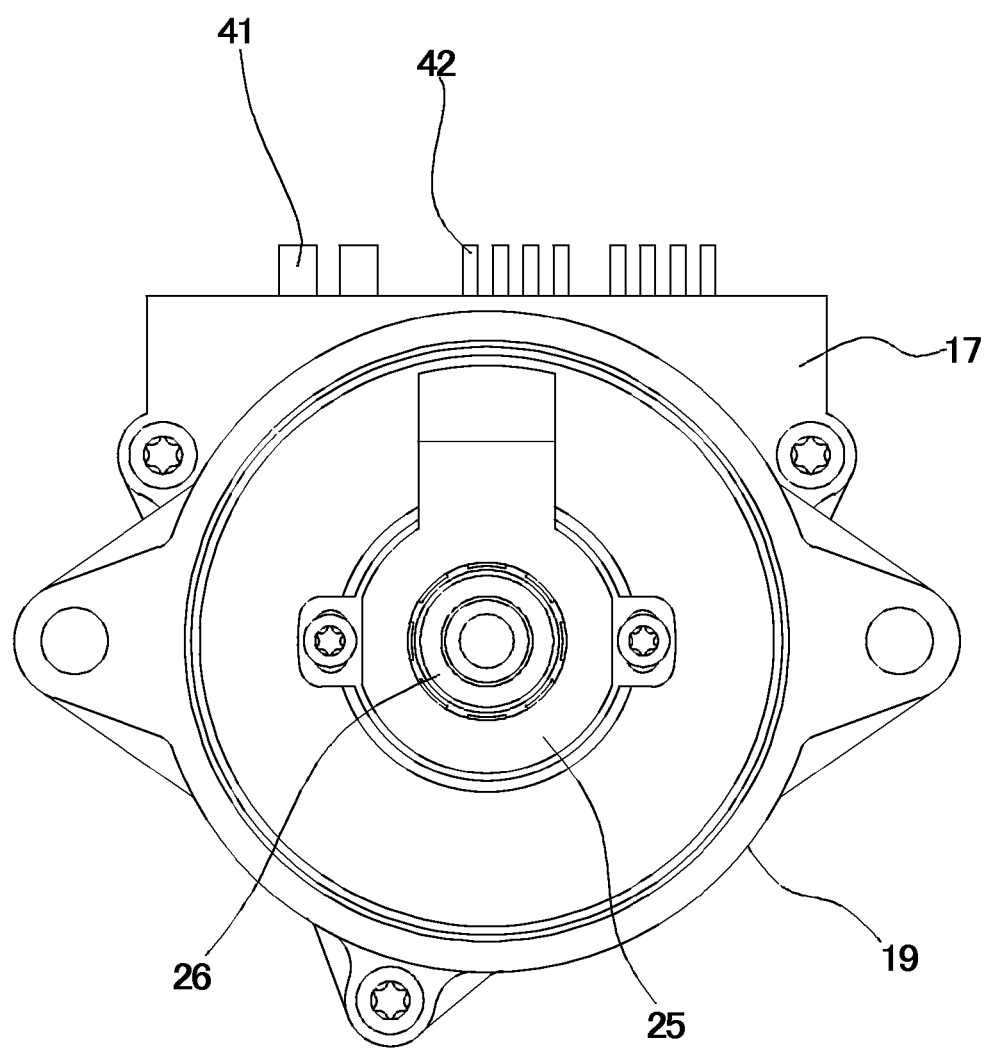
FIG. 28 is a front view showing the drive-device-integrated rotating electrical machine of Embodiment 3 of the invention, without a connector section.
Figure 29:
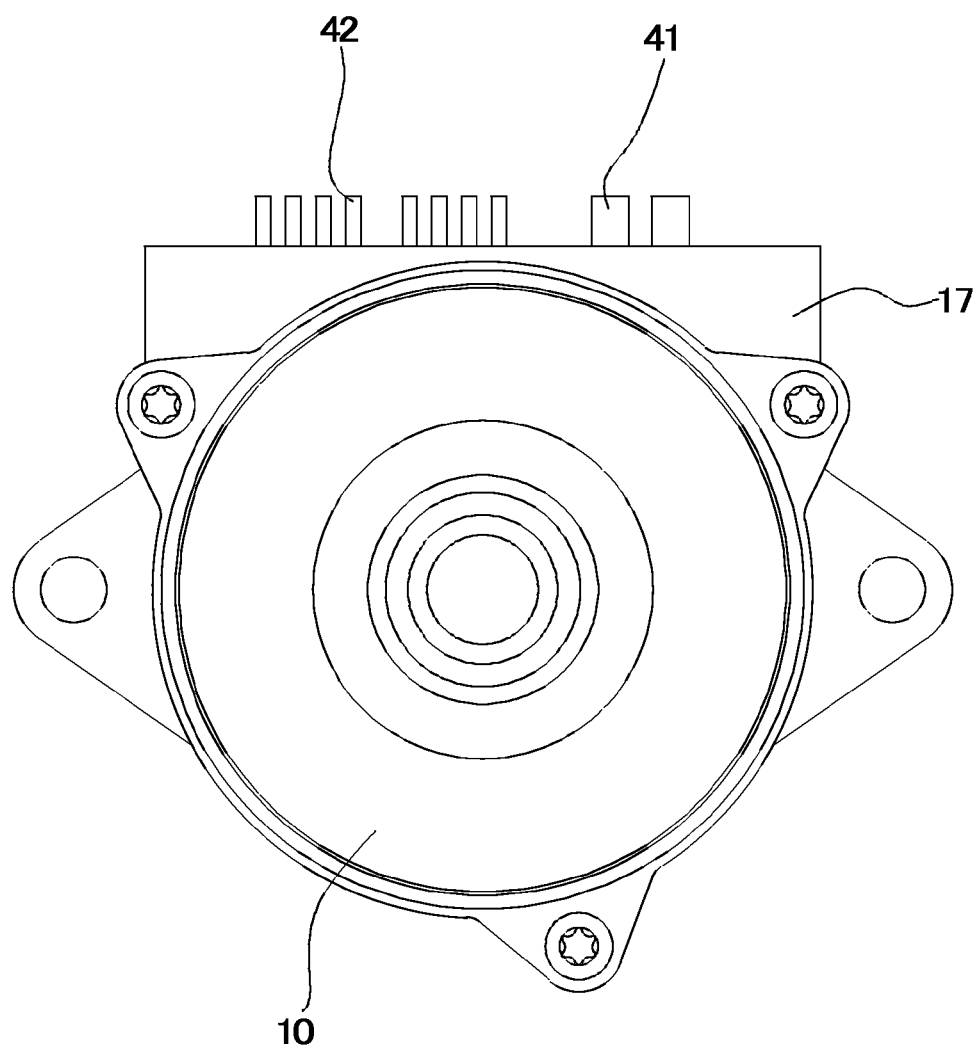
FIG. 29 is a rear view showing the drive-device-integrated rotating electrical machine of Embodiment 3 of the invention, without a connector section.

FIG. 20 is an axially cross-sectional view showing a drive-device-coaxially-integrated rotating electrical machine of Embodiment 3 of the invention. FIG. 21 is a side view showing the drive-device-coaxially-integrated rotating electrical machine of the same. FIG. 22 is a top view showing the drive-device-coaxially-integrated rotating electrical machine of the same. FIG. 23 is a top view showing a sealed state of an opening portion of the drive-device-integrated rotating electrical machine of the same. FIG. 24 is a front view showing the drive-device-coaxially-integrated rotating electrical machine of the same. FIG. 25 is a rear view showing the drive-device-coaxially-integrated rotating electrical machine of the same. FIG. 26 is a side view showing the drive-device-coaxially-integrated rotating electrical machine of the same, without a connector section. FIG. 27 is a top view showing the drive-device-coaxially-integrated rotating electrical machine of the same, without a connector section. FIG. 28 is a front view showing the drive-device-coaxially-integrated rotating electrical machine of the same, without a connector section. FIG. 29 is a rear view showing the drive-device-coaxially-integrated rotating electrical machine of the same, without a connector section.

As compared to Embodiment 1, the drive-device-coaxially-integrated rotating electrical machine of Embodiment 3 differs structurally in the below-described portions.

A housing 17 is provided, on its upper face, with a housing-side radial opening portion 47, which is a connector attachment portion. A connector section 34 is attached onto the housing-side radial opening portion 47, and the connector section 34 is provided with a power connector 37 and a signal connector 38.

No opening portion is formed on a heat sink 19, resulting in the opening portion singly provided on a drive-device storing section 22.

The connector section 34 is provided, in its portion facing opposite to the housing-side radial opening portion 47, with terminal through-holes 50 in which power terminals 41 and signal terminals 42 that are extending from the terminal section 31, are inserted so as to project therefrom. The power terminals 41 and the signal terminals 42 are connected to power connector terminals extending from the power connector 37 and signal connector terminals 44 extending from the signal connector 38, respectively, at above the terminal through-holes 50.

The connector section 34 is provided with a fringe portion 51 surrounding the terminal through-holes 50, and the inside of the fringe portion 51 is sealed with a sealing resin 49 so as to cover a connector-connecting portion 46 including connecting portions between the power terminals 41 and the power connector terminals 43 and connecting portions between the signal terminals 42 and the signal connector terminals 44.

It is noted that a cover of discrete part may be used in place of the sealing resin.

According to the drive-device-coaxially-integrated rotating electrical machine of Embodiment 3 of the invention configured as described above, since the connector section 34 is attached onto the housing-side radial opening portion 47 of the drive-device storing section 22, it is possible to easily replace the connector section 34. Further, it is possible to replace solely the connector section 34 while commonly using the device drive 8.

Further, by simply changing the attaching direction of the connector section 34, it is possible to change the direction of the power connector 37 and the signal connector 38, to that toward the output shaft side or that toward the non-output shaft side of the rotating electrical machine.

Furthermore, since the drive-device storing section 22 requires only one opening portion, the configuration becomes simplified. In addition, since the connector-connecting portion 46 is projected from the connector section 34, it is possible to easily connect the terminals.

Embodiment 4

Figure 30:
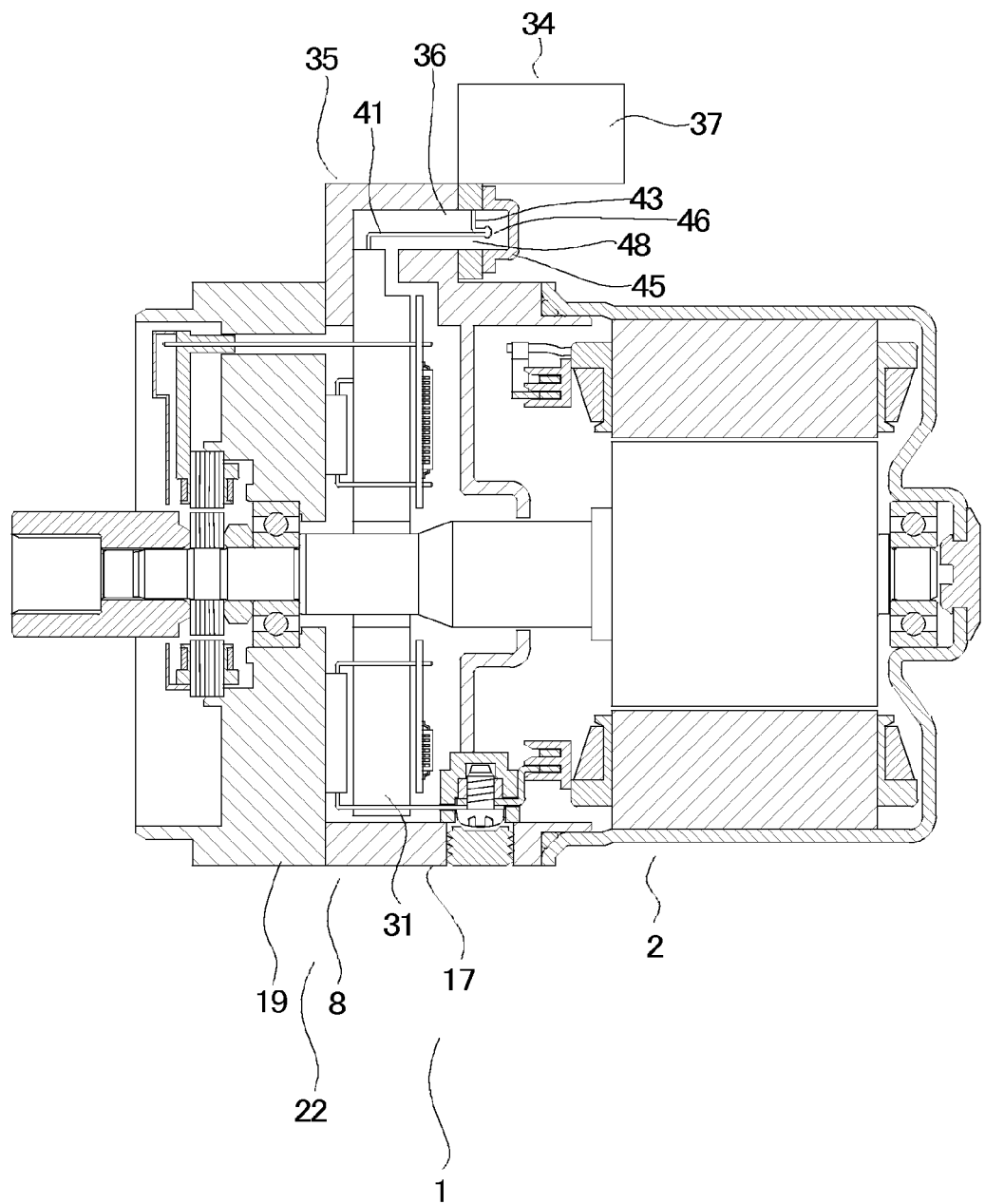
FIG. 30 is an axially cross-sectional view showing a drive-device-integrated rotating electrical machine of Embodiment 4 of the invention.
Figure 31:
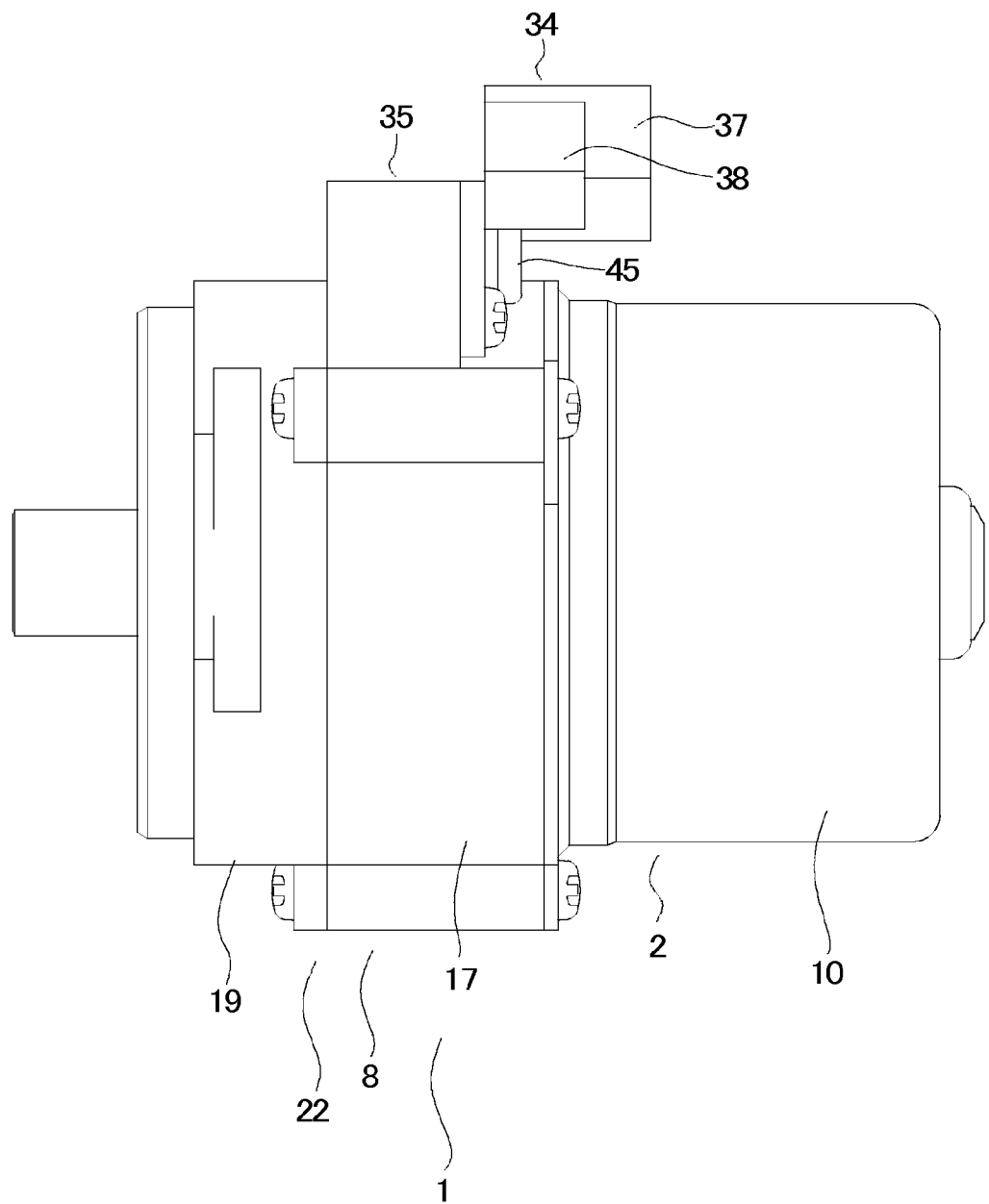
FIG. 31 is a side view showing the drive-device-integrated rotating electrical machine of Embodiment 4 of the invention.
Figure 32:
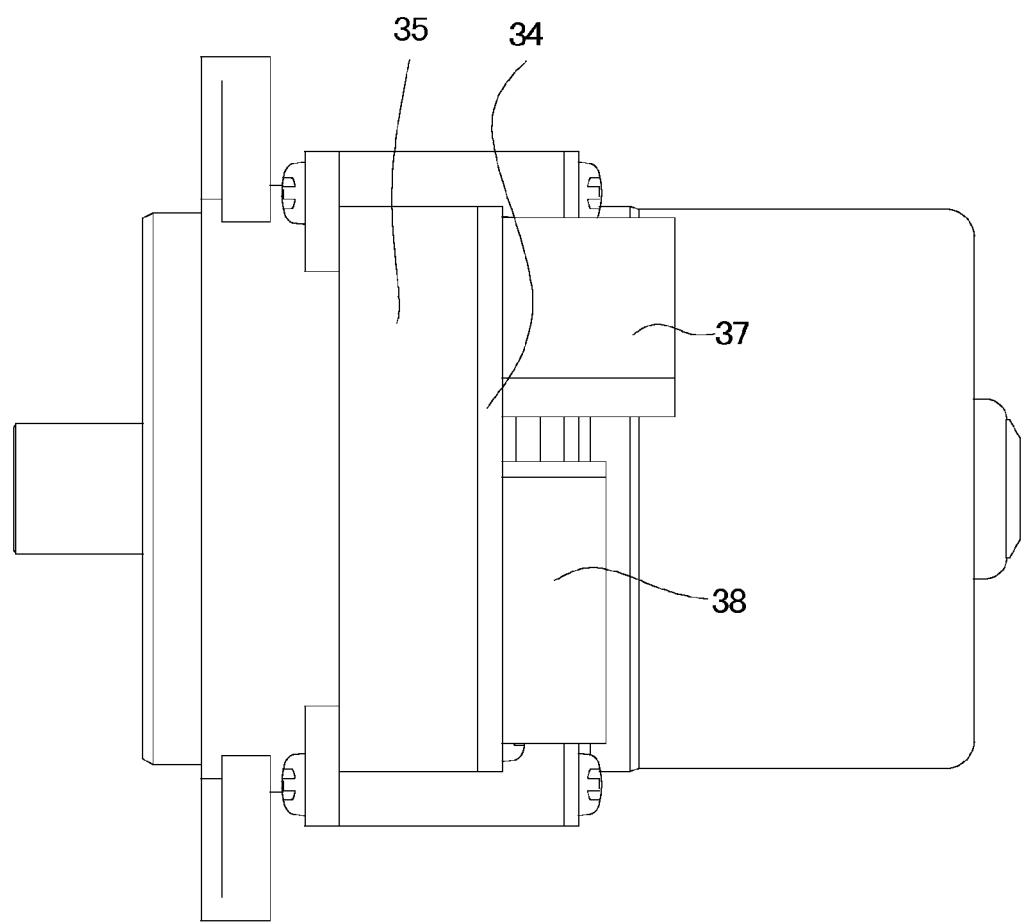
FIG. 32 is a top view showing the drive-device-integrated rotating electrical machine of Embodiment 4 of the invention.
Figure 33:
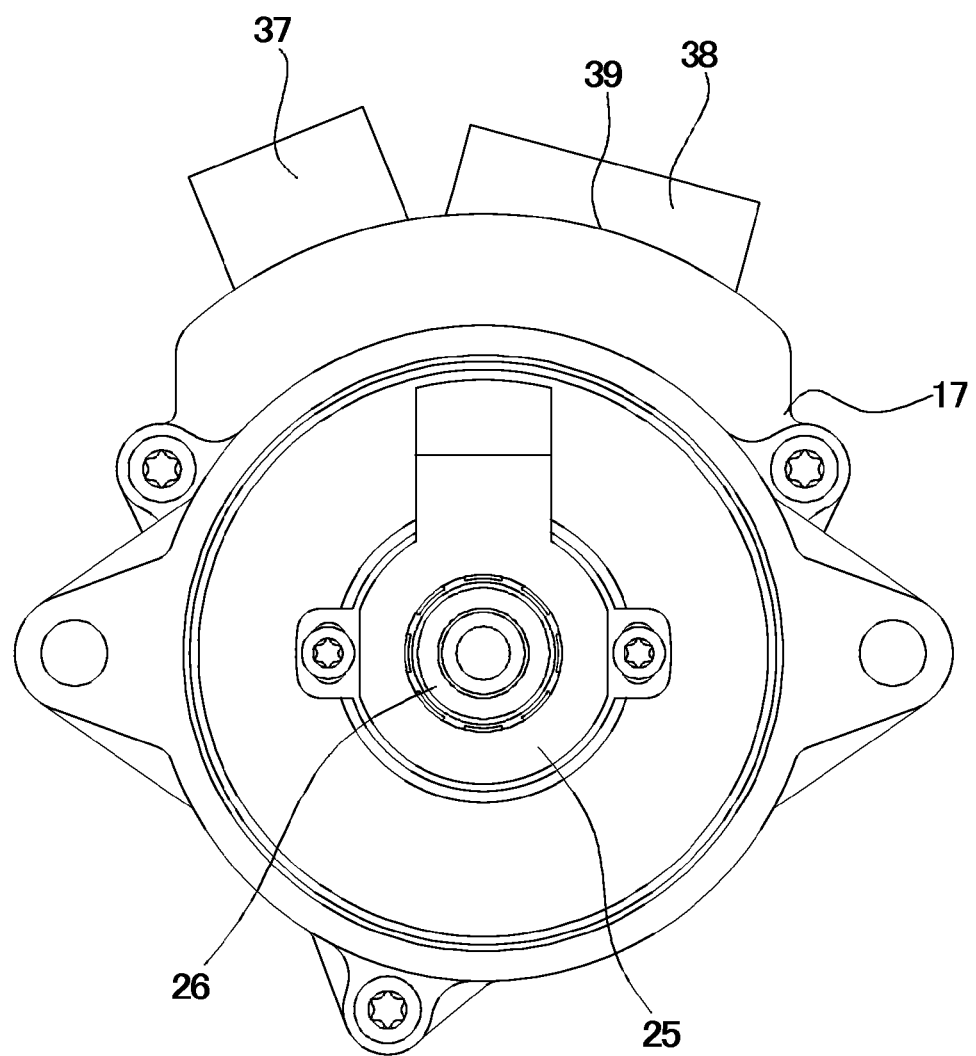
FIG. 33 is a front view showing the drive-device-integrated rotating electrical machine of Embodiment 4 of the invention.
Figure 34:
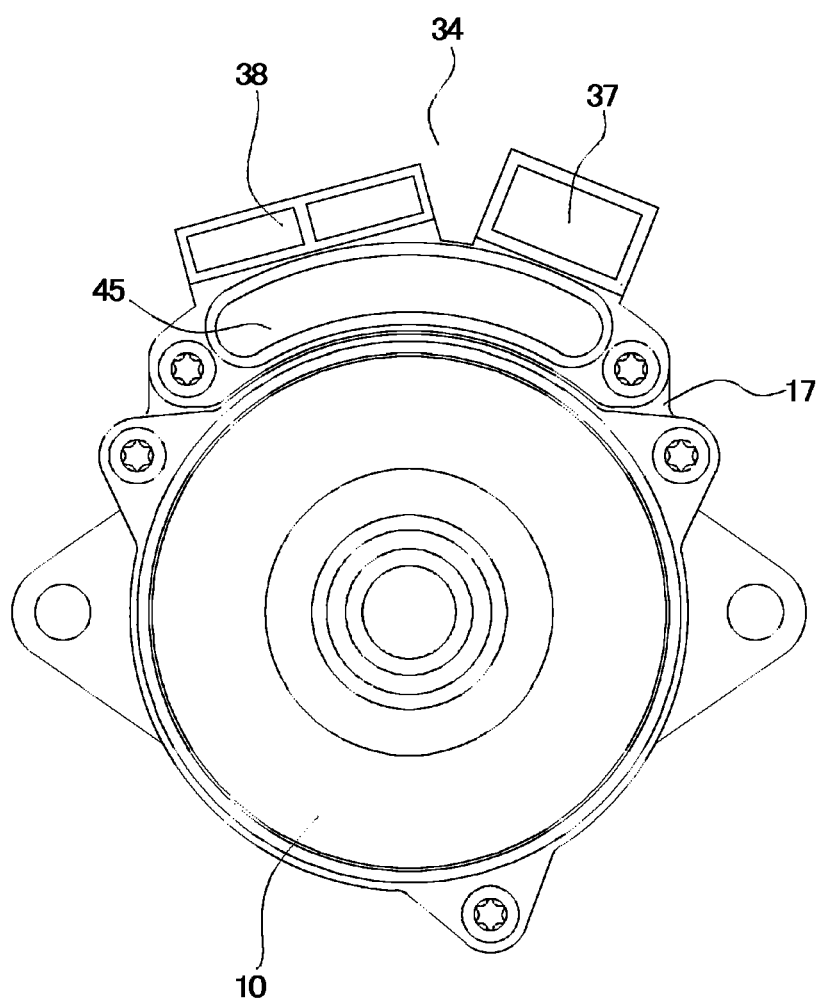
FIG. 34 is a rear view showing the drive-device-integrated rotating electrical machine of Embodiment 4 of the invention.
Figure 35:
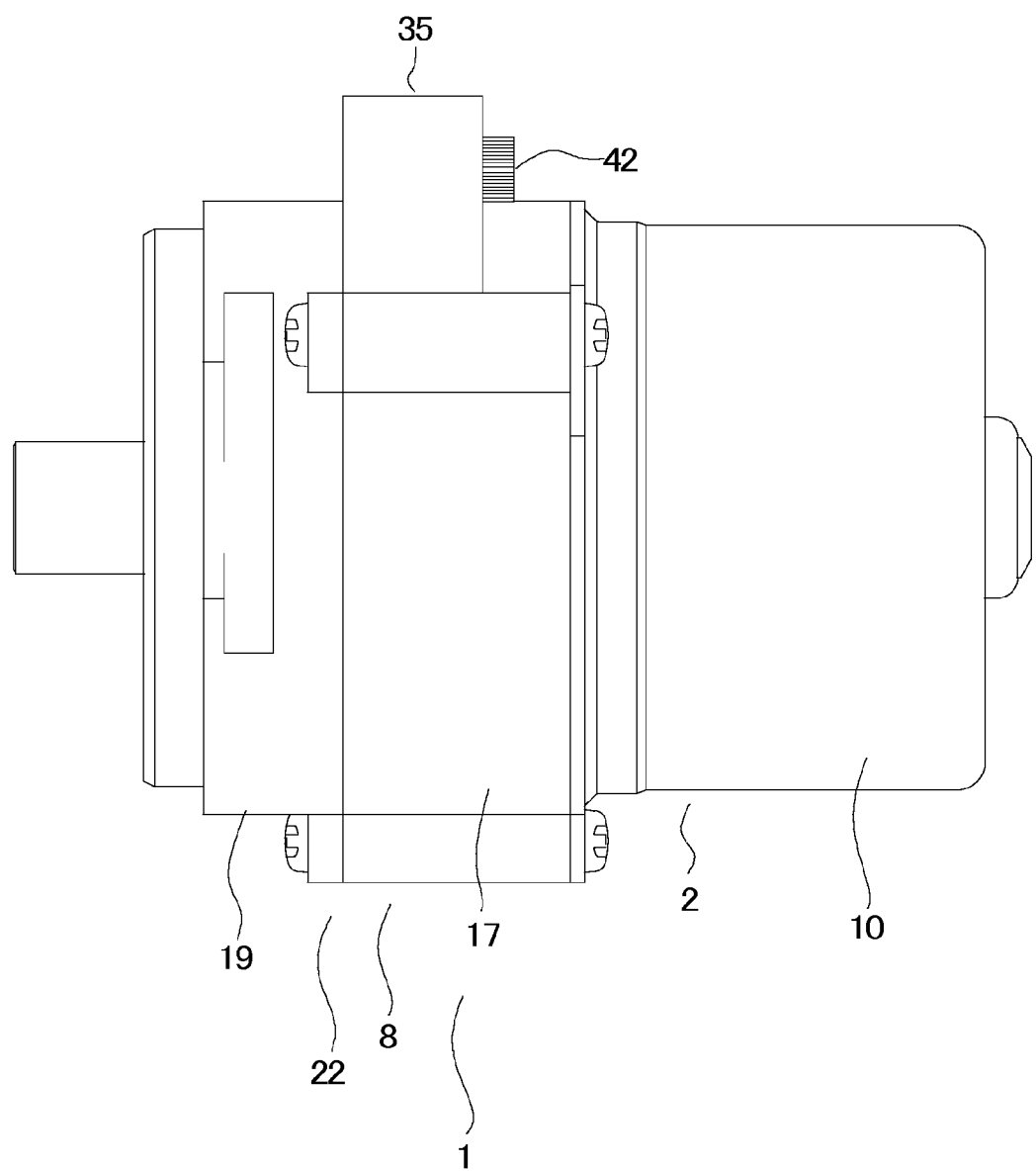
FIG. 35 is a side view showing the drive-device-integrated rotating electrical machine of Embodiment 4 of the invention, without a connector section.
Figure 36:
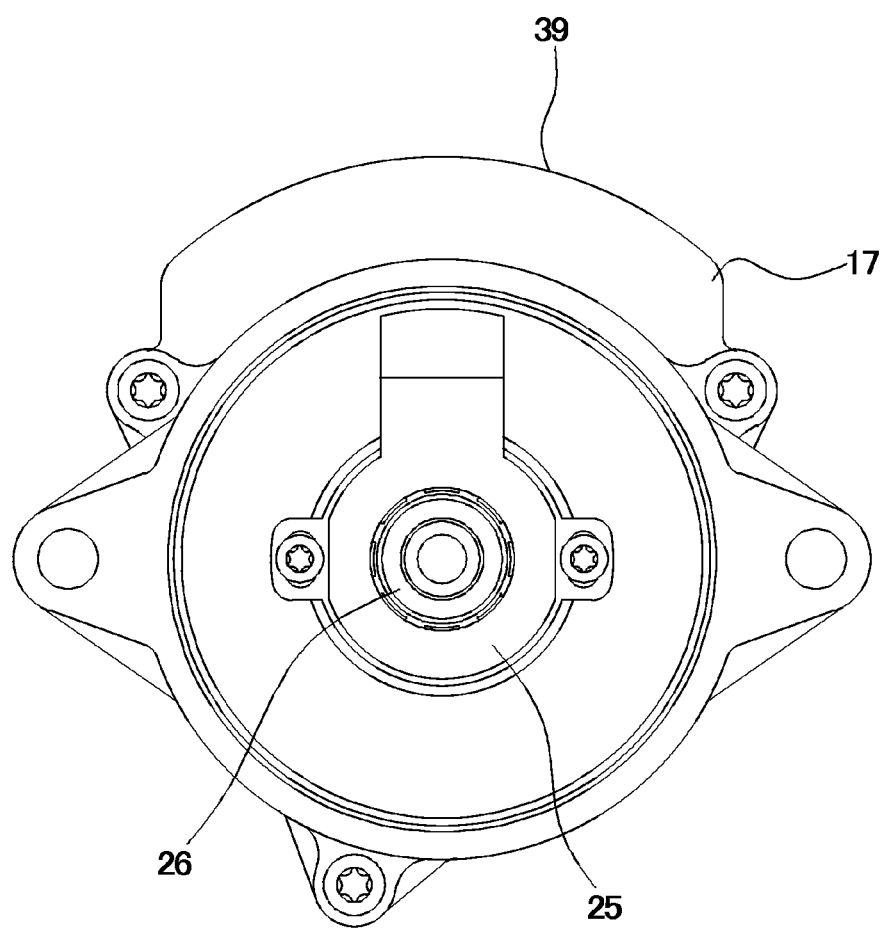
FIG. 36 is a front view showing the drive-device-integrated rotating electrical machine of Embodiment 4 of the invention, without a connector section.
Figure 37:
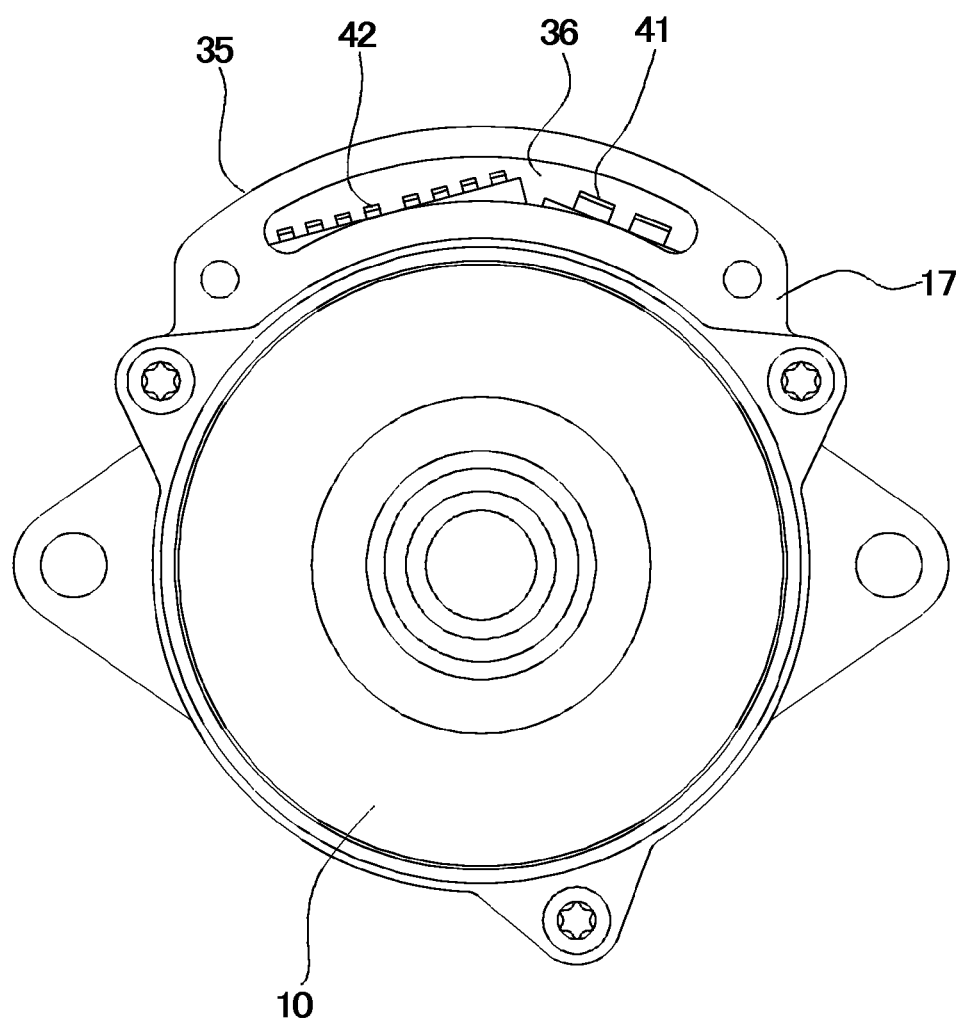
FIG. 37 is a rear view showing the drive-device-integrated rotating electrical machine of Embodiment 4 of the invention, without a connector section.

FIG. 30 is an axially cross-sectional view showing a drive-device-coaxially-integrated rotating electrical machine of Embodiment 4 of the invention. FIG. 31 is a side view showing the drive-device-coaxially-integrated rotating electrical machine of the same. FIG. 32 is a top view showing the drive-device-coaxially-integrated rotating electrical machine of the same. FIG. 33 is a front view showing the drive-device-coaxially-integrated rotating electrical machine of the same. FIG. 34 is a rear view showing the drive-device-coaxially-integrated rotating electrical machine of the same. FIG. 35 is a side view showing the drive-device-coaxially-integrated rotating electrical machine of the same, without a connector section. FIG. 36 is a front view showing the drive-device-coaxially-integrated rotating electrical machine of the same, without a connector section. FIG. 37 is a rear view showing the drive-device-coaxially-integrated rotating electrical machine of the same, without a connector section.

As compared to Embodiment 1, the drive-device-coaxially-integrated rotating electrical machine of Embodiment 4 differs structurally in the below-described portions.

A housing 17 is provided with a housing-side radially protruding portion 35, and a housing-side axial opening portion 36 which is a connector attachment portion is formed at an axial end of the housing-side radially protruding portion 35. The connector section 34 is attached onto the housing-side axial opening portion 36, and the connector section 34 is provided with a power connector 37 and a signal connector 38.

No opening portion is formed on a heat sink 19, resulting in the opening portion singly provided on a drive-device storing section 22.

Power terminals 41 and signal terminals 42 that are extending from a terminal section 31, axially project from the housing-side axial opening portion 36. The connector section 34 is provided, in its portion facing opposite to the housing-side axial opening portion 36, with a connector opening portion 48, and power connector terminals 43 extending from the power connector 37 and signal connector terminals 44 extending from the signal connector 38 are disposed in the connector opening portion 48.

The power terminals 41 and the signal terminals 42 are respectively subjected to terminal-to-terminal connection with their corresponding power-connector terminals 43 and signal-connector terminals 44, at the inner side of the connector opening portion 48, by welding, etc.

A cover 45 is mounted onto the connector opening portion 48 so as to cover a connector-connecting portion including connecting portions between the power terminals 41 and the power connector terminals 43 and connecting portions between the signal terminals 42 and the signal connector terminals 44. Between the contact faces of the cover 45 and the connector section 34, where appropriate, a hermetic water-proof seal is formed using a sealing resin.

According to the drive-device-coaxially-integrated rotating electrical machine of Embodiment 4 configured as described above, since the connector section 34 is attached onto the housing-side axial opening portion 36 of the drive-device storing section 22, it is possible to easily replace the connector section 34. Further, it is possible to replace solely the connector section 34 while commonly using the device drive 8.

Further, by simply changing the extending direction of the power terminals 41 and the signal terminals 42, as well as the opening direction of the housing-side axial opening portion 36, it is possible to change the attaching direction of the connector section 34 from that toward the non-output shaft side to that toward the output shaft side of the rotating electrical machine. Furthermore, since the connector-connecting portion 46 is projected from the housing-side axial opening portion 36, it is possible to easily connect the terminals. In addition, since the drive-device storing section 22 requires only one opening portion, the configuration becomes simplified.

Embodiment 5

Figure 38:
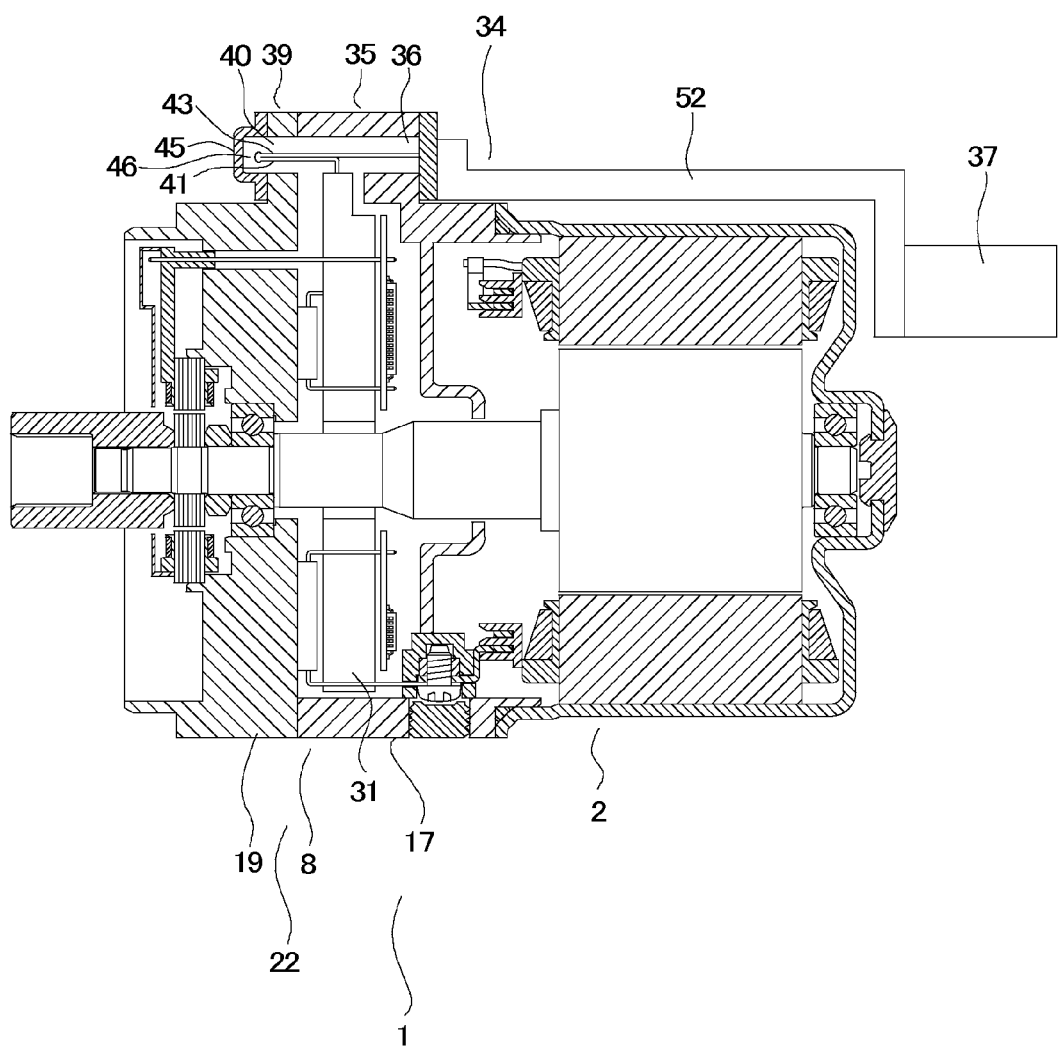
FIG. 38 is an axially cross-sectional view showing a drive-device-integrated rotating electrical machine of Embodiment 5 of the invention.
Figure 39:
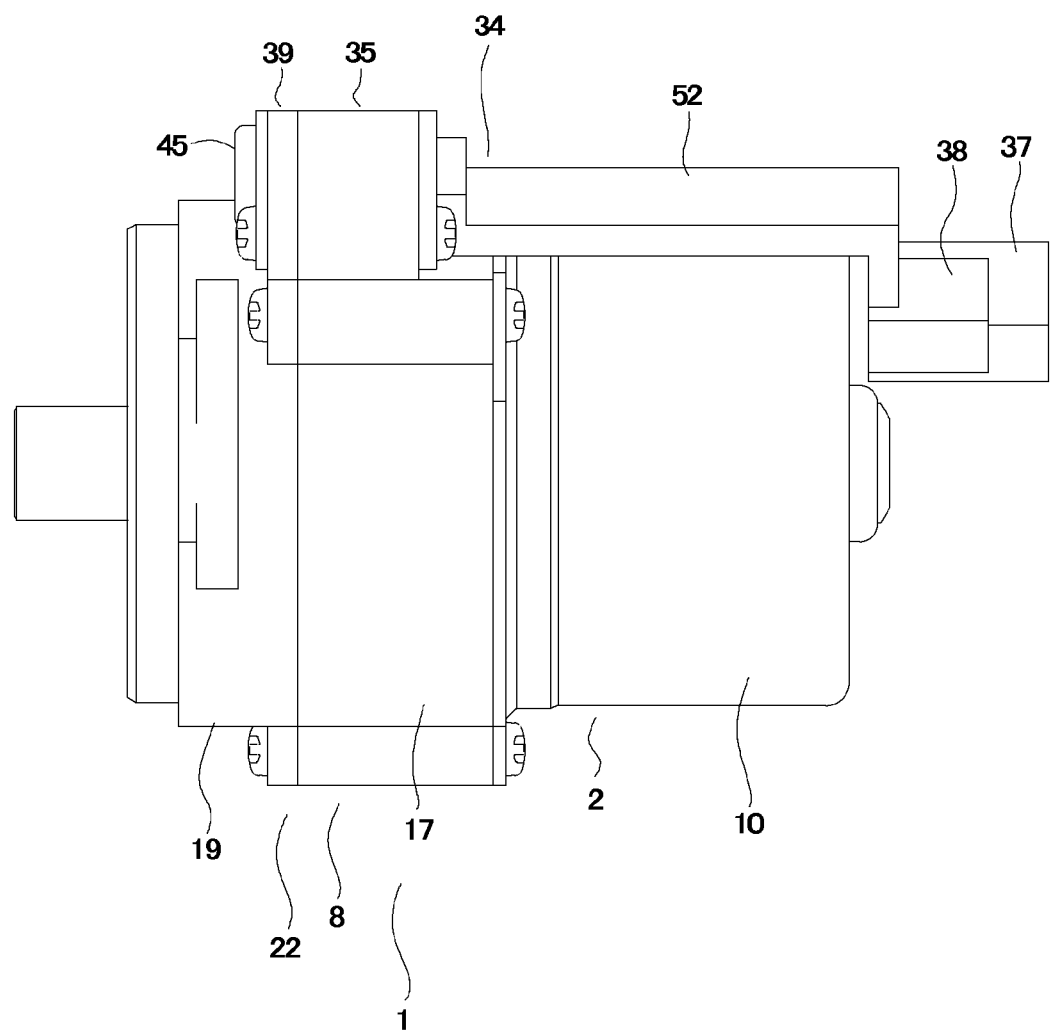
FIG. 39 is a side view showing the drive-device-integrated rotating electrical machine of Embodiment 5 of the invention.
Figure 40:
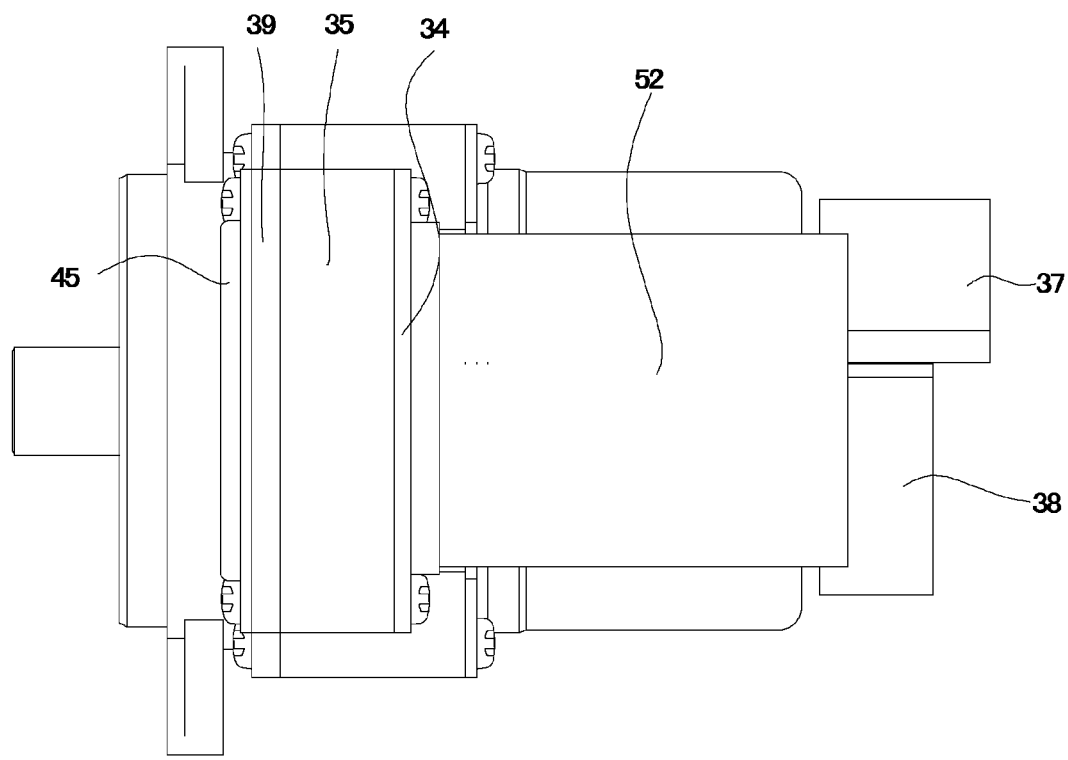
FIG. 40 is a top view showing the drive-device-integrated rotating electrical machine of Embodiment 5 of the invention.
Figure 41:
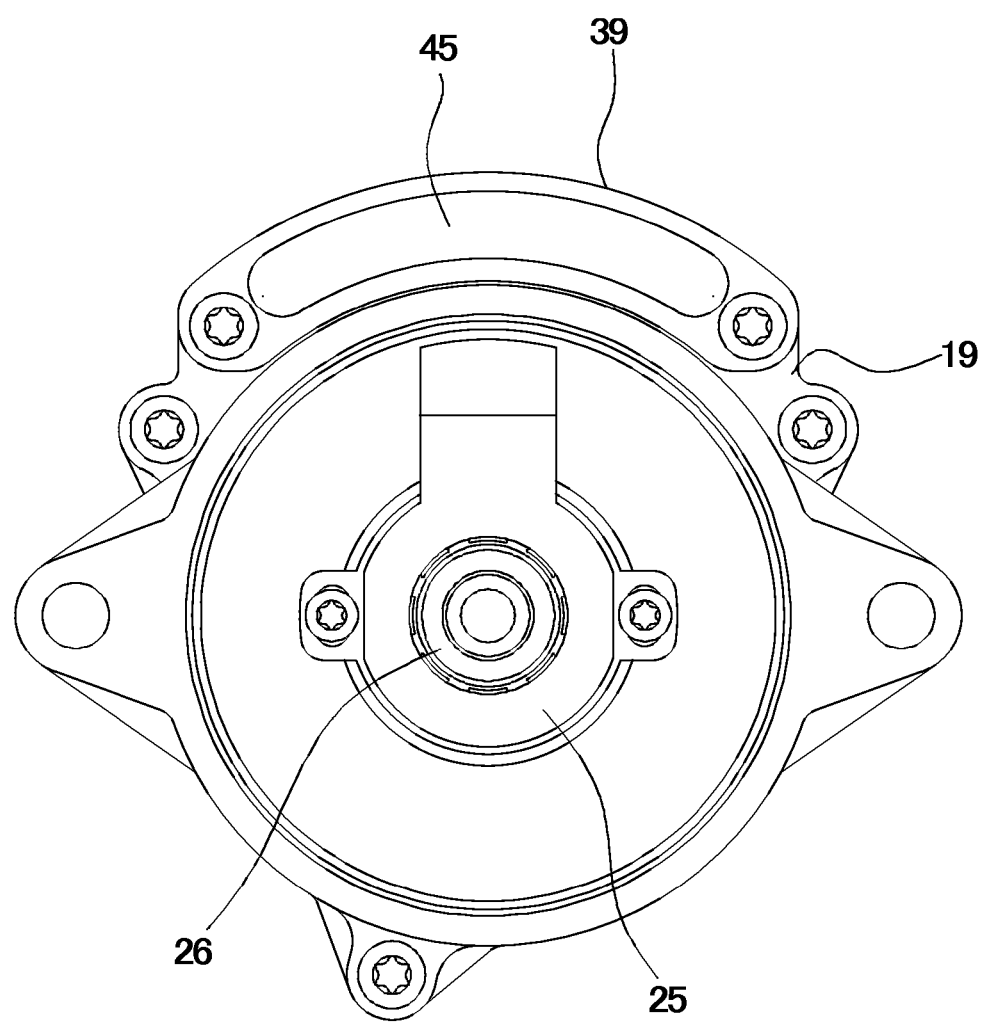
FIG. 41 is a front view showing the drive-device-integrated rotating electrical machine of Embodiment 5 of the invention.
Figure 42:
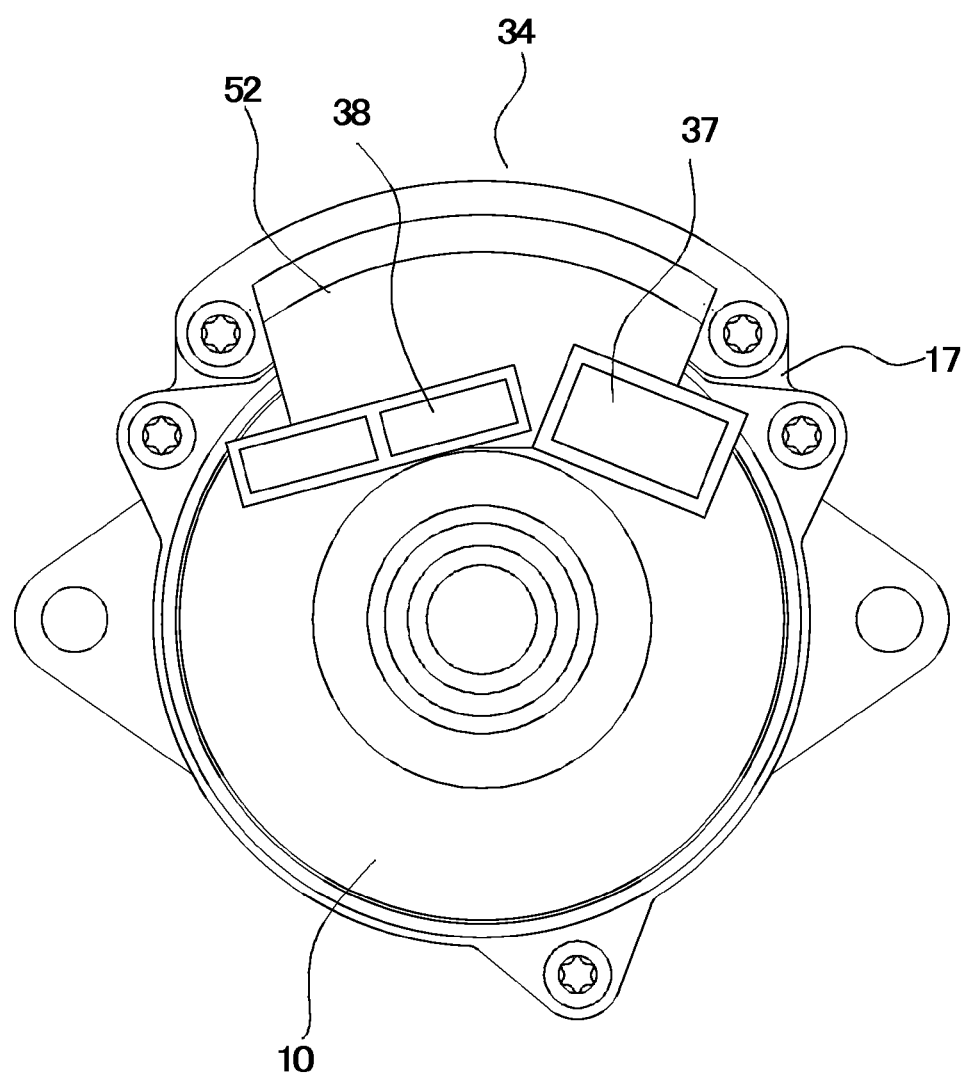
FIG. 42 is a rear view showing the drive-device-integrated rotating electrical machine of Embodiment 5 of the invention.

FIG. 38 is an axially cross-sectional view showing a drive-device-coaxially-integrated rotating electrical machine of Embodiment 5 of the invention. FIG. 39 is a side view showing the drive-device-coaxially-integrated rotating electrical machine of the same. FIG. 40 is a top view showing the drive-device-coaxially-integrated rotating electrical machine of the same. FIG. 41 is a front view showing the drive-device-coaxially-integrated rotating electrical machine of the same. FIG. 42 is a rear view showing the drive-device-coaxially-integrated rotating electrical machine of the same.

As compared to Embodiment 1, the drive-device-coaxially-integrated rotating electrical machine of Embodiment 5 differs structurally in the below-described portions.

A housing 17 is provided with a housing-side radially protruding portion 35, and a housing-side axial opening portion 36 which is a connector attachment portion is formed at an axial end of the housing-side radially protruding portion 35. A connector section 34 is attached onto the housing-side axial opening portion 36, the connector section 34 is provided with a connector extension portion 52, and the connector extension portion 52 is provided at its end with a power connector 37 and a signal connector 38. The power terminal 37 and the signal terminal 38 are placed at the back-end portion of a frame 10 of the rotating electrical machine 2.

According to the drive-device-coaxially-integrated rotating electrical machine of Embodiment 5 configured as described above, since the power connector 37 and the signal connector 38 are placed at the back-end portion of the frame 10 of the rotating electrical machine 2, the power connector 37 and the signal connector 38 project a little in the radial direction of the rotating electrical machine 2, thereby enhancing flexibility in arrangement of the connectors.

Embodiment 6

Figure 43:
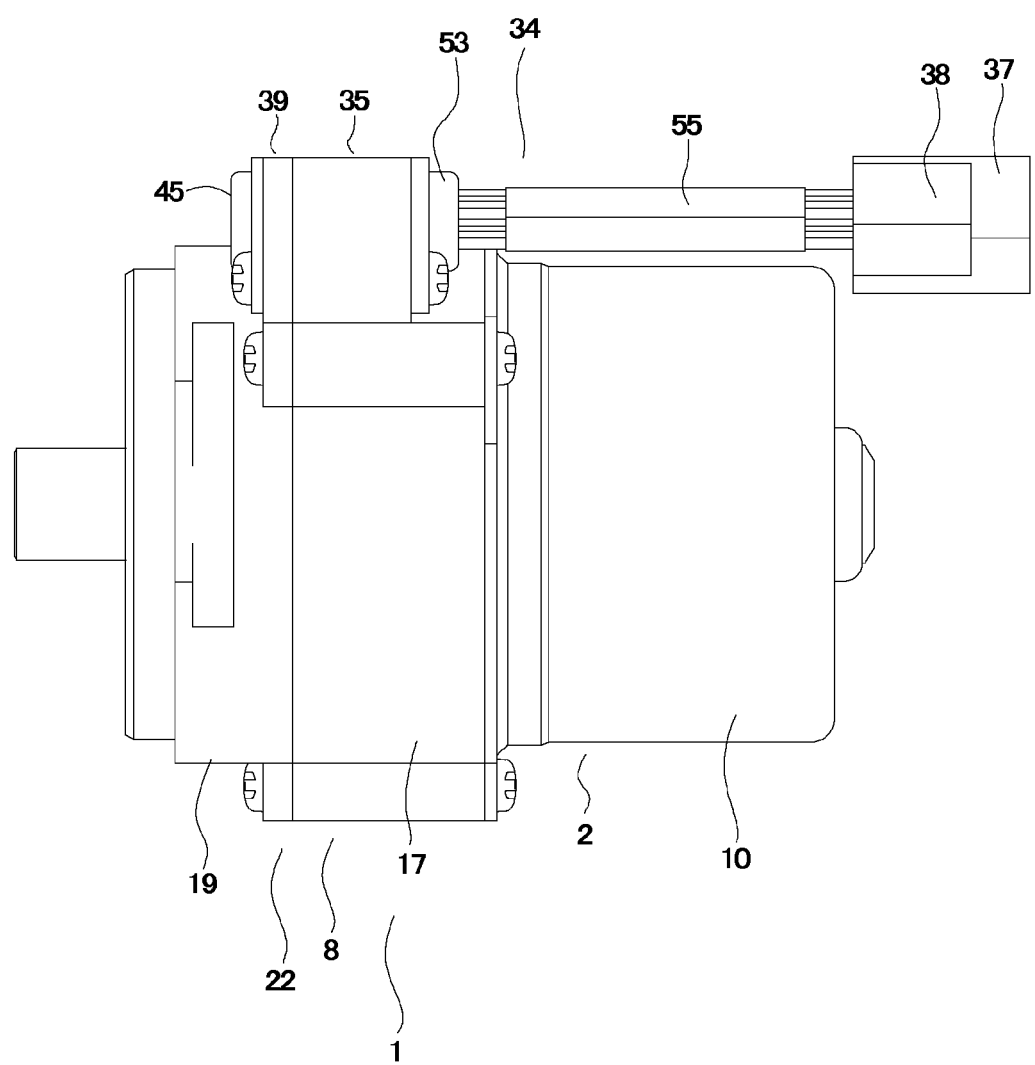
FIG. 43 is a side view showing a drive-device-integrated rotating electrical machine of Embodiment 6 of the invention.
Figure 44:
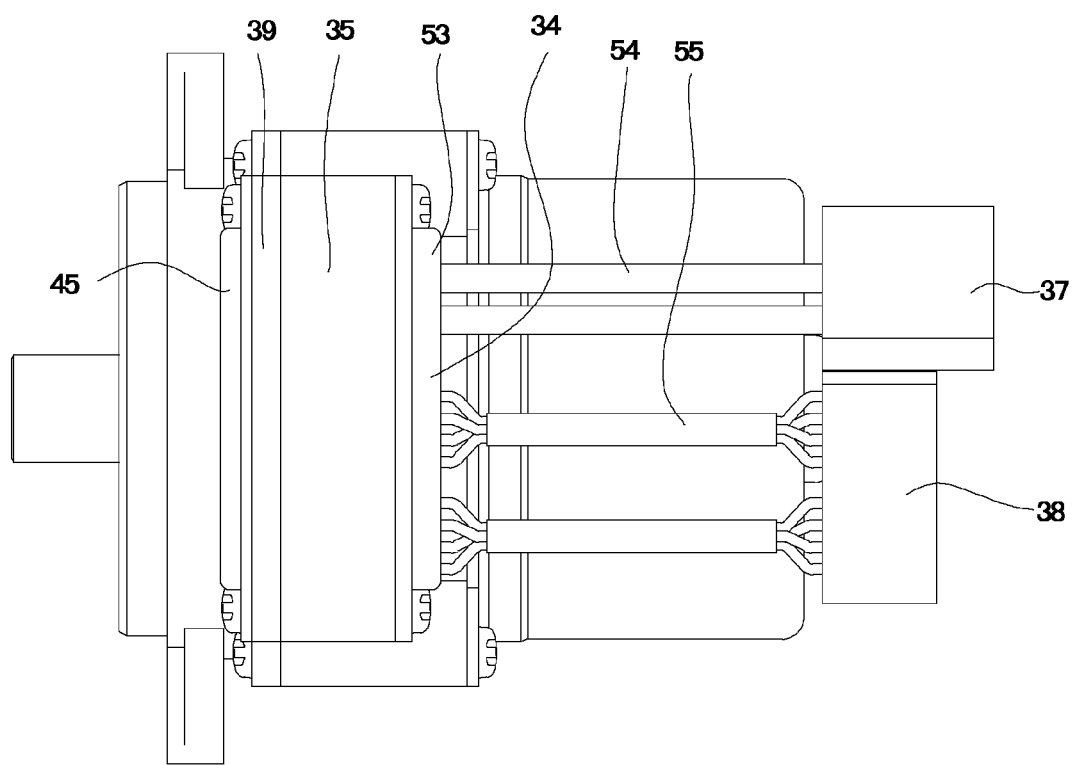
FIG. 44 is a top view showing the drive-device-integrated rotating electrical machine of Embodiment 6 of the invention.
Figure 45:
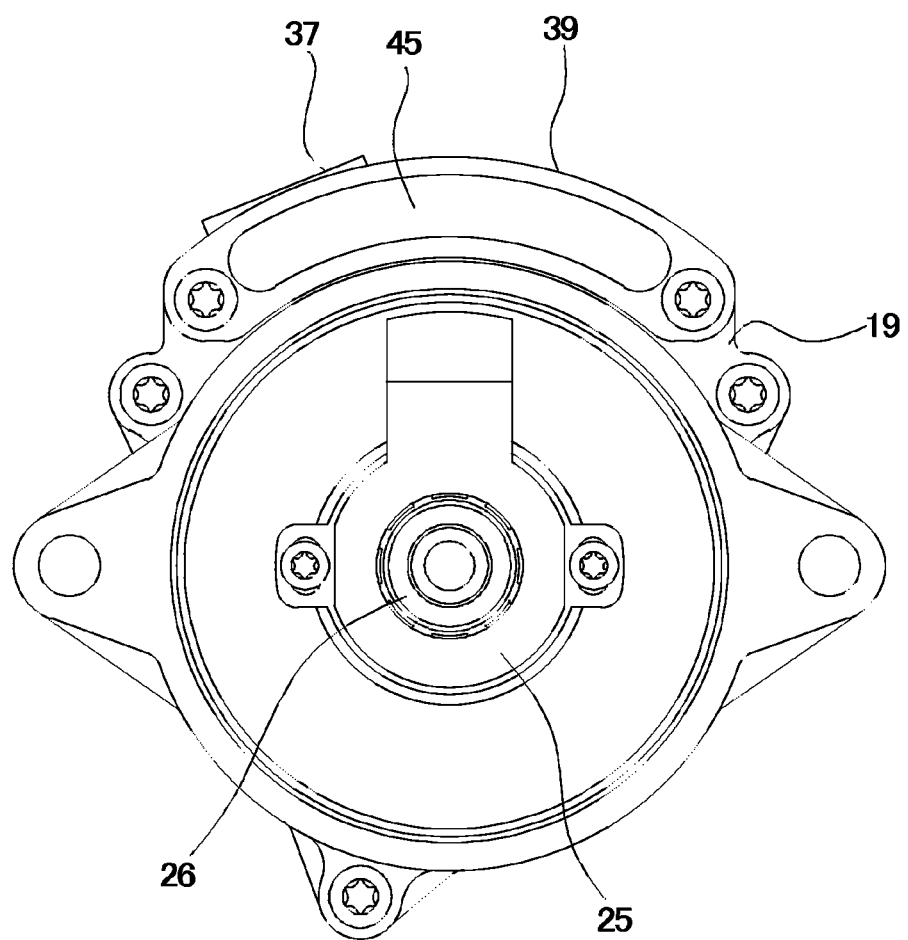
FIG. 45 is a front view showing the drive-device-integrated rotating electrical machine of Embodiment 6 of the invention.
Figure 46:
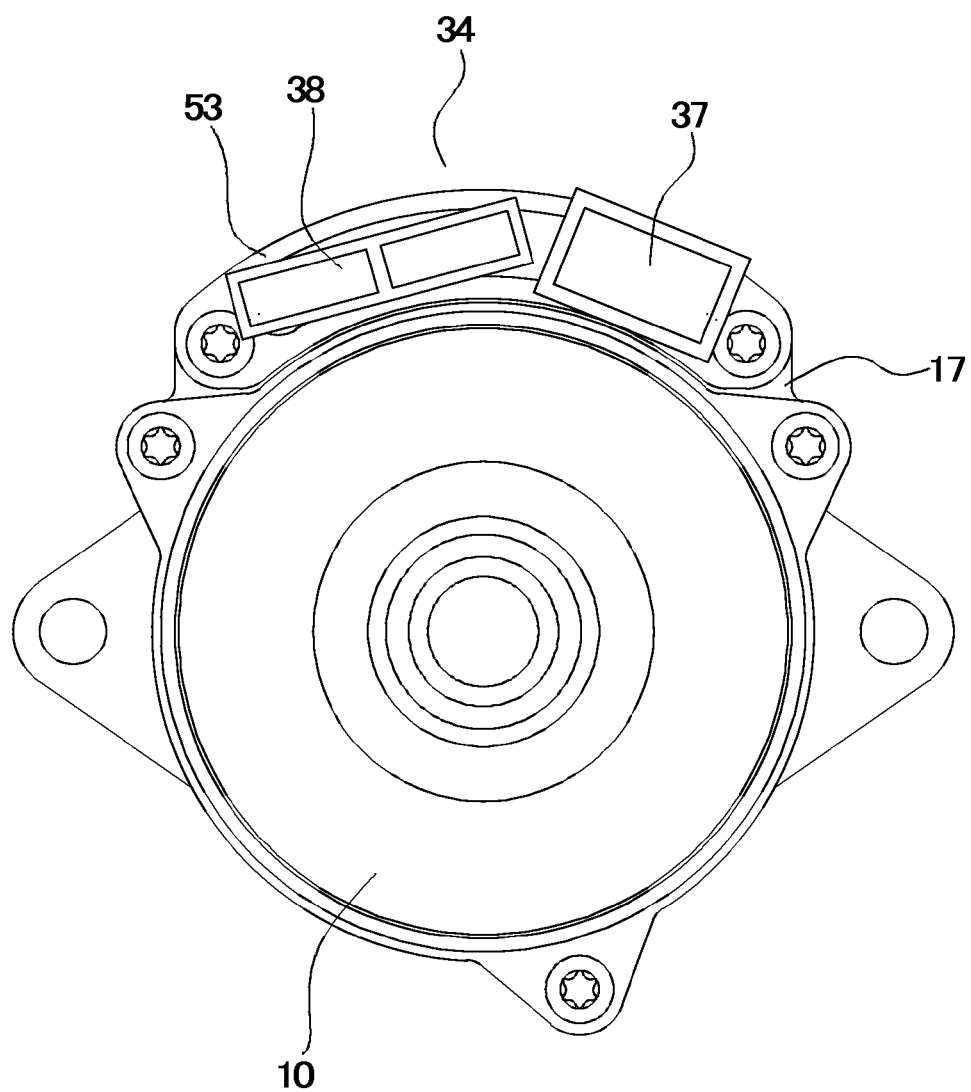
FIG. 46 is a rear view showing the drive-device-integrated rotating electrical machine of Embodiment 6 of the invention.

FIG. 43 is a side view showing a drive-device-coaxially-integrated rotating electrical machine of Embodiment 6 of the invention. FIG. 44 is a top view showing the drive-device-coaxially-integrated rotating electrical machine of the same. FIG. 45 is a front view showing the drive-device-coaxially-integrated rotating electrical machine of the same. FIG. 46 is a rear view showing the drive-device-coaxially-integrated rotating electrical machine of the same. As compared to Embodiment 1, the drive-device-coaxially-integrated rotating electrical machine of Embodiment 6 differs structurally in the below-described portions.

A housing 17 is provided with a housing-side radially protruding portion 35, and a housing-side axial opening portion, which is a connector attachment portion not shown in the figure, is formed at an axial end of the housing-side radially protruding portion 35. A lead-wire attachment portion 53 is mounted onto the housing-side axial opening portion, the lead-wire attachment portion 53 is provided with power lead wires 54 and signal lead wires 55, a power connector 37 is attached to the ends of the power lead wires 54, and a signal connector 38 is attached to the ends of the signal lead wires 55.

According to the drive-device-coaxially-integrated rotating electrical machine of Embodiment 6 configured as described above, since the power connector 37 and the signal connector 38 are attached to the lead wires, it is possible to enhance flexibility in arrangement of the connectors.

Embodiment 7

Figure 47:
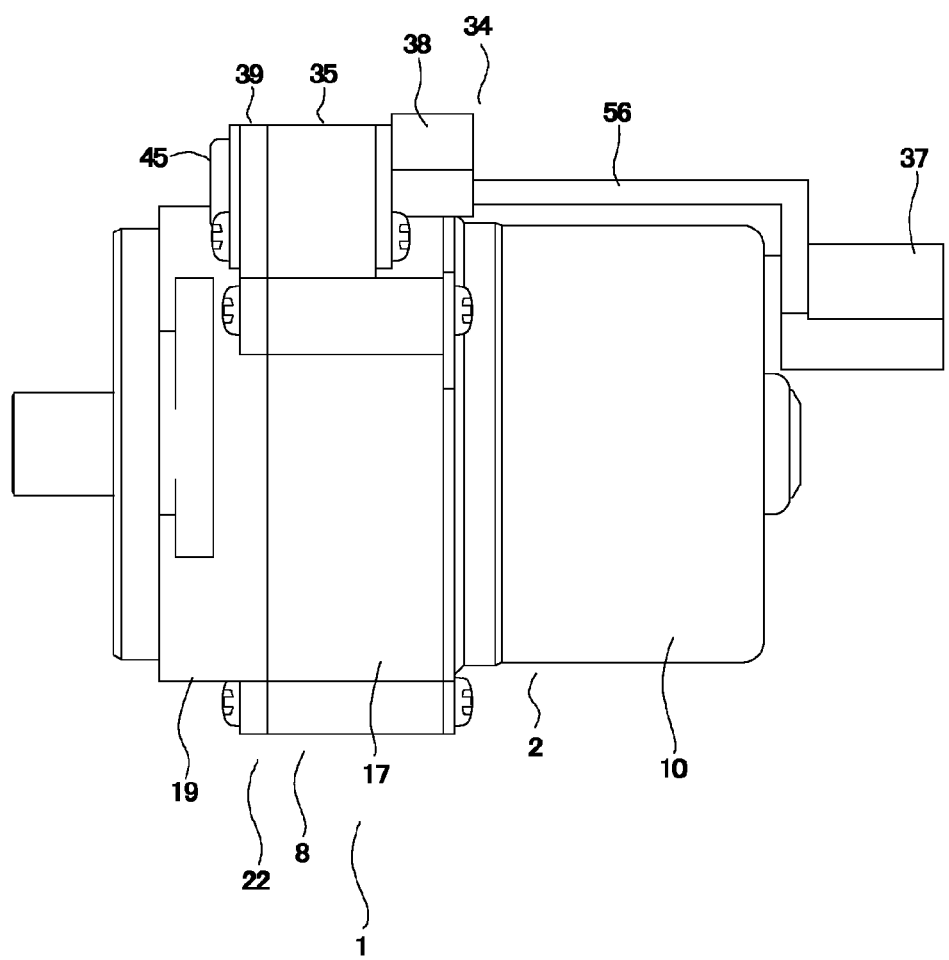
FIG. 47 is a side view showing a drive-device-integrated rotating electrical machine of Embodiment 7 of the invention.
Figure 48:
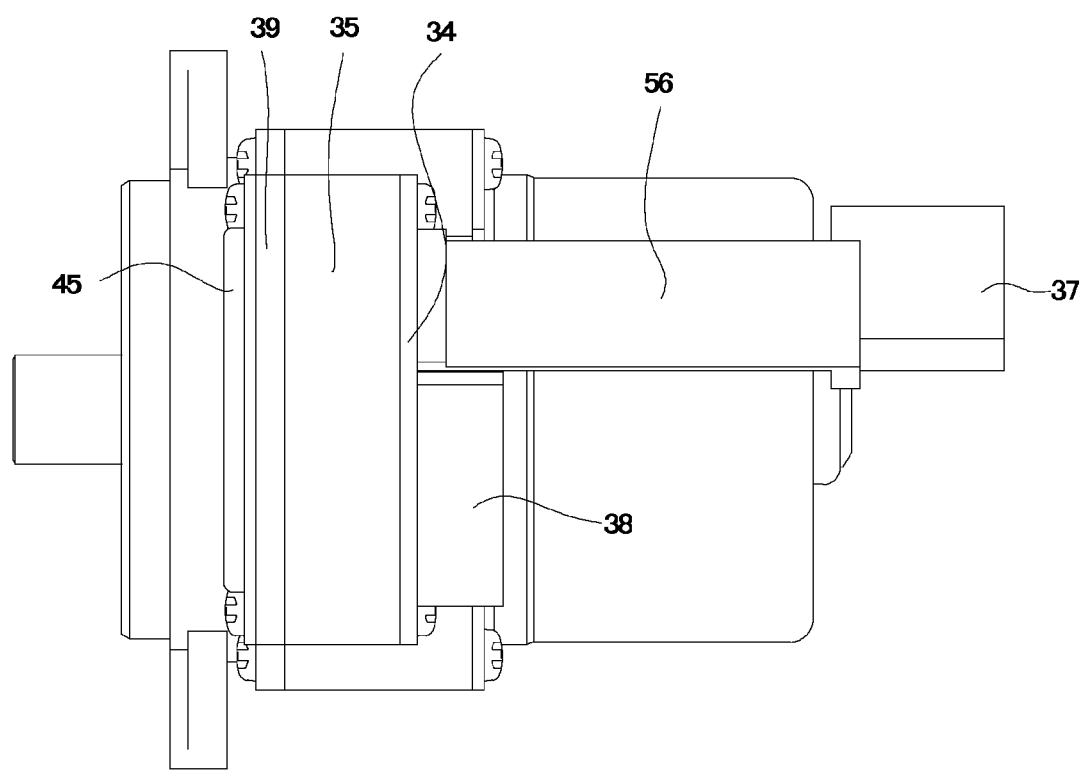
FIG. 48 is a top view showing the drive-device-integrated rotating electrical machine of Embodiment 7 of the invention.
Figure 49:
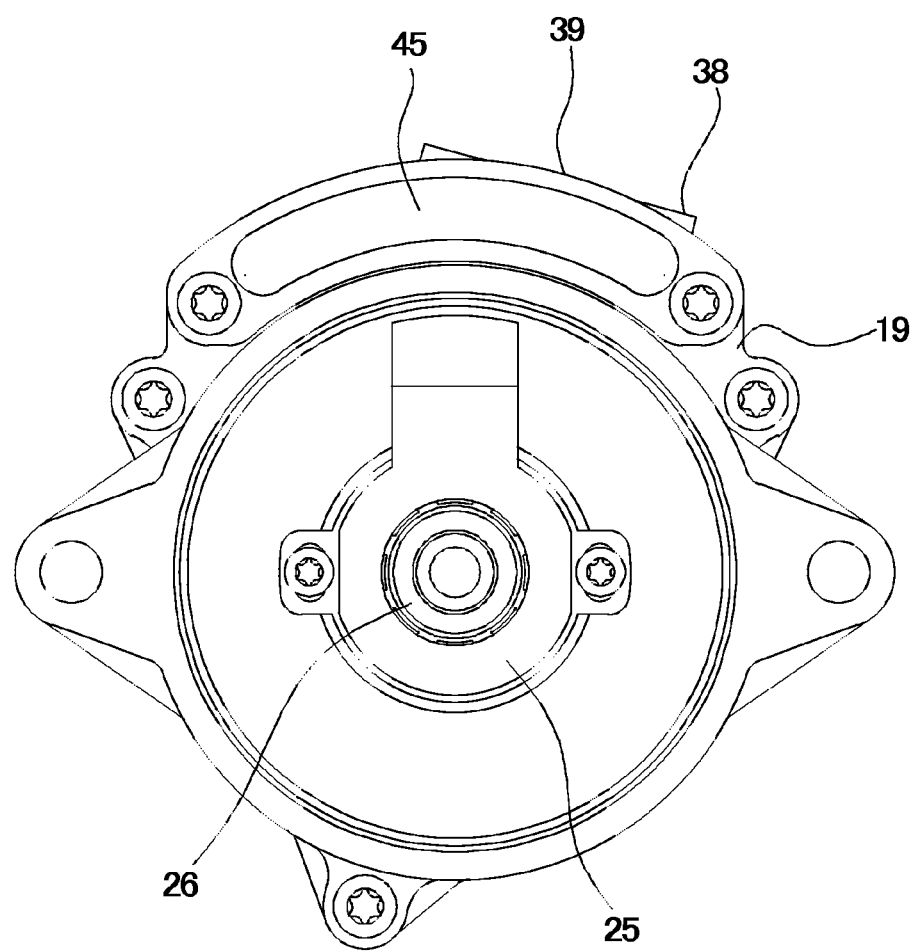
FIG. 49 is a front view showing the drive-device-integrated rotating electrical machine of Embodiment 7 of the invention.
Figure 50:
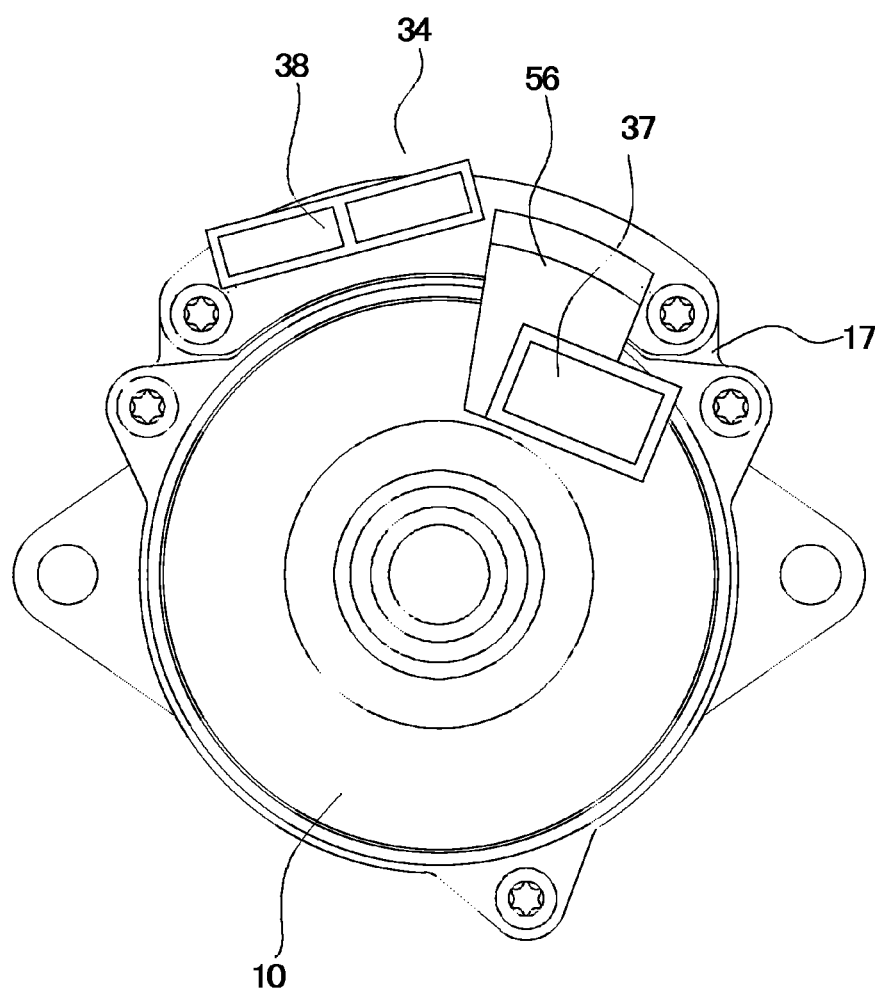
FIG. 50 is a rear view showing the drive-device-integrated rotating electrical machine of Embodiment 7 of the invention.

FIG. 47 is a side view showing a drive-device-coaxially-integrated rotating electrical machine of Embodiment 7 of the invention. FIG. 48 is a top view showing the drive-device-coaxially-integrated rotating electrical machine of the same. FIG. 49 is a front view showing the drive-device-coaxially-integrated rotating electrical machine of the same. FIG. 50 is a rear view showing the drive-device-coaxially-integrated rotating electrical machine of the same. As compared to Embodiment 1, the drive-device-coaxially-integrated rotating electrical machine of Embodiment 7 differs structurally in the below-described portions.

A housing 17 is provided with a housing-side radially protruding portion 35, and a housing-side axial opening portion, which is a connector attachment portion not shown in the figure, is formed at an axial end of the housing-side radially protruding portion 35. A connector section 34 is attached onto the housing-side axial opening portion, the connector section 34 is provided with a power connector extension portion 56, and the power connector extension portion 56 is provided at its end with a power connector 37. A signal connector 38 is placed at the connector section 34. The power connector 37 is placed at a back end portion of a frame 10 of a rotating electrical machine 2.

According to the drive-device-coaxially-integrated rotating electrical machine of Embodiment 7 configured as described above, since the power connector 37 is placed at the back-end portion of the frame 10 of the rotating electrical machine 2, the power connector 37 projects a little in the radial direction of the rotating electrical machine 2, thereby enhancing flexibility in arrangement of the connector.

Meanwhile, according to the configuration in this Embodiment 7, although the extension portion is provided for the power connector and no extension portion is provided for the signal connector, they may be conversely configured such that no extension portion is provided for the power connector and an extension portion is provided for the signal connector.

Embodiment 8

Figure 51:
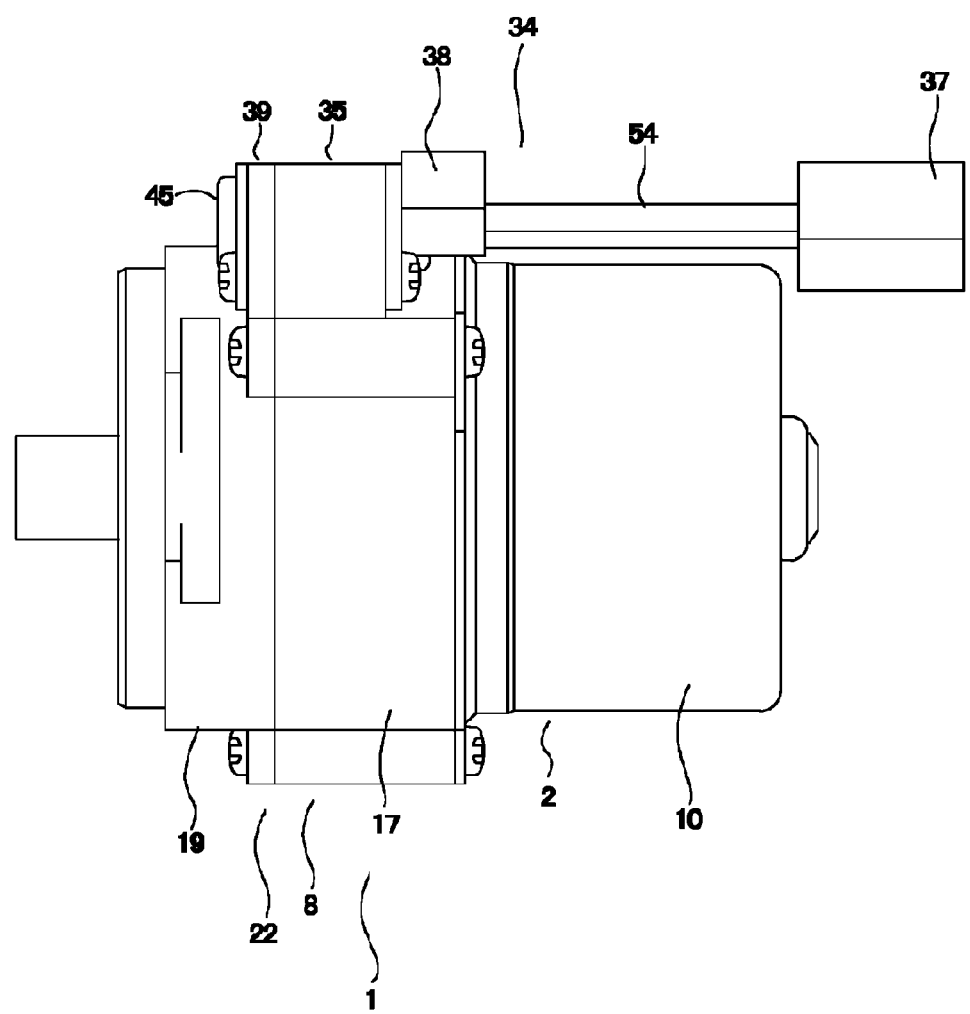
FIG. 51 is a side view showing a drive-device-integrated rotating electrical machine of Embodiment 8 of the invention.
Figure 52:
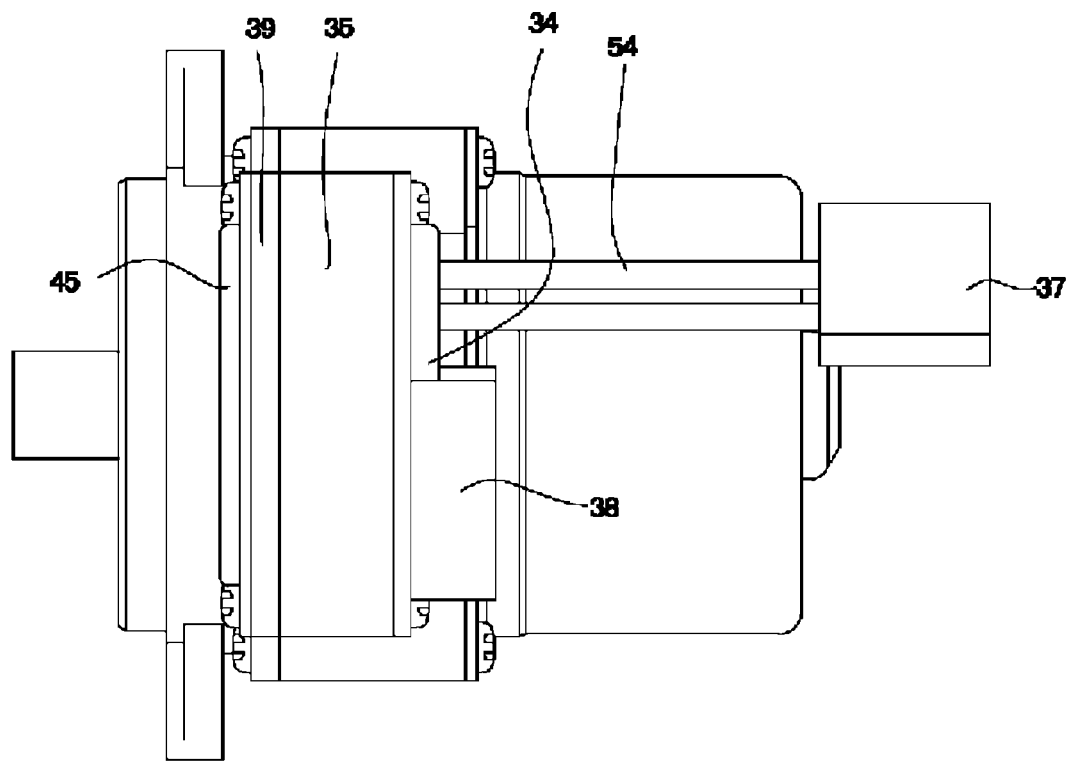
FIG. 52 is a top view showing the drive-device-integrated rotating electrical machine of Embodiment 8 of the invention.
Figure 53:
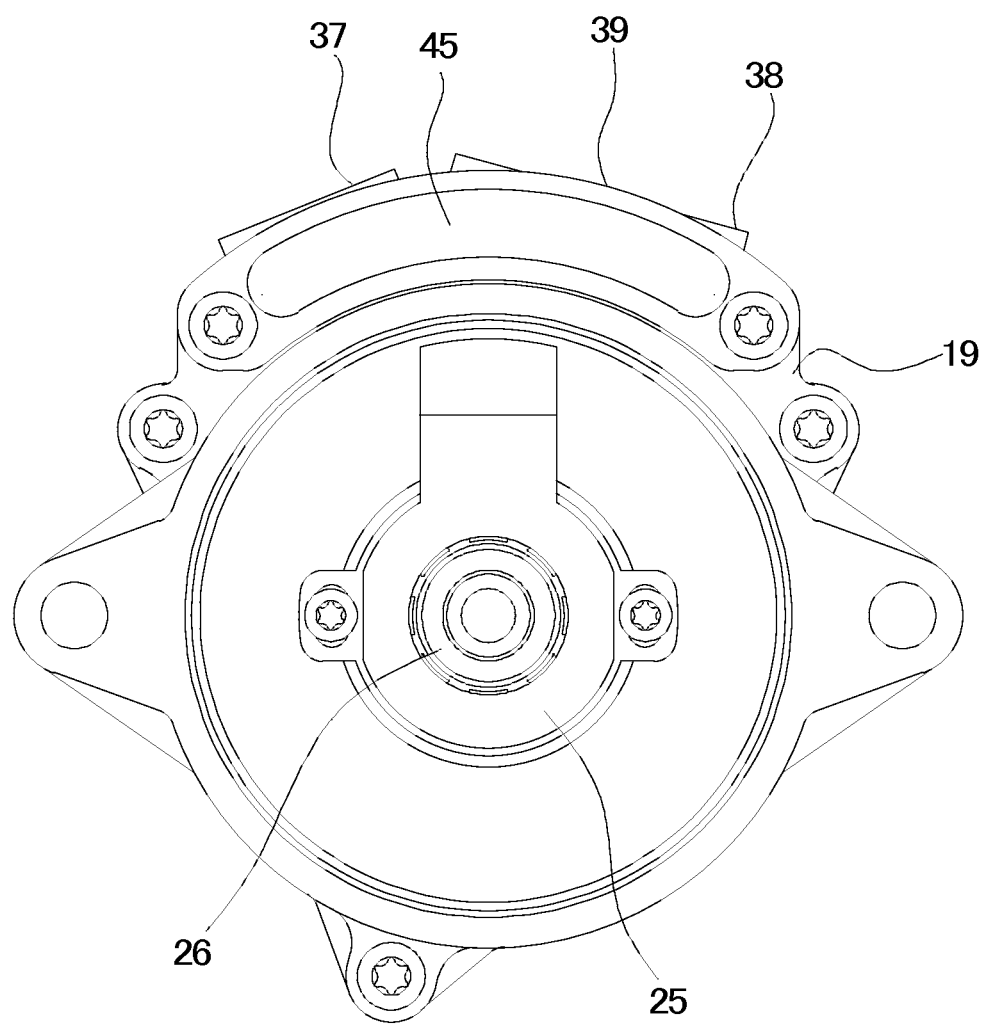
FIG. 53 is a front view showing the drive-device-integrated rotating electrical machine of Embodiment 8 of the invention.
Figure 54:
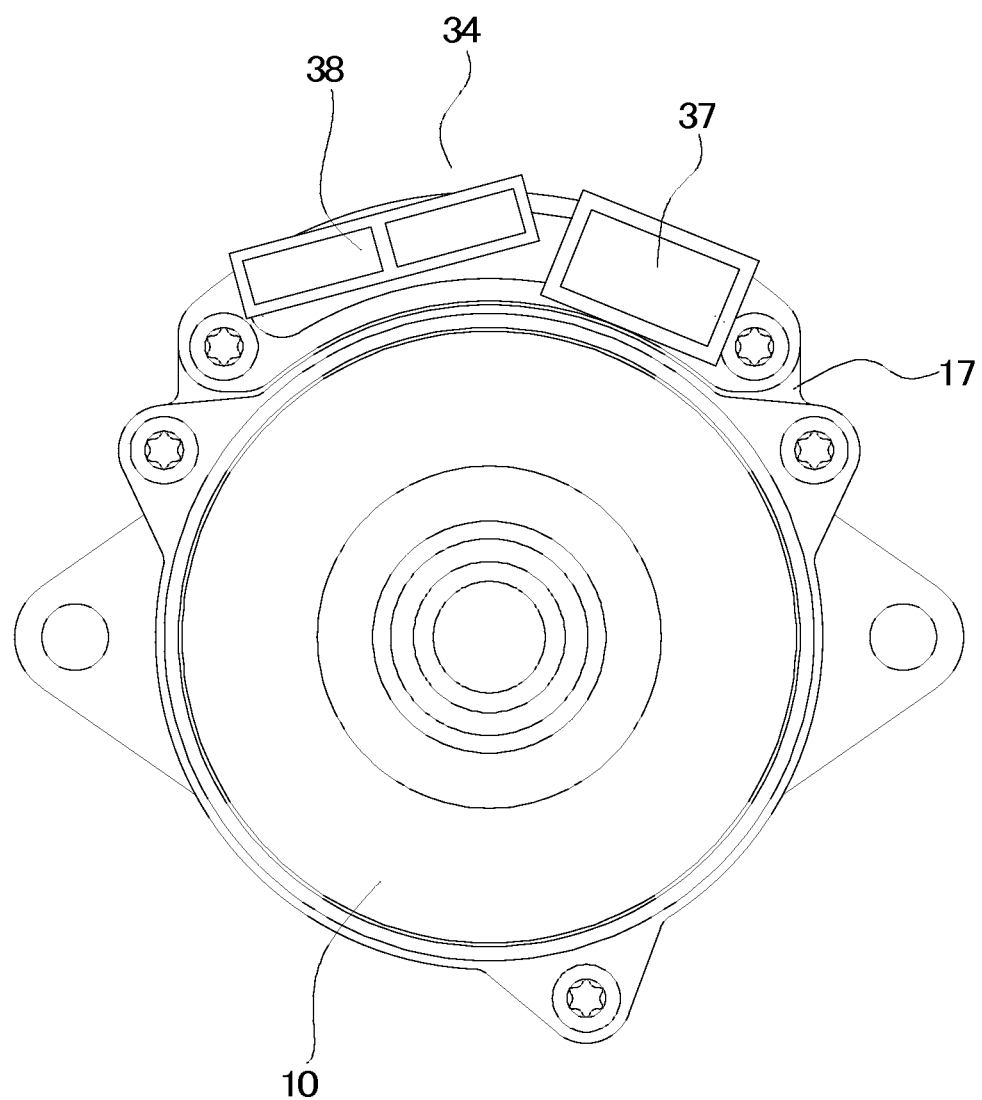
FIG. 54 is a rear view showing the drive-device-integrated rotating electrical machine of Embodiment 8 of the invention.

FIG. 51 is a side view showing a drive-device-coaxially-integrated rotating electrical machine of Embodiment 8 of the invention. FIG. 52 is a top view showing the drive-device-coaxially-integrated rotating electrical machine of the same. FIG. 53 is a front view showing the drive-device-coaxially-integrated rotating electrical machine of the same. FIG. 54 is a rear view showing the drive-device-coaxially-integrated rotating electrical machine of the same. As compared to Embodiment 1, the drive-device-coaxially-integrated rotating electrical machine of Embodiment 8 differs structurally in the below-described portions.

A housing 17 is provided with a housing-side radially protruding portion 35, and a housing-side axial opening, which is a connector attachment portion not shown in the figure, is provided at an axial end of the housing-side radially protruding portion 35. A lead-wire attachment portion 53 is mounted onto the housing-side axial opening, power lead wires 54 are provided at the lead-wire attachment portion 53, and a power connector 37 is attached to the ends of the power lead wires 54. A signal connector 38 is placed on the lead wire attachment portion 53 of the connector section 34.

According to the drive-device-coaxially-integrated rotating electrical machine of Embodiment 8 configured as described above, since the power connector 37 is connected to the lead wires, it is possible to enhance flexibility in arrangement of the connector.

Meanwhile, according to the configuration in this Embodiment 8, although the lead wires are provided for the power connector and no lead wire is provided for the signal connector, they may be conversely configured such that no lead wire is provided for the power connector and lead wires are provided for the signal connector.

Embodiment 9

Figure 55:
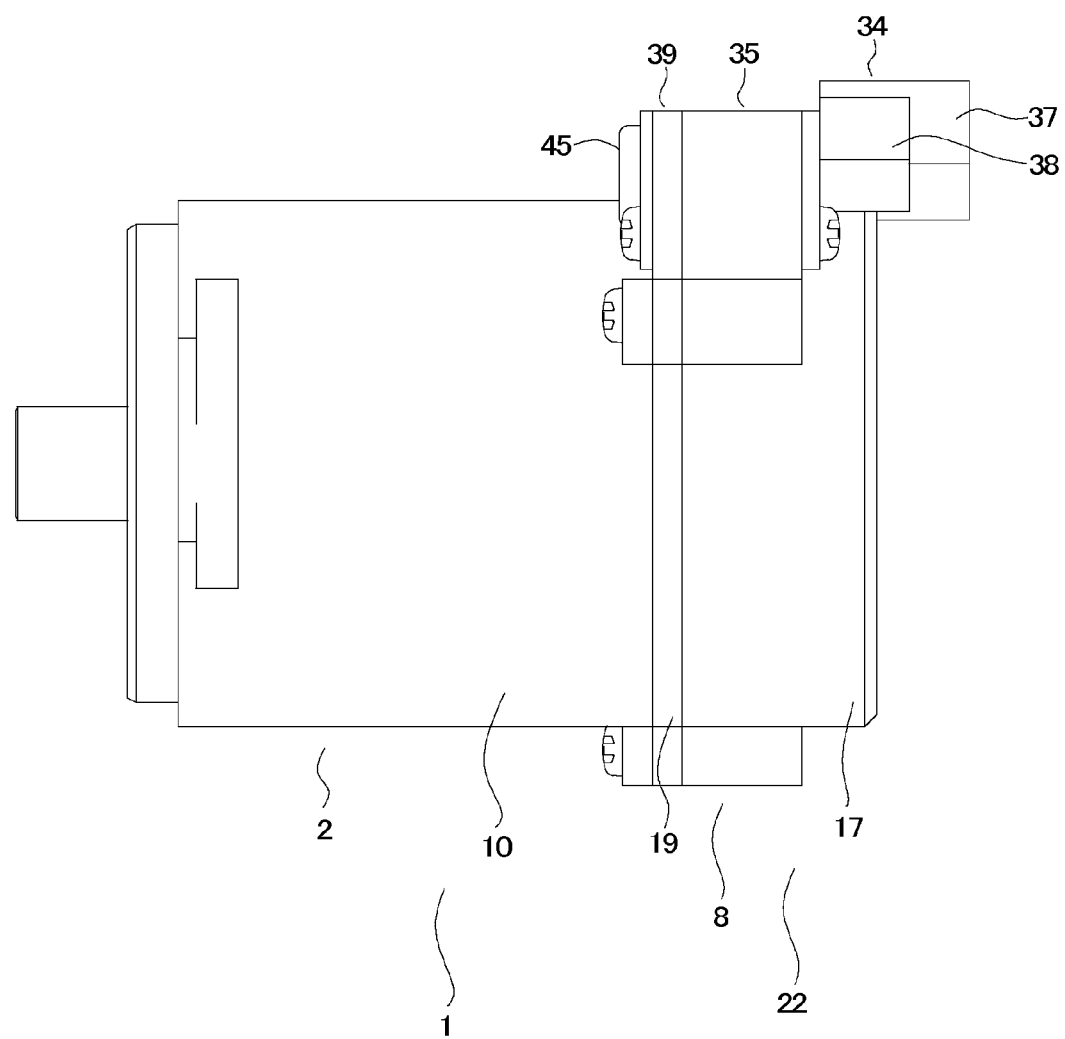
FIG. 55 is a side view showing a drive-device-integrated rotating electrical machine of Embodiment 9 of the invention.
Figure 56:
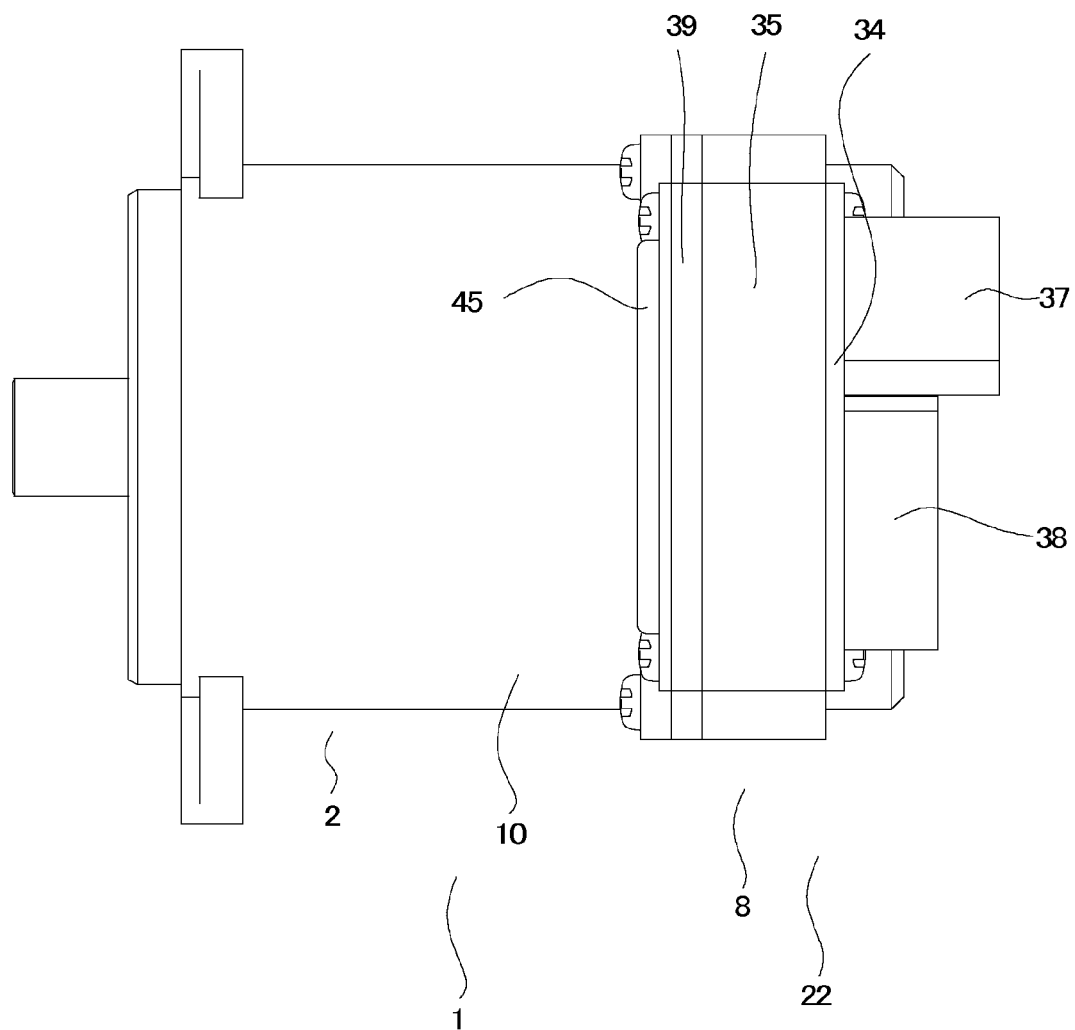
FIG. 56 is a top view showing the drive-device-integrated rotating electrical machine of Embodiment 9 of the invention.
Figure 57:
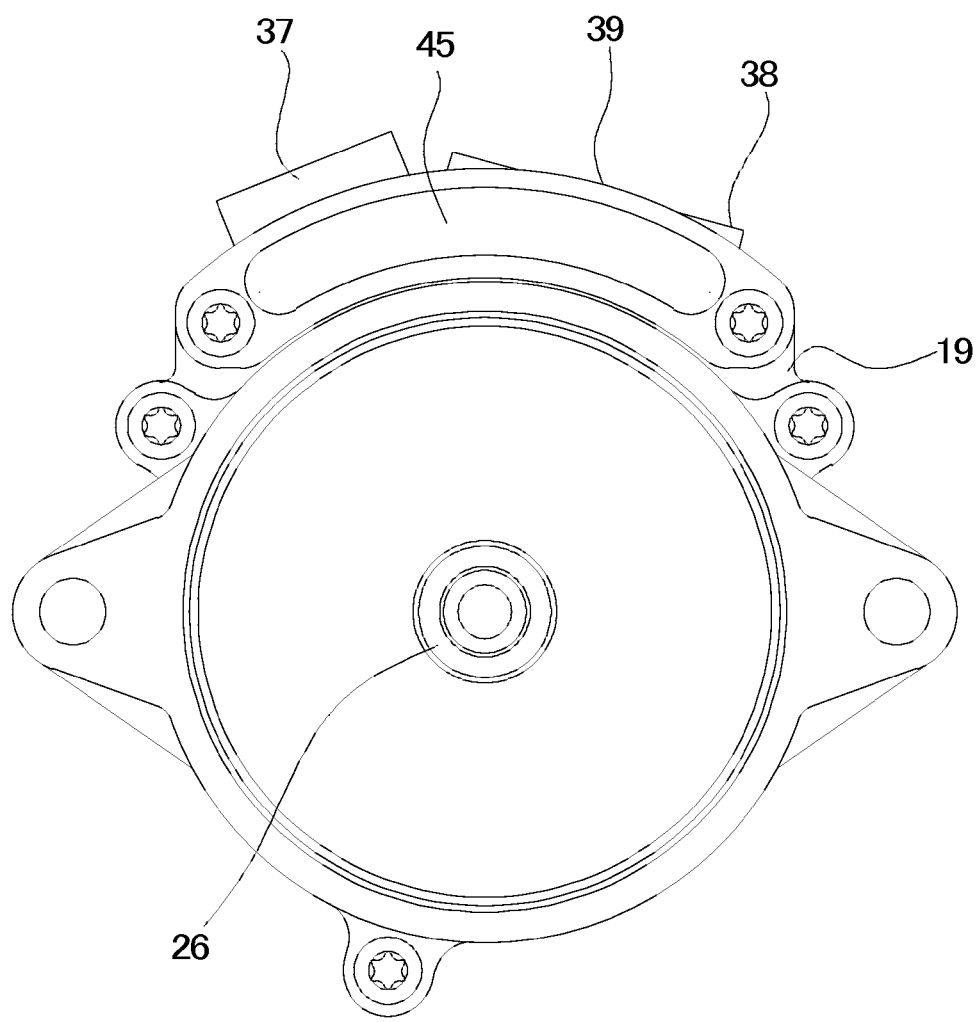
FIG. 57 is a front view showing the drive-device-integrated rotating electrical machine of Embodiment 9 of the invention.
Figure 58:
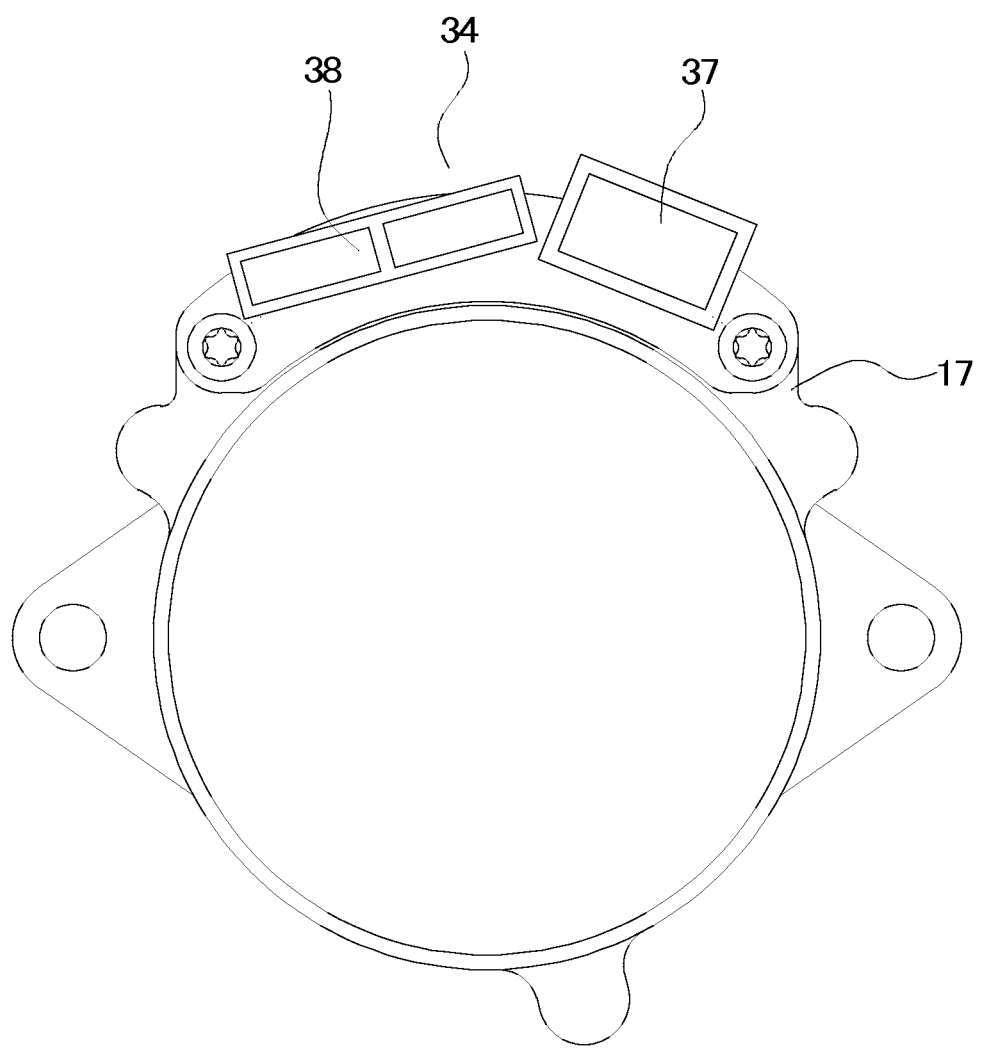
FIG. 58 is a rear view showing the drive-device-integrated rotating electrical machine of Embodiment 9 of the invention.

FIG. 55 is a side view showing a drive-device-coaxially-integrated rotating electrical machine of Embodiment 9 of the invention. FIG. 56 is a top view showing the drive-device-coaxially-integrated rotating electrical machine of the same. FIG. 57 is a front view showing the drive-device-coaxially-integrated rotating electrical machine of the same. FIG. 58 is a rear view showing the drive-device-coaxially-integrated rotating electrical machine of the same. The drive-device-coaxially-integrated rotating electrical machine of Embodiment 9 has a configuration in which the drive device 8, which is arranged at the output-shaft side of the rotating electrical machine 2 in Embodiment 1, is instead arranged at the non-output shaft side.

According to the drive-device-coaxially-integrated rotating electrical machine of Embodiment 9 configured as described above, it is possible to easily replace the connector section 34. Further, it is possible to replace solely the connector section 34 while commonly using the device drive 8. In addition, other effects that are the same as in Embodiment 1 are achieved.

INDUSTRIAL APPLICABILITY

The invention is well-suited to be used for an electric power steering system for applying an assist force to a steering assembly of vehicles.

DESCRIPTION OF REFERENCE NUMERALS AND SIGNS

1: drive-device-coaxially-integrated rotating electrical machine, 2: rotating electrical machine, 3: stator core, 4: insulator, 5: stator windings, 6: terminal holder, 7: winding terminal, 8: drive device, 9: motor terminal, 10: frame, 11: stator, 12: rotor, 13: rear bearing, 14: rear bearing box portion, 15: shaft, 16: magnet, 17: housing, 18: mating portion, 19: heat sink, 20: front bearing, 21: front bearing box portion, 22: drive-device storing section, 23: decelerating mechanism, 24: mating portion, 25: rotation sensor, 26: boss, 27: microcomputer, 28: FET driver circuit, 29: control board, 30: driver unit, 31: terminal section, 32: driver-unit signal terminal, 33: driver-unit motor terminal, 34: connector section, 35: housing-side radially protruding portion, 36: housing-side axial opening portion, 37: power connector, 38: signal connector, 39: heat sink-side radially protruding portion, 40: heat sink-side opening portion, 41: power terminals, 42: signal terminals, 43: power connector terminals, 44: signal connector terminals, 45: cover, 46: connector-connecting portion, 47: housing-side radial opening portion, 48: connector opening portion, 49: sealing resin, 50: terminal through-holes, 51: fringe portion, 52: connector extension portion, 53: lead-wire attachment portion, 54: power lead wires, 55: signal lead wires, 56: power connector extension portion.

The invention claimed is:

1. A drive-device-integrated rotating electrical machine, comprising:
an electric motor;
a drive device equipped with an electronic part for controlling driving of the electric motor and wiring parts;
a housing and a heat sink which constitute a drive-device storing section for storing the drive device; and
a connector section provided with a power connector for feeding power to the drive device and a signal connector; wherein
a radially protruding portion is provided radially on at least one of circumferences of the housing and the heat sink constituting the drive-device storing section; an opening portion is formed on at least one said radially protruding portion; the connector section is attachably and detachably attached onto at least one said opening portion; and a connector-connecting portion for electrically connecting the connector section with the drive device is provided in the vicinity of said opening portion.

2. The drive-device-integrated rotating electrical machine of claim 1, wherein a housing-side one of said opening portion is formed on one of said radially protruding portion provided on the housing, a heat sink-side one of said opening portion is formed on another of said radially protruding portion provided on the heat sink, and a portion for attaching the connector section and the connector-connecting portion are individually provided in the respective opening portions.

3. The rotating electrical machine integrated with a drive device of claim 2, wherein the housing-side opening portion is provided at an axial end of the radially protruding portion on the housing, and the heat sink-side opening portion is provided at an axial end of the radially protruding portion on the heat sink.

4. The drive-device-integrated rotating electrical machine of claim 3, wherein the connector-connecting portion projects from the opening portion.

5. The drive-device-integrated rotating electrical machine of claim 2, wherein the opening portion where the connector-connecting portion is attached, is provided with a cover and sealed with a resin.

6. The drive-device-integrated rotating electrical machine of claim 1, wherein the opening portion is formed singly on either one of said at least one radially protruding portion, and a portion for attaching the connector section and the connector-connecting portion are provided in the singly-formed opening portion.

7. The drive-device-integrated rotating electrical machine of claim 1, wherein the opening portion is formed singly on one of said at least one radially protruding portion, the connector section is attached onto the opening portion, and the connector-connecting portion is provided in the connector section.

8. The drive-device-integrated rotating electrical machine of claim 6, wherein the opening portion is formed singly on a radially upper face of one of said at least one radially protruding portion, and the portion for attaching the connector section is faced in radial direction.

9. The drive-device-integrated rotating electrical machine of claim 6, wherein the opening portion is formed singly at an axial end of one of said at least one radially protruding portion, and the portion for attaching the connector section is faced in axial direction.

10. The drive-device-integrated rotating electrical machine of claim 1, wherein at least one of the connectors of the connector section, is mounted apart from a portion for attaching the connector section at the opening portion.

11. The drive-device-integrated rotating electrical machine of claim 10, wherein the connector is mounted at a back end of a motor frame of the electric motor.

12. The drive-device-integrated rotating electrical machine of claim 10, wherein the connector is connected through a lead wire attached to the opening portion.

13. The rotating electrical machine integrated coaxially with a drive device of claim 10, wherein the connectors of the connector section is only partially placed at a back end of a motor frame of the electric motor.

14. The drive-device-integrated rotating electrical machine of claim 7, wherein the opening portion is formed singly on a radially upper face of one of said at least one radially protruding portion, and the portion for attaching the connector section is faced in radial direction.

15. The drive-device-integrated rotating electrical machine of claim 7, wherein the opening portion is formed singly at an axial end of one of said at least one radially protruding portion, and the portion for attaching the connector section is faced in axial direction.

* * * * *